(12) United States Patent
Takabayashi

(10) Patent No.: US 8,546,899 B2
(45) Date of Patent: Oct. 1, 2013

(54) LIGHT RECEIVING ELEMENT, LIGHT RECEIVING DEVICE, AND LIGHT RECEIVING MODULE

(75) Inventor: Kazumasa Takabayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/401,016

(22) Filed: Feb. 21, 2012

(65) Prior Publication Data

US 2012/0235264 A1    Sep. 20, 2012

(30) Foreign Application Priority Data

Mar. 20, 2011  (JP) .................. 2011-061843

(51) Int. Cl.
*H01L 31/0232*    (2006.01)
(52) U.S. Cl.
USPC ........... 257/432; 257/141; 257/431; 257/428; 257/458; 438/48; 438/57; 438/59; 438/69; 438/78
(58) Field of Classification Search
USPC .............. 438/48, 57, 59, 69, 72, 73, 74, 78; 257/414, 431, 432, 428, 436, 452, 443, 458
See application file for complete search history.

(56) References Cited

U.S. PATENT DOCUMENTS

| | | | | |
|---|---|---|---|---|
| 5,410,625 A | * | 4/1995 | Jenkins et al. | 385/28 |
| 5,640,474 A | * | 6/1997 | Tayag | 385/43 |
| 5,689,597 A | * | 11/1997 | Besse | 385/39 |
| 5,727,096 A | * | 3/1998 | Ghirardi et al. | 385/14 |
| 5,852,691 A | * | 12/1998 | Mackie | 385/39 |
| 6,205,163 B1 | * | 3/2001 | Hamamoto | 372/43.01 |
| 6,497,517 B1 | * | 12/2002 | Nakanishi et al. | 385/92 |
| 6,597,823 B2 | * | 7/2003 | Shimonaka et al. | 385/14 |

(Continued)

FOREIGN PATENT DOCUMENTS

| | | | |
|---|---|---|---|
| EP | 898346 A1 | * | 2/1999 |
| JP | 7-183484 | | 7/1995 |
| JP | 08201648 A | * | 8/1996 |
| JP | 9-311233 | | 12/1997 |
| JP | 2004-247620 A1 | | 9/2004 |
| JP | 2004247620 A | * | 9/2004 |

OTHER PUBLICATIONS

Soldano et al., Optical Multi-Mode Interference Devices Based on Self-Imaging: Principles and Applications, 1995, Journal of Lightwave Technology, vol. 13, No. 4, p. 615-627.*

(Continued)

*Primary Examiner* — Smith V. Zandra
*Assistant Examiner* — Sophia Nguyen
(74) *Attorney, Agent, or Firm* — Kratz, Quintos & Hanson, LLP

(57) ABSTRACT

A light receiving element includes a waveguide that includes a waveguide core, a multi-mode interference waveguide that has a width larger than a width of the waveguide, the multi-mode interference waveguide receiving a first light from the waveguide core at a first end, and a photodetection portion that includes a first semiconductor layer and an absorption layer disposed on the first semiconductor layer, the first semiconductor layer including at least one layer and receiving a second light from the multi-mode interference waveguide at a second end, the absorption layer being disposed above the first semiconductor layer and absorbing the second light. A distance from the first end of the multi-mode interference waveguide to the second end of the photodetection portion is longer than 70% of a first length and shorter than 100% of the first length, the first length being a length where self-imaging occurs in the multi-mode interference waveguide.

19 Claims, 40 Drawing Sheets

(56) References Cited

U.S. PATENT DOCUMENTS

| | | | |
|---|---|---|---|
| 6,710,378 B1 * | 3/2004 | Makiuchi et al. | 257/184 |
| 7,233,725 B2 * | 6/2007 | Zheng | 385/40 |
| 7,286,731 B2 * | 10/2007 | Yang | 385/27 |
| 2003/0152324 A1 * | 8/2003 | Betty et al. | 385/29 |
| 2003/0174954 A1 * | 9/2003 | Hamamoto et al. | 385/39 |
| 2009/0184383 A1 * | 7/2009 | Seeds et al. | 257/432 |
| 2009/0194837 A1 * | 8/2009 | Yamauchi et al. | 257/466 |
| 2010/0327385 A1 * | 12/2010 | Shiba et al. | 257/432 |
| 2011/0229072 A1 * | 9/2011 | Jeong | 385/14 |

OTHER PUBLICATIONS

L. Soldano, et al.; "Optical Multi-Mode Interference Devices Based on Self-Imaging: Principles and Applications;" Journal of Lightwave Technology; vol. 13; No. 4; Apr. 1995; pp. 615-627/p. 17 of specification.

* cited by examiner

100

700

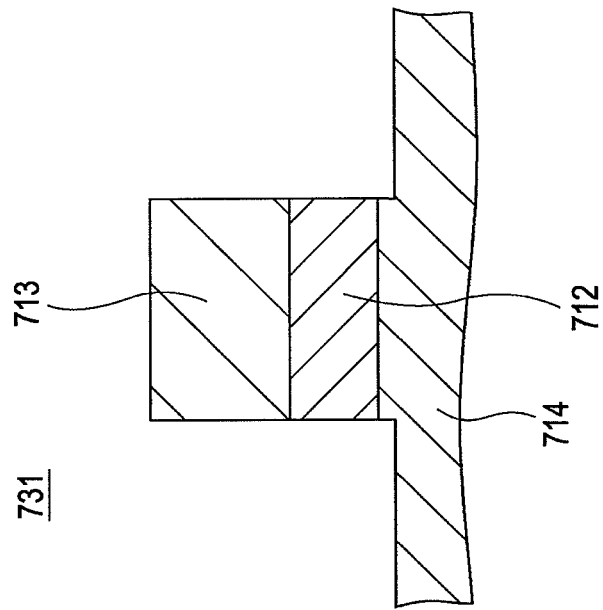
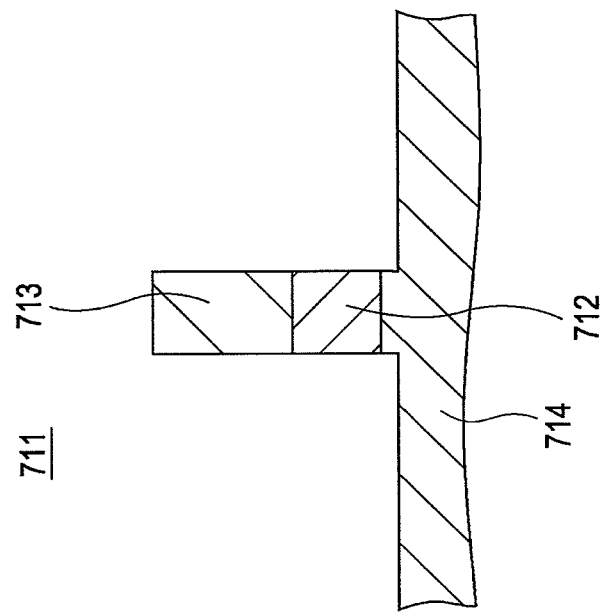

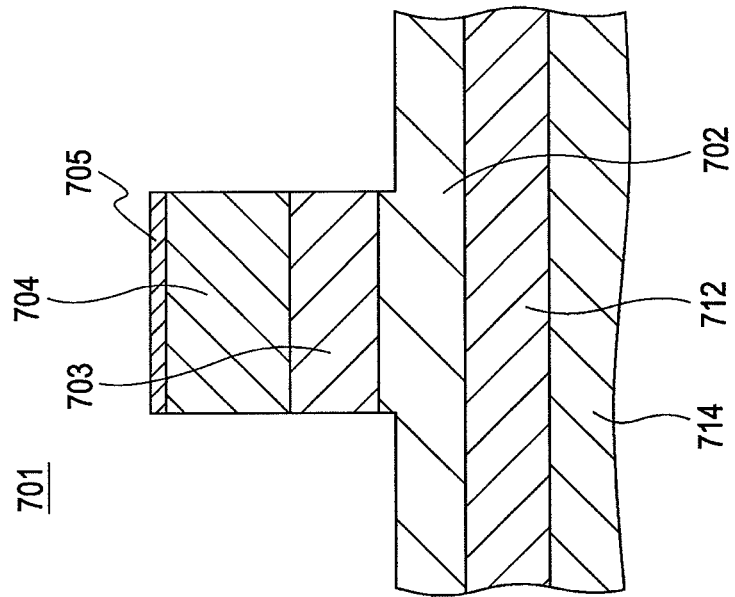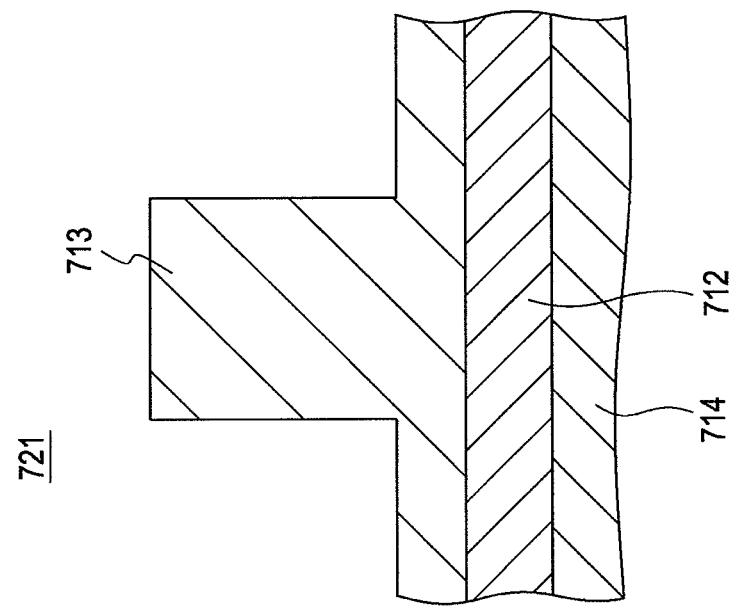

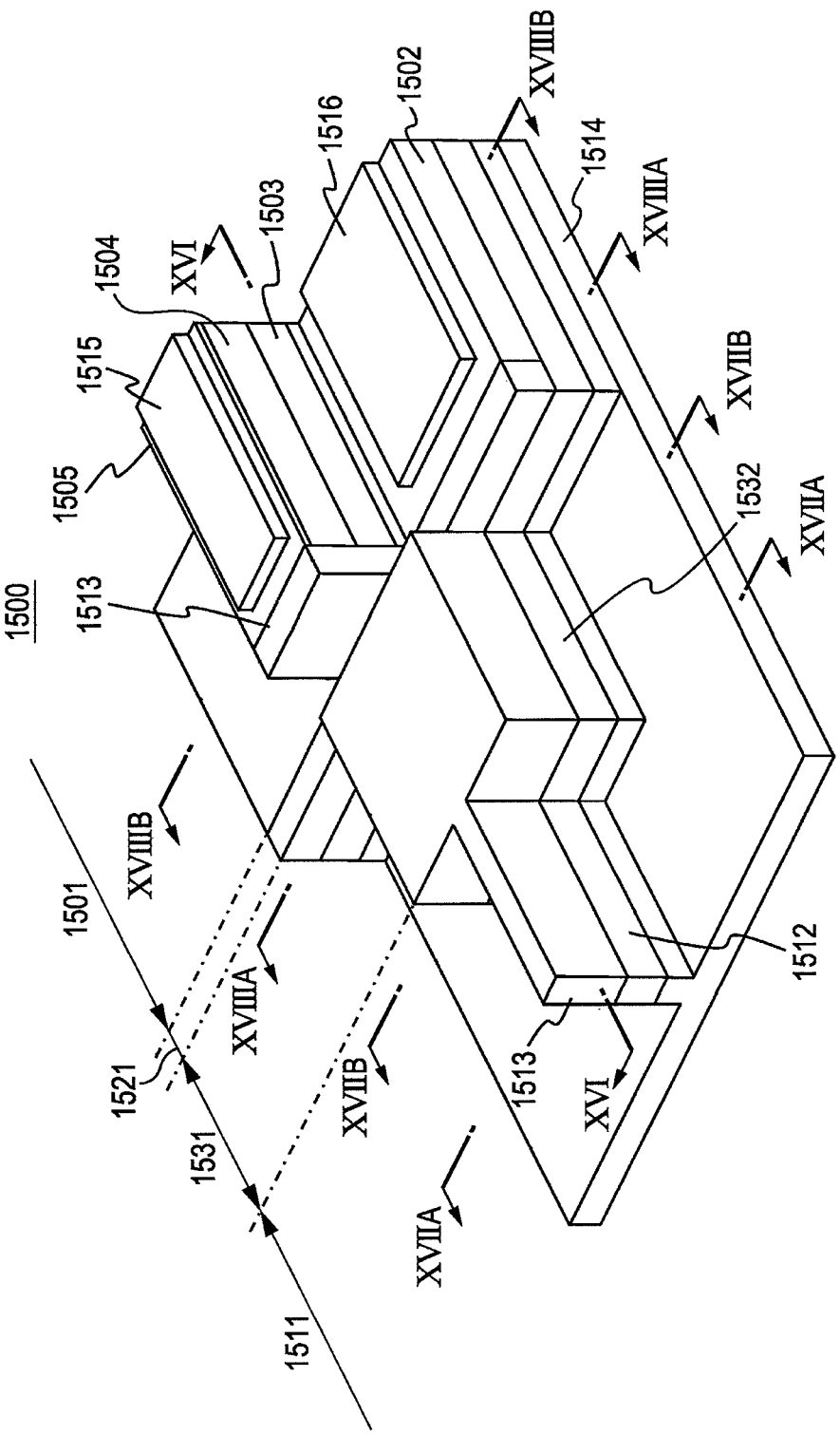

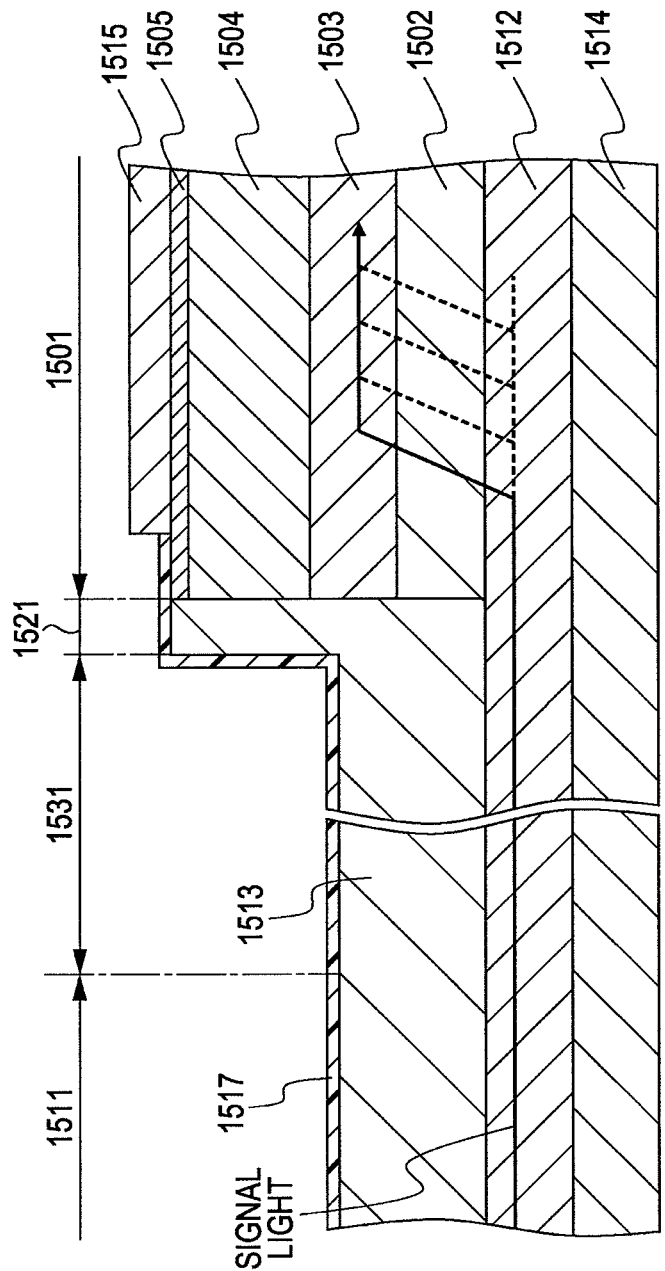

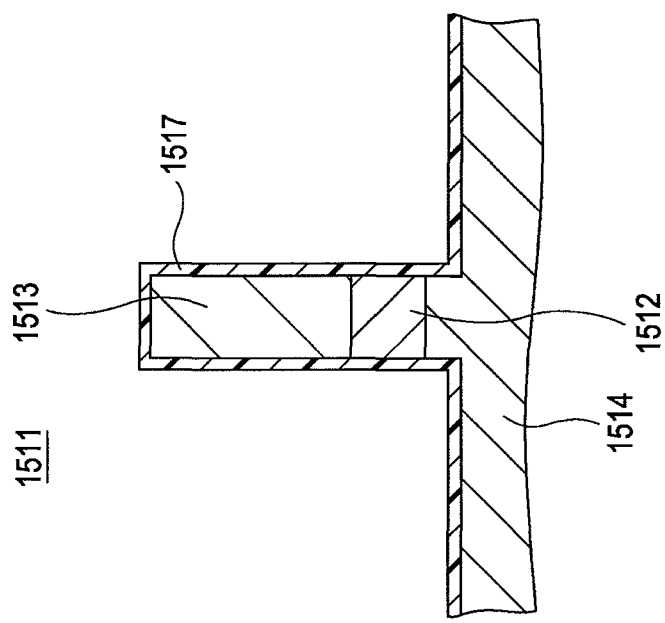
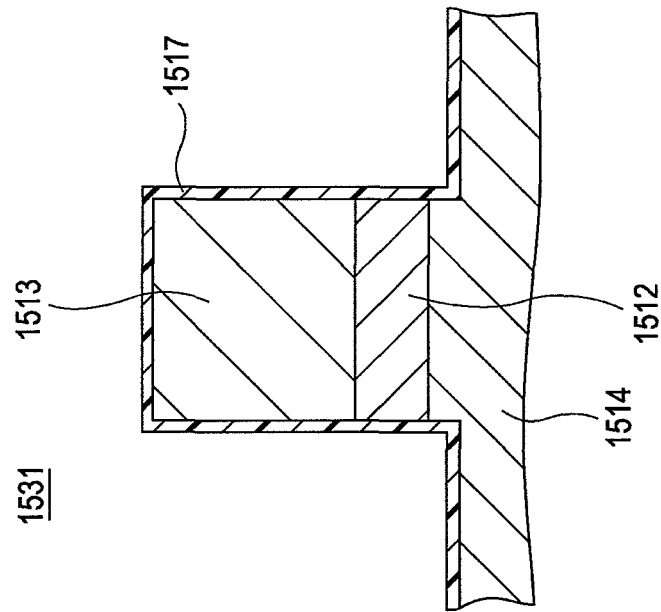

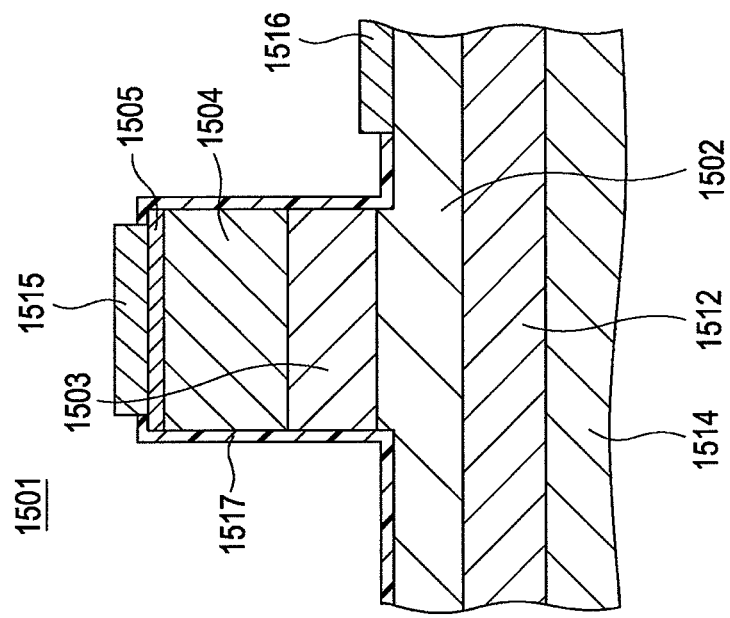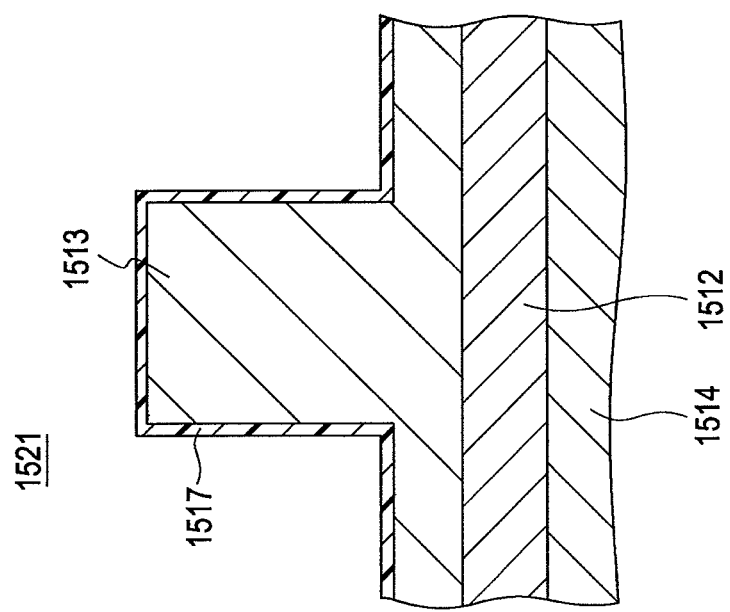

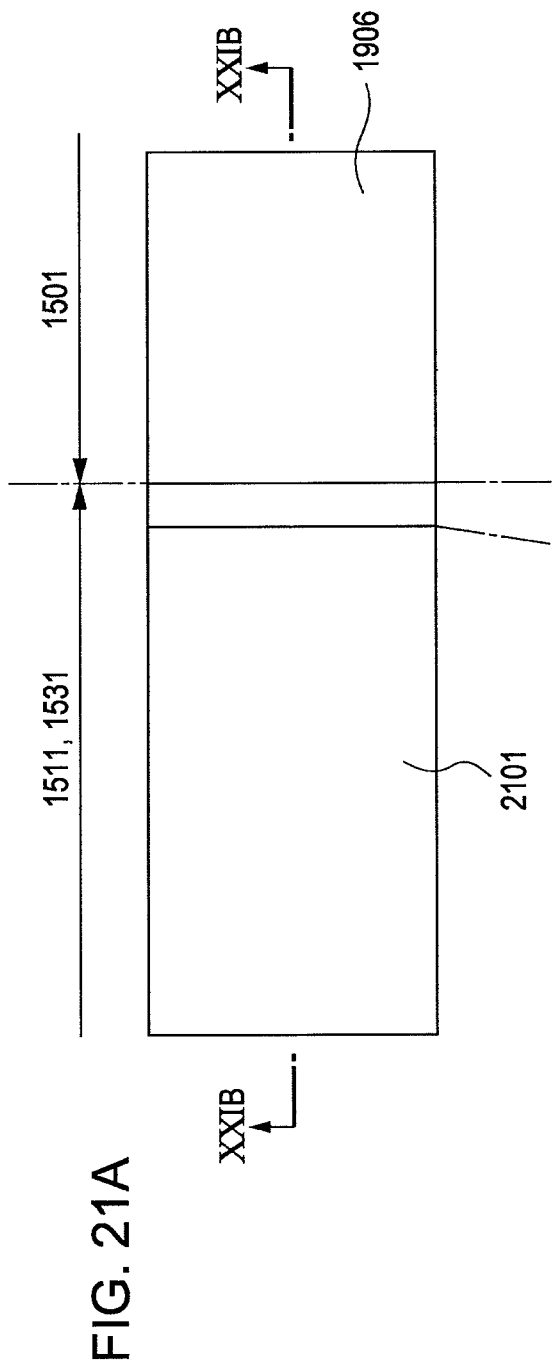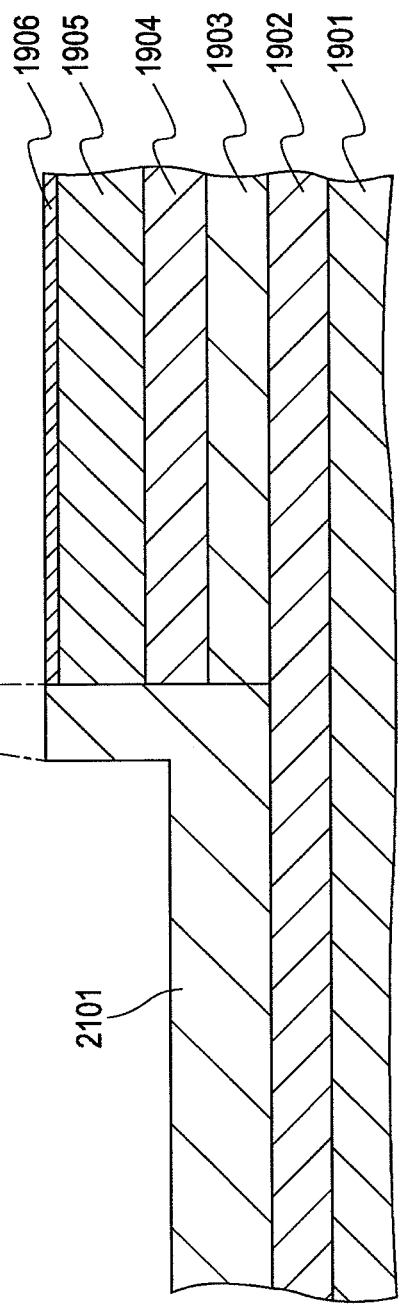
FIG. 21A
FIG. 21B

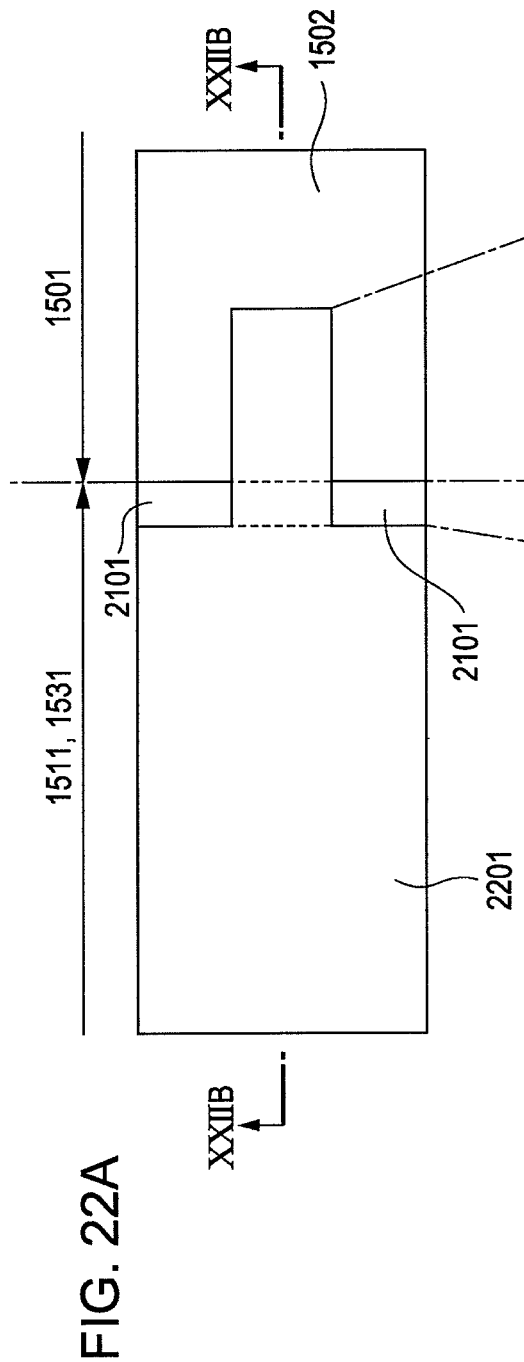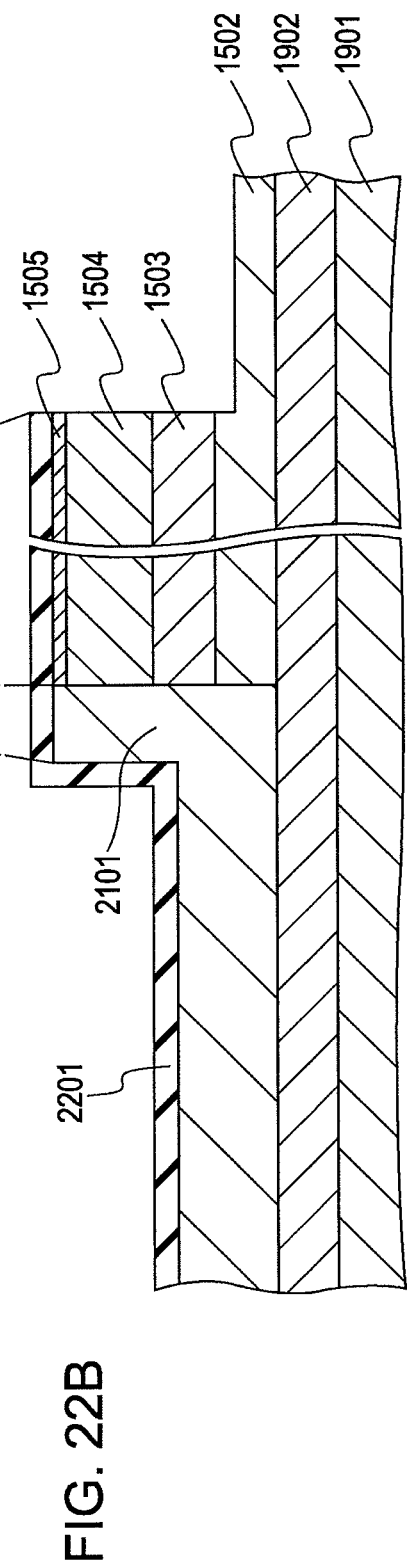
FIG. 22A
FIG. 22B

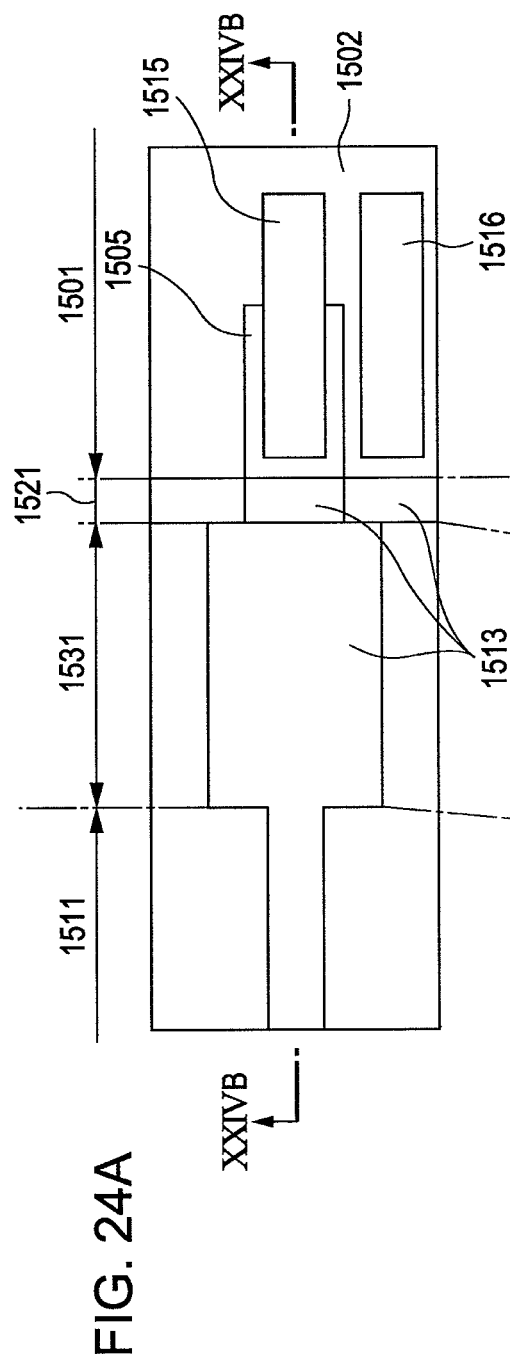
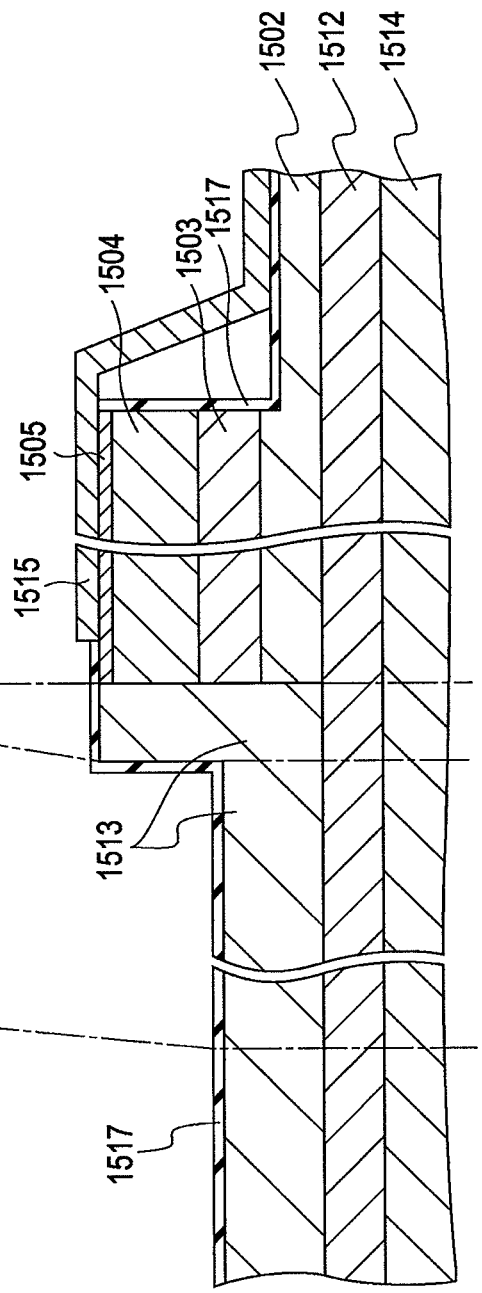
FIG. 24A
FIG. 24B

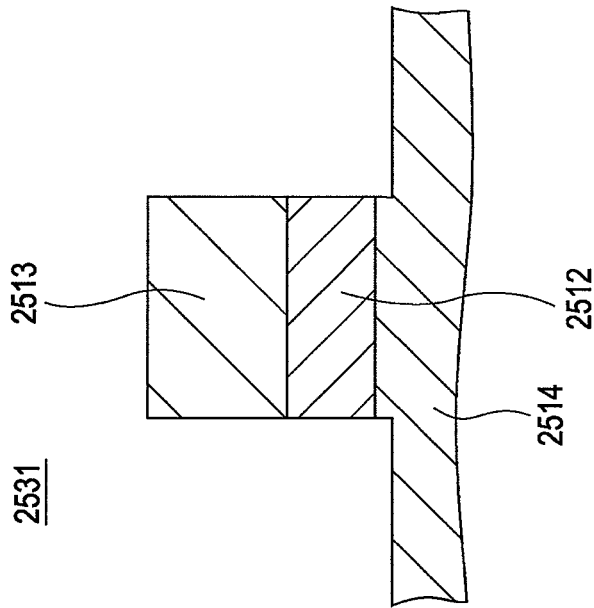
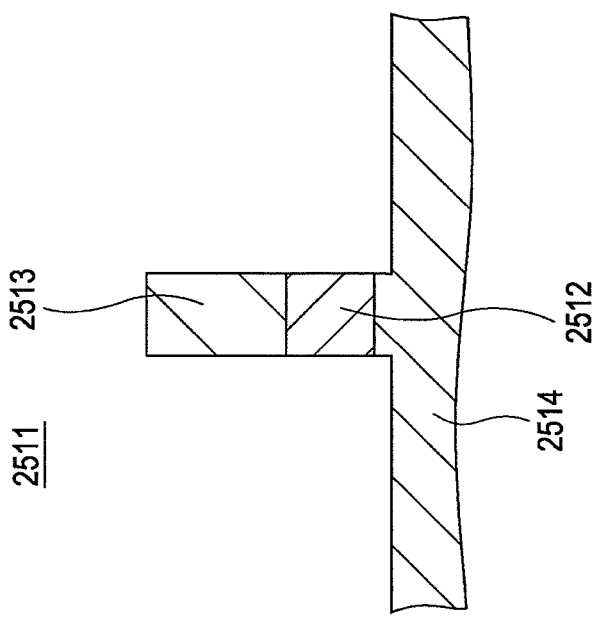

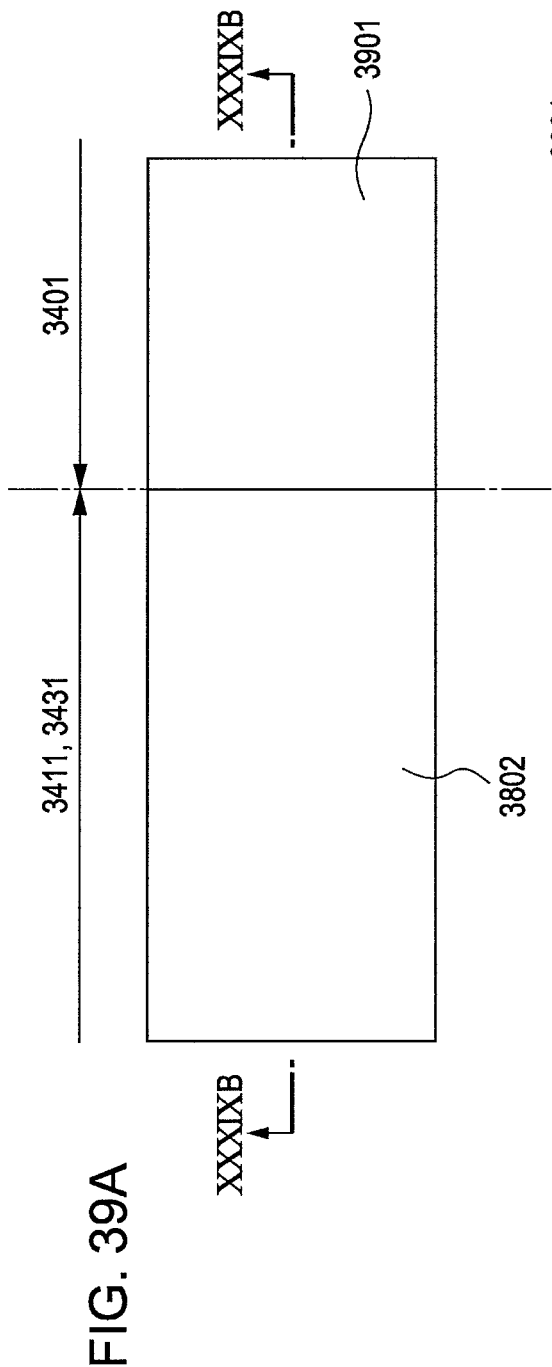
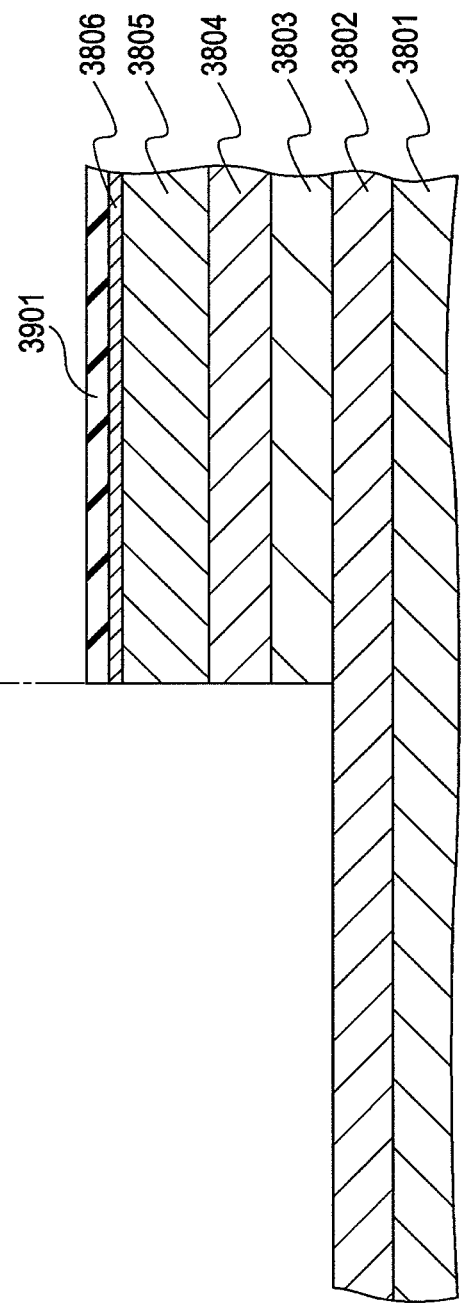
FIG. 39A
FIG. 39B

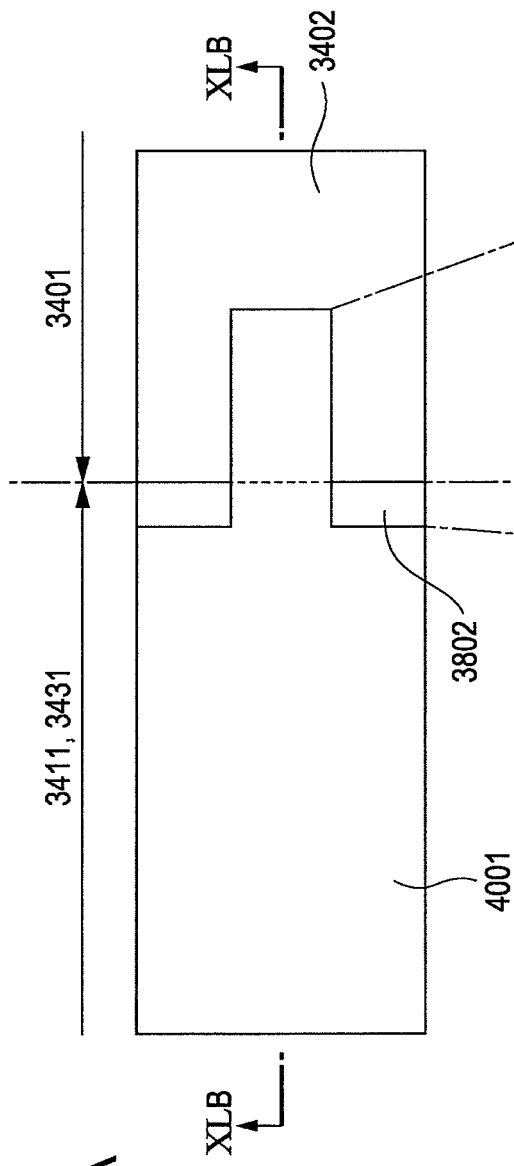
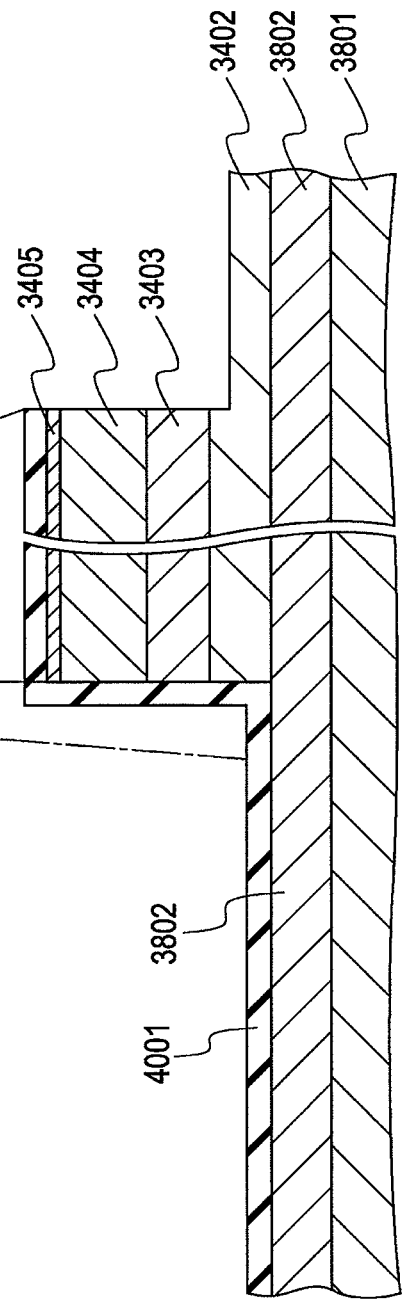
FIG. 40A
FIG. 40B

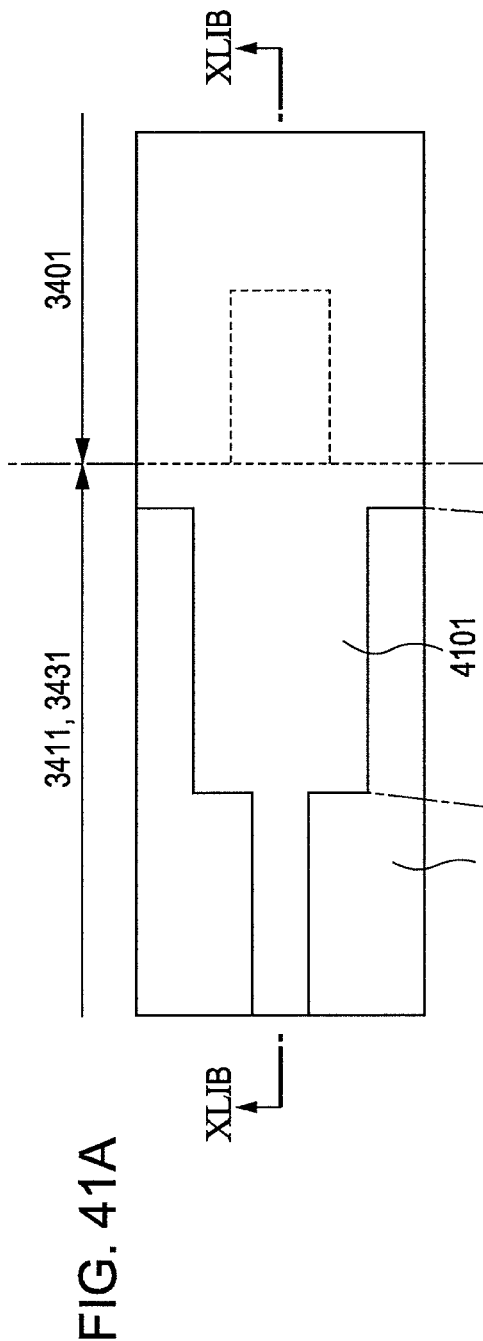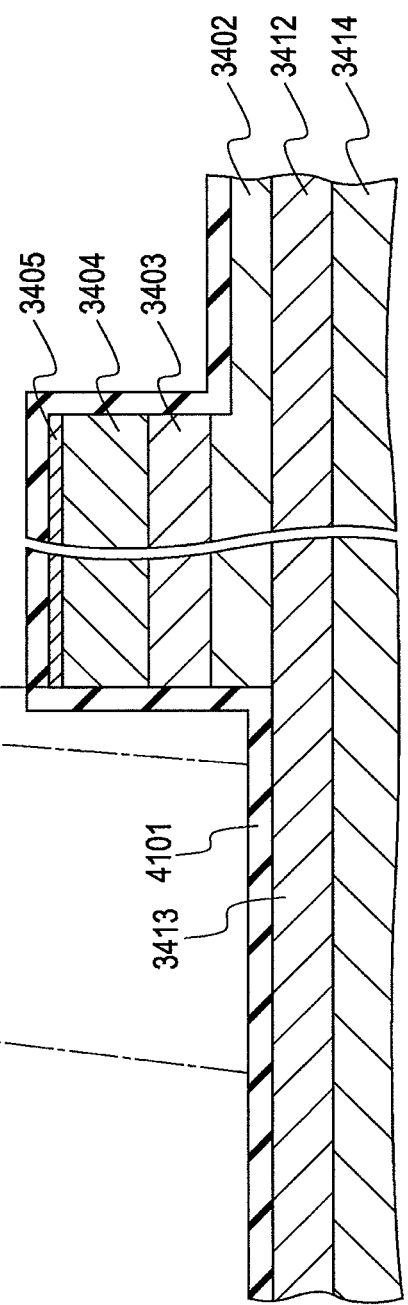
FIG. 41A
FIG. 41B

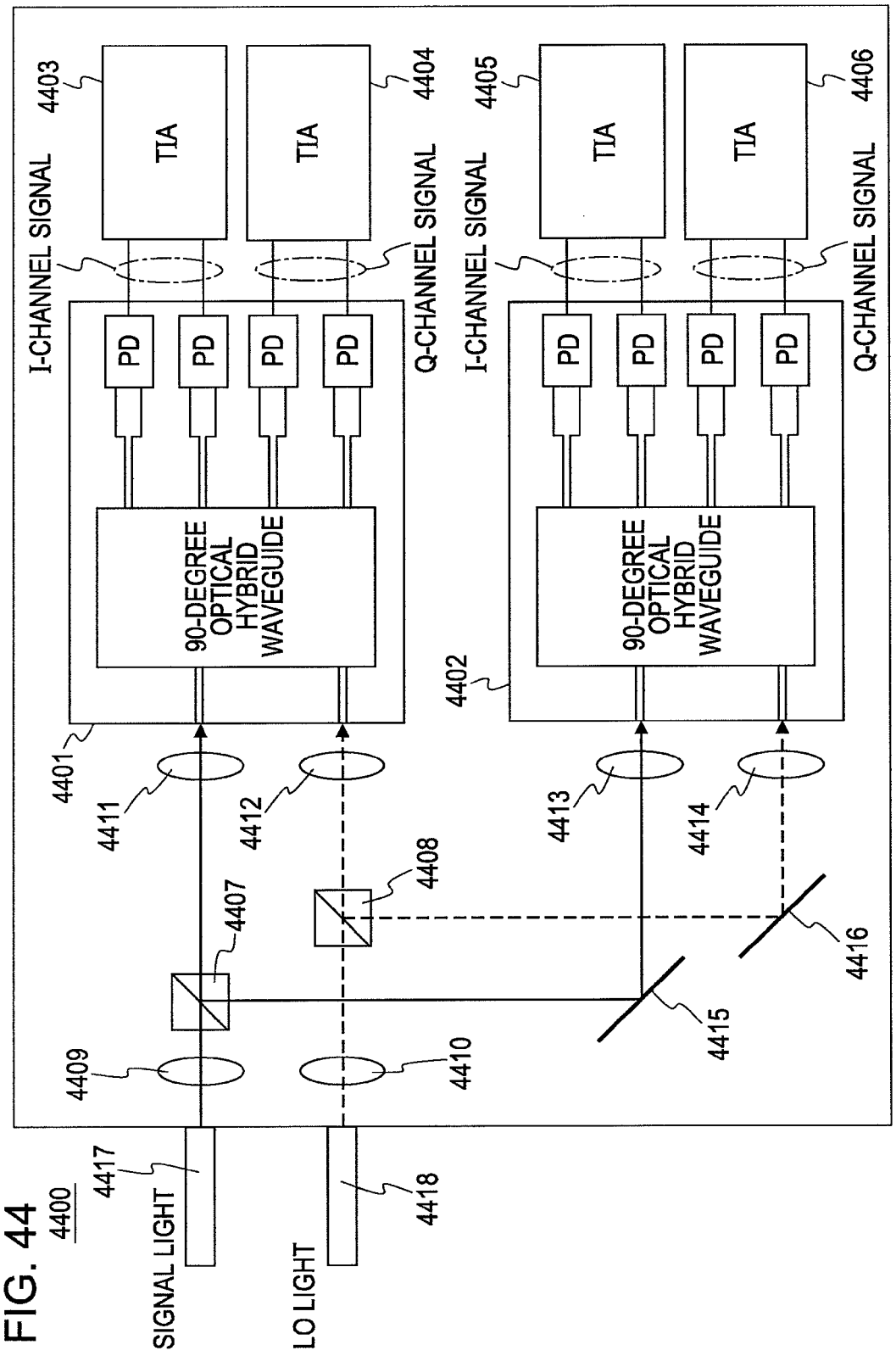

LIGHT RECEIVING ELEMENT, LIGHT RECEIVING DEVICE, AND LIGHT RECEIVING MODULE

CROSS-REFERENCE TO RELATED APPLICATION

This application is based upon and claims the benefit of priority of the prior Japanese Patent Applications No. 2011-061843, filed on Mar. 20, 2011, the entire contents of which are incorporated herein by reference.

FIELD

A technology disclosed in embodiments discussed herein is related to a light receiving element, a light receiving device, and a light receiving module.

BACKGROUND

FIG. 1 is a perspective view illustrating a main part of a light receiving element 100, which is an example of a light receiving element. FIG. 2 is a cross-sectional view of the light receiving element 100 taken along line II-II of FIG. 1.

The light receiving element 100 illustrated in FIGS. 1 and 2 includes a photodetection portion 101 disposed on a substrate 114 and a waveguide portion 111 disposed on the same substrate 114.

The waveguide portion 111 has a structure in which a waveguide core layer 112 and an upper clad layer 113 are stacked from the substrate 114 side. The waveguide portion 111 has a mesa structure including the upper clad layer 113 and the waveguide core layer 112. Signal light propagates in the waveguide core layer 112 and enters the photodetection portion 101.

The photodetection portion 101 has a structure in which the waveguide core layer 112, an n-type semiconductor layer 102, an i-type absorption layer 103, a p-type upper clad layer 104, and a p-type contact layer 105 are stacked from the substrate 114 side. The photodetection portion 101 has a mesa structure including the p-type contact layer 105, the upper clad layer 104, the i-type absorption layer 103, and part of the n-type semiconductor layer 102. The width of the mesa structure in the photodetection portion 101 is larger than the width of the mesa structure in the waveguide portion 111. In this specification, the width is a length in the direction orthogonal to the direction in which a corresponding waveguide core layer extends, that is, the direction orthogonal to a signal light travel direction, and is a length in the direction parallel to a substrate. The photodetection portion 101 has a stacked structure including the waveguide core layer 112 and the n-type semiconductor layer 102 outside the mesa structure. The waveguide core layer 112 is shared by the photodetection portion 101 and the waveguide portion 111.

As illustrated in FIG. 2, in the light receiving element 100, signal light propagates in the waveguide core layer 112 in the waveguide portion 111, and enters the waveguide core layer 112 in the photodetection portion 101. The signal light then diffuses into the i-type absorption layer 103 via the n-type semiconductor layer 102, which is so-called a spacer layer, and is absorbed by the i-type absorption layer 103.

The n-type semiconductor layer 102, the i-type absorption layer 103, and the upper clad layer 104 form a PIN-type photodiode (PD). A p-side electrode and an n-side electrode (not illustrated) are connected to the p-type contact layer 105 and the n-type semiconductor layer 102, respectively. A certain voltage for causing the p-side electrode to be at a negative potential and the n-side electrode to be at a positive potential is applied between the p-side electrode and the n-side electrode. Accordingly, photocarriers (holes and electrons) generated through light absorption in the i-type absorption layer 103 are detected via the upper clad layer 104 and the n-type semiconductor layer 102. Accordingly, the photodetection portion 101 detects signal light as an electric signal (photocarrier current), and outputs a detection signal (photocarrier current) corresponding to the intensity of the signal light.

FIG. 3 is a perspective view illustrating a main part of a light receiving element 300, which is another example of a light receiving element. FIG. 4 is a cross-sectional view of the light receiving element 300 taken along line VI-VI of FIG. 3. The light receiving element 300 illustrated in FIGS. 3 and 4 is different from the light receiving element 100 illustrated in FIGS. 1 and 2 in that a slab region exists between a waveguide portion and a photodetection portion. Other than that point, the light receiving element 300 is similar to the light receiving element 100.

The light receiving element 300 includes a photodetection portion 301 disposed on a substrate 314 and a waveguide portion 311 disposed on the same substrate 314. Furthermore, the light receiving element 300 includes a slab region 321 on the substrate 314 between the waveguide portion 311 and the photodetection portion 301.

The waveguide portion 311 has a structure in which a waveguide core layer 312 and an upper clad layer 313 are stacked from the substrate 314 side. The waveguide portion 311 has a mesa structure including the upper clad layer 313 and the waveguide core layer 312. Signal light propagates in the waveguide core layer 312 and enters the slab region 321.

The photodetection portion 301 has a structure in which the waveguide core layer 312, an n-type semiconductor layer 302, an i-type absorption layer 303, a p-type upper clad layer 304, and a p-type contact layer 305 are stacked from the substrate 314 side. The photodetection portion 301 has a mesa structure including the p-type contact layer 305, the upper clad layer 304, the i-type absorption layer 303, and part of the n-type semiconductor layer 302. The width of the mesa structure in the photodetection portion 301 is larger than the width of the mesa structure in the waveguide portion 311. The photodetection portion 301 has a stacked structure including the waveguide core layer 312 and the n-type semiconductor layer 302 outside the mesa structure.

The slab region 321 includes the waveguide core layer 312 and the upper clad layer 313. Part of the upper clad layer 313 in the slab region 321 forms a mesa structure of a shape similar to that of the mesa structure in the photodetection portion 301. The width of the mesa structure in the slab region 321 is substantially the same as the width of the mesa structure in the photodetection portion 301. Signal light that has entered the slab region 321 propagates in the waveguide core layer 312 and enters the photodetection portion 301. The slab region 321 is generated as a result of taking measures for addressing a positioning error of a mask during photoresist exposure in a process of fabricating the photodetection portion 301.

As illustrated in FIG. 4, in the light receiving element 300, signal light propagates in the waveguide core layer 312 in the waveguide portion 311 and the slab region 321, and enters the waveguide core layer 321 in the photodetection portion 301. The signal light then diffuses into the i-type absorption layer 303 via the n-type semiconductor layer 302, and is absorbed by the i-type absorption layer 303.

The n-type semiconductor layer 302, the i-type absorption layer 303, and the upper clad layer 304 form a PIN-type PD. A p-side electrode and an n-side electrode (not illustrated) are connected to the p-type contact layer 305 and the n-type semiconductor layer 302, respectively. A certain voltage for causing the p-side electrode to be at a negative potential and the n-side electrode to be at a positive potential is applied between the p-side electrode and the n-side electrode. Accordingly, photocarriers (holes and electrons) generated through light absorption in the i-type absorption layer 303 are detected via the upper clad layer 304 and the n-type semiconductor layer 302. Accordingly, the photodetection portion 301 detects signal light as an electric signal (photocarrier current), and outputs a detection signal (photocarrier current) corresponding to the intensity of the signal light.

An example of the two light receiving elements illustrated in FIGS. 1 to 4 is disclosed in Japanese Laid-open Patent Publication No. 07-183484.

FIG. 5 illustrates a light intensity distribution of signal light in the light receiving element 100 illustrated in FIGS. 1 and 2. Referring to FIG. 5, solid lines represent the shape of the waveguide core layer 112 viewed from the upper side of the substrate 114. Dotted-chain lines represent the shape of the i-type absorption layer 103 viewed from the upper side of the substrate 114. Broken lines represent an example of a light intensity distribution of signal light. Arrows indicate radiation directions of signal light.

As described above, in the light receiving element 100, the n-side electrode (not illustrated) is connected to the n-type semiconductor layer 102. Thus, the width of the n-type semiconductor layer 102 is larger than the width of the i-type absorption layer 103 by at least a connection region for the n-side electrode. Accordingly, the width of the waveguide core layer 112 is larger than the width of the i-type absorption layer 103. In contrast, the width of the waveguide core layer 112 in the waveguide portion 111 is smaller than the width of the i-type absorption layer 103. As a result, signal light enters from the waveguide portion 111 having a small width into the photodetection portion 101 having a sufficiently large width.

The waveguide portion 111 has a mesa structure of a small width, and thus has a strong light confinement effect of confining signal light in the direction orthogonal to the signal light travel directions. In contrast, in the photodetection portion 101, an effect of confining incident signal light in the direction orthogonal to the signal light travel direction is obtained by only the i-type absorption layer 103, which is a part of the mesa structure, and a portion including a small protrusion of the n-type semiconductor layer 102 under the i-type absorption layer 103. Thus, the light confinement effect is weak.

In the above-described structure, signal light enters from the waveguide portion 111 having a small width and a strong light confinement effect into the photodetection portion 101 having a large width and a weak light confinement effect. In this case, after signal light has entered the photodetection portion 101, the light intensity distribution of the signal light expands in the direction orthogonal to the signal light travel direction. However, the photodetection portion 101 has low ability of suppressing the expansion.

Therefore, in the light receiving element 100, the light intensity distribution of signal light expands in the direction orthogonal to the signal light travel direction when the signal light propagates in the photodetection portion 101, as illustrated in FIG. 5. The radiation direction of the signal light is a direction in which the signal light diffuses in the direction orthogonal to the signal light travel direction, as indicated by the arrows in FIG. 5. That is, the signal light propagates in a diffusion direction.

As a result, part of incident signal light in the waveguide core layer 112 radiates to a region outside the i-type absorption layer 103, not to a region below the i-type absorption layer 103. The signal light radiated to a region outside the i-type absorption layer 103 is not absorbed by the i-type absorption layer 103. Thus, in the light receiving element 100, light absorption efficiency for incident signal light is not sufficiently increased.

FIG. 6 illustrates a light intensity distribution of signal light in the light receiving element 300 illustrated in FIGS. 3 and 4. Referring to FIG. 6, solid lines represent the shape of the waveguide core layer 312 viewed from the upper side of the substrate 314. Dotted-chain lines represent the shape of the i-type absorption layer 303 viewed from the upper side of the substrate 314. Broken lines represent an example of a light intensity distribution of signal light. Arrows indicate radiation directions of signal light.

As described above, the light receiving element 300 includes the slab region 321 between the waveguide portion 311 and the photodetection portion 301, in addition to the structure of the light receiving element 100. The width of the waveguide core layer 312 in the slab region 321 is large, like the width of the waveguide core layer 312 in the photodetection portion 301. Thus, as in the light receiving element 100, signal light enters from the waveguide portion 311 having a small width into the slab region 321 having a sufficiently large width.

Like the waveguide portion 111, the waveguide portion 311 has a strong light confinement effect of confining signal light in the direction orthogonal to the signal light travel direction. In contrast, the photodetection portion 301 has a weak light confinement effect, like the photodetection portion 101.

Furthermore, in the slab region 321, only the upper clad layer 313 exists on the waveguide core layer 312. Thus, an element for confining signal light that has entered from the waveguide portion 311 in the direction orthogonal to the signal light travel direction hardly exists in the slab region 321. Therefore, the light confinement effect of the slab region 321 is weaker than that of the photodetection portion 301.

In the light receiving element 300, signal light enters from the waveguide portion 311 having a small width and a strong light confinement effect into the slab region 321 having a sufficiently large width and a light confinement effect weaker than that of the photodetection portion 301. In this case, after signal light has entered the slab region 321, the light intensity distribution of the signal light expands in the direction orthogonal to the signal light travel direction. However, the slab region 321 has lower ability of suppressing the expansion than the photodetection portion 301.

Therefore, in the light receiving element 300, the light intensity distribution of signal light expands in the direction orthogonal to the signal light travel direction when the signal light propagates in the slab region 321 and the photodetection portion 301, as illustrated in FIG. 6. The radiation direction of the signal light is a direction in which the signal light diffuses more significantly in the direction orthogonal to the signal light travel direction than in the light receiving element 100 (the light intensity distribution in FIG. 5). That is, the signal light propagates more significantly in the diffusion direction. When the propagation distance is the same, the range of the light intensity distribution of the signal light is wider.

As a result, in the light receiving element 300, a larger part of incident signal light in the waveguide core layer 312 radiates to a region outside the i-type absorption layer 303, not to a region below the i-type absorption layer 303, compared to the light receiving element 100. The signal light radiated to the region outside the i-type absorption layer 303 is not absorbed by the i-type absorption layer 303. Thus, in the light receiving element 300, it is more difficult to increase light absorption efficiency for incident signal light than in the light receiving element 100.

SUMMARY

According to an aspect of the embodiments, a light receiving element includes a waveguide that includes a waveguide core, a multi-mode interference waveguide that has a width larger than a width of the waveguide, the multi-mode interference waveguide being configured to receive a first light from the waveguide core at a first end, and a photodetection portion that includes a first semiconductor layer and an absorption layer disposed on the first semiconductor layer, the first semiconductor layer including at least one layer and being configured to receive a second light from the multi-mode interference waveguide at a second end, the absorption layer being disposed above the first semiconductor layer and being configured to absorb the second light. In addition, a distance from the first end of the multi-mode interference waveguide to the second end of the photodetection portion is longer than (N−0.3)×100% of a first length and shorter than N×100% of the first length, the first length being the shortest length where self-imaging occurs in the multi-mode interference waveguide, N being a natural number.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 9A is a cross-sectional view of the light receiving element taken along line IXA-IXA of FIG. 7;

FIG. 9B is a cross-sectional view of the light receiving element taken along line IXB-IXB of FIG. 7;

FIG. 10A is a cross-sectional view of the light receiving element taken along line XA-XA of FIG. 7;

FIG. 10B is a cross-sectional view of the light receiving element taken along line XB-XB of FIG. 7;

FIG. 15 is a perspective view illustrating an example of the structure of a light receiving element, and illustrates only a main part of the light receiving element;

FIG. 16 is a cross-sectional view of the light receiving element taken along line XVI-XVI of FIG. 15;

FIG. 17A is a cross-sectional view of the light receiving element taken along line XVIIA-XVIIA of FIG. 15;

FIG. 17B is a cross-sectional view of the light receiving element taken along line XVIIB-XVIIB of FIG. 15;

FIG. 18A is a cross-sectional view of the light receiving element taken along line XVIIIA-XVIIIA of FIG. 15;

FIG. 18B is a cross-sectional view of the light receiving element taken along line XVIIIB-XVIIIB of FIG. 15;

FIG. 21A is a plan view illustrating the example of a process of manufacturing the light receiving element illustrated in FIGS. 15 to 18B;

FIG. 21B is a cross-sectional view taken along line XXIB-XXIB of FIG. 21A;

FIG. 22A is a plan view illustrating the example of a process of manufacturing the light receiving element illustrated in FIGS. 15 to 18B;

FIG. 22B is a cross-sectional view taken along line XXIIB-XXIIB of FIG. 22A;

FIG. 24A is a plan view illustrating the example of a process of manufacturing the light receiving element illustrated in FIGS. 15 to 18B;

FIG. 24B is a cross-sectional view taken along line XXIVB-XXIVB of FIG. 24A;

FIG. 27A is a cross-sectional view of the light receiving element taken along line XXVIIA-XXVIIA of FIG. 25;

FIG. 27B is a cross-sectional view of the light receiving element taken along line XXVIIB-XXVIIB of FIG. 25;

FIG. 39A is a plan view illustrating an example of the process of manufacturing the light receiving element illustrated in FIGS. 34 to 37B;

FIG. 39B is a cross-sectional view taken along line XXXIXB-XXXIXB of FIG. 39A;

FIG. 40A is a plan view illustrating an example of the process of manufacturing the light receiving element illustrated in FIGS. 34 to 37B;

FIG. 40B is a cross-sectional view taken along line XLB-XLB of FIG. 40A;

FIG. 41A is a plan view illustrating an example of the process of manufacturing the light receiving element illustrated in FIGS. 34 to 37B;

FIG. 41B is a cross-sectional view taken along line XLIB-XLIB of FIG. 41A;

FIG. 44 illustrates an example of the configuration of a light receiving module according to a sixth embodiment.

DESCRIPTION OF EMBODIMENTS

Hereinafter, embodiments will be described.

1. First Embodiment 1-1. Structure of Light Receiving Element 700

Figure 7:
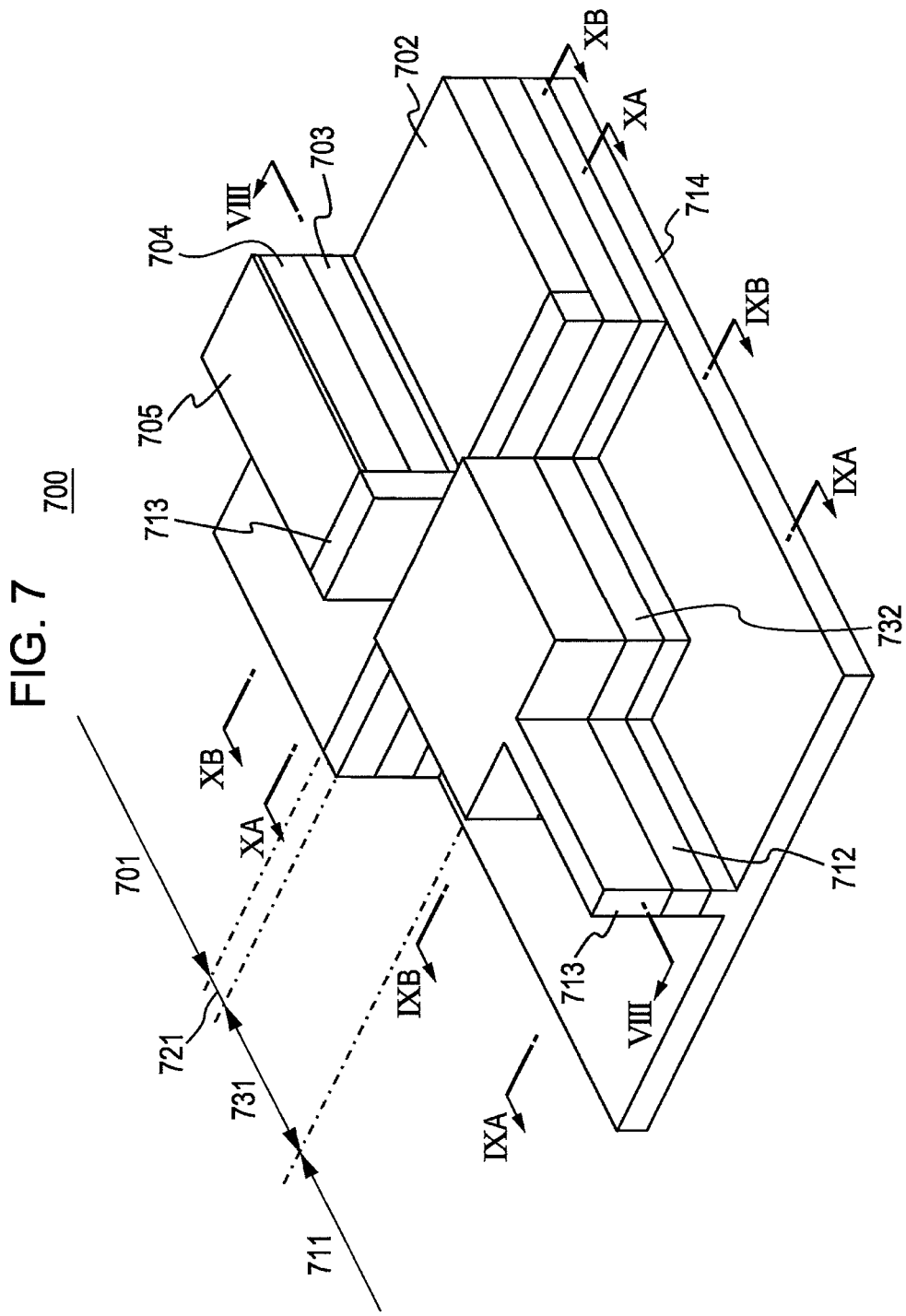
FIG. 7 is a perspective view illustrating an example of the structure of a light receiving element according to a first embodiment, and illustrates only a main part of the light receiving element.
Figure 8:
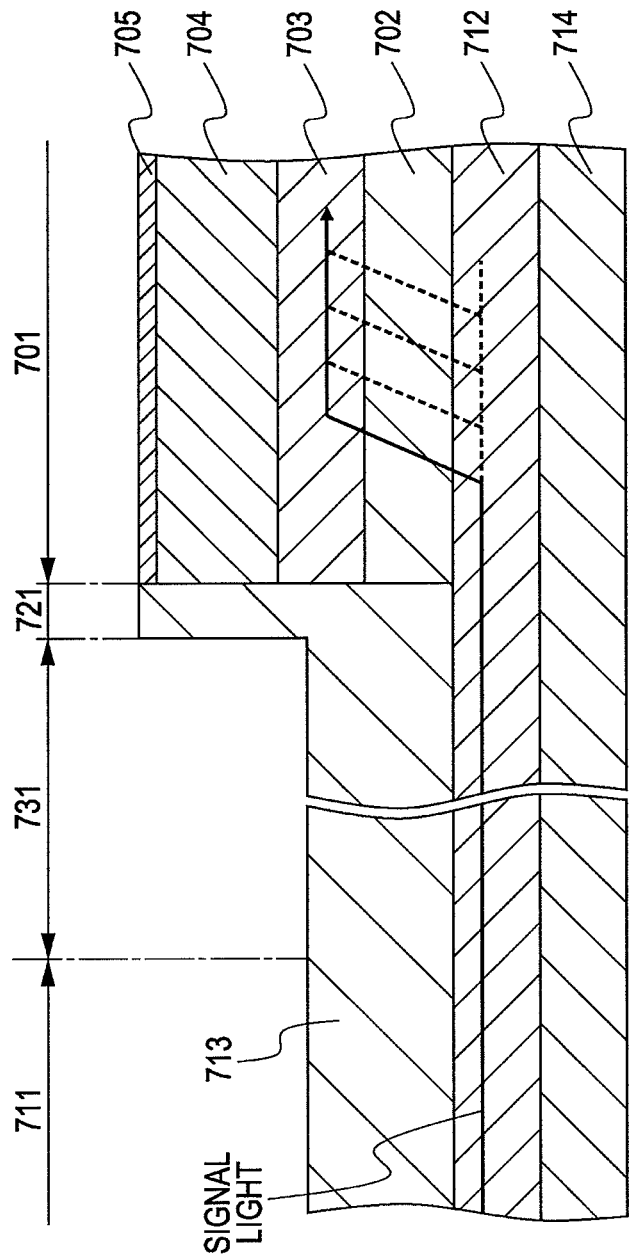
FIG. 8 is a cross-sectional view of the light receiving element taken along line VIII-VIII of FIG. 7.

FIG. 7 is a perspective view illustrating an example of the structure of a light receiving element 700 according to a first embodiment, and illustrates only a main part of the light receiving element 700. FIG. 8 is a cross-sectional view of the light receiving element 700 taken along line VIII-VIII of FIG. 7. FIG. 9A is a cross-sectional view of the light receiving element 700 taken along line IXA-IXA of FIG. 7. FIG. 9B is a cross-sectional view of the light receiving element 700 taken along line IXB-IXB of FIG. 7. FIG. 10A is a cross-sectional view of the light receiving element 700 taken along line XA-XA of FIG. 7. FIG. 10B is a cross-sectional view of the light receiving element 700 taken along line XB-XB of FIG. 7.

In this specification, regarding a surface of a substrate on which the structure of a light receiving element is disposed, a direction away from the surface of the substrate is referred to as "on" or "above", and a direction of getting closer to the surface of the substrate is referred to as "below" or "under".

As illustrated in FIGS. 7 and 8, the light receiving element 700 includes a photodetection portion 701 disposed on a substrate 714, a waveguide portion 711 disposed on the same substrate 714, a slab region 721 disposed on the same substrate 714, and a multi-mode interference (MMI) portion 731 disposed on the same substrate 714.

As illustrated in FIG. 9A, the waveguide portion 711 has a structure in which a waveguide core layer 712 and an upper clad layer 713 are stacked from the substrate 714 side. The material of the individual layers in the stacked structure is a semiconductor material, for example. The waveguide portion 711 has a mesa structure including the upper clad layer 713 and the waveguide core layer 712. Signal light propagates in the waveguide core layer 712 and enters the MMI portion 731.

As illustrated in FIG. 10B, the photodetection portion 701 has a structure in which the waveguide core layer 712, an n-type semiconductor layer 701, an i-type absorption layer 703, a p-type upper clad layer 704, and a p-type contact layer 705 are stacked from the substrate 714 side. The material of the individual layers in the stacked structure is a semiconductor material, for example. The photodetection portion 701 has a mesa structure including the p-type contact layer 705, the upper clad layer 704, the i-type absorption layer 703, and part of the n-type semiconductor layer 702. The width of the mesa structure in the photodetection portion 701 is larger than the width of the mesa structure in the waveguide portion 711. The photodetection portion 701 has a stacked structure including the waveguide core layer 712 and the n-type semiconductor layer 702 outside the mesa structure. The n-type semiconductor layer 702, the i-type absorption layer 703, and the upper clad layer 704 form a PIN-type photodiode (PD).

The n-type semiconductor layer 702 has a refractive index which is higher than a refractive index of the waveguide core layer 712 and which is lower than a refractive index of the i-type absorption layer 703. That is, the n-type semiconductor layer 702 has a band gap wavelength which is longer than the band gap wavelength of the waveguide core layer 712 and which is shorter than the band gap wavelength of the i-type absorption layer 703. The n-type semiconductor layer 702 has a composition in which the absorptance with respect to signal light is sufficiently low.

As illustrated in FIG. 10A, the slab region 721 includes the waveguide core layer 712 and the upper clad layer 713. In the slab region 721, part of the upper clad layer 713 forms a mesa structure having a shape similar to that of the mesa structure in the photodetection portion 701. Unlike the photodetection portion 701, the slab region 721 includes the waveguide core layer 712 which is slab-shaped (flat), but does not have a mesa structure including an i-type absorption layer and an n-type semiconductor layer. The width of the mesa structure in the slab region 721 is substantially the same as the width of the mesa structure in the photodetection portion 701. Signal light that has entered the slab region 721 propagates in the waveguide core layer 712 and enters the photodetection portion 701.

The slab region 721 is generated as a result of providing a margin region at the time of forming a hard mask for forming the mesa structure in the photodetection portion 701 in order to address a positioning error of a mask during photoresist exposure in the process of fabricating the photodetection portion 701, for example. Details will be given below.

As illustrated in FIG. 9B, the MMI portion 731 has a structure in which the waveguide core layer 712 and the upper clad layer 713 are stacked from the substrate 714 side. The material of the individual layers in the stacked structure is a semiconductor material, for example. The MMI portion 731 has a mesa structure including the upper clad layer 713 and the waveguide core layer 712. Signal light that has entered the MMI portion 731 propagates in the waveguide core layer 712 and enters the slab region 721. The waveguide core layer 712 is shared by the photodetection portion 701, the waveguide portion 711, the slab region 721, and the MMI portion 731.

The MMI portion 731 includes a 1×1 MMI waveguide 732 including one input and one output. At least part of the waveguide core layer 712 in the MMI portion 731 has a width larger than the width of the waveguide core layer 712 in the waveguide portion 711. The large-width portion of the waveguide core layer 712 functions as the MMI waveguide 732. The width of the MMI waveguide 732 is larger than the width of the mesa structure in each of the waveguide portion 711 and the photodetection portion 701.

It is known that, in an MMI waveguide, a phenomenon called self-imaging occurs as a result of appropriately setting parameters of the MMI waveguide, such as width, length, and refractive index. In self-imaging, a light intensity distribution in an input portion of the MMI waveguide is reproduced in an output portion thereof. The length Lmmi of the MMI waveguide 732 is set so that a point at which self-imaging in the MMI waveguide 732 occurs (self-imaging point) is positioned in the photodetection portion 701, particularly in a region below the i-type absorption layer 703 in the waveguide core layer 712. More specifically, the length Lmmi of the MMI waveguide 732 is set so that the distance from an end of the MMI waveguide 732 on the side where signal light enters (input portion) to an end of the photodetection portion 701 on the side where signal light enters (incident end) is longer than 70% of a length Lsi at which self-imaging occurs in the MMI waveguide 732 and is shorter than 100% of the length Lsi. Likewise, the length Lmmi of the MMI waveguide is set so that the distance from an end of the MMI waveguide on the side where signal light enters (input portion) to an end of the photodetection portion on the side where signal light enters (incident end) is longer than (N−0.3)×100% of the length Lsi_min at which self-imaging occurs in the MMI waveguide and shorter than N×100% of the length Lsi_min. The length Lsi_min is the shortest length where self-imaging occurs in the MMI waveguide, and N is a natural number. Self-imaging in the MMI waveguide 732 and setting of the length Lmmi of the MMI waveguide 732 will be described below.

As illustrated in FIG. 8, in the light receiving element 700, signal light propagates in the waveguide core layer 712 in the waveguide portion 711, and enters the MMI waveguide 732 in the MMI portion 731. As will be described below, the MMI waveguide 732 converges, at its output portion, signal light in the direction orthogonal to the signal light travel direction. Accordingly, the converged signal light enters the waveguide core layer 712 in the photodetection portion 701 via the waveguide core layer 712 in the slab region 721. The signal light then diffuses into the i-type absorption layer 703 from the waveguide core layer 712 via the n-type semiconductor layer 702, and is absorbed by the i-type absorption layer 703.

A p-side electrode and an n-side electrode (not illustrated) are connected to the p-type contact layer 705 and the n-type semiconductor layer 702, respectively. A certain voltage for causing the p-side electrode to be at a negative potential and the n-side electrode to be at a positive potential is applied between the p-side electrode and the n-side electrode. Accordingly, photocarriers (holes and electrons) generated through light absorption in the i-type absorption layer 703 are detected via the upper clad layer 704 and the n-type semiconductor layer 702. Accordingly, the photodetection portion 701 detects signal light as an electric signal (photocarrier current), and outputs a detection signal (photocarrier current) corresponding to the intensity of the signal light to an electric circuit in the subsequent stage.

1-2. Setting of Length Lmmi of MMI Waveguide 732

1-2-1. Self-Imaging in MMI Waveguide

Figure 11:
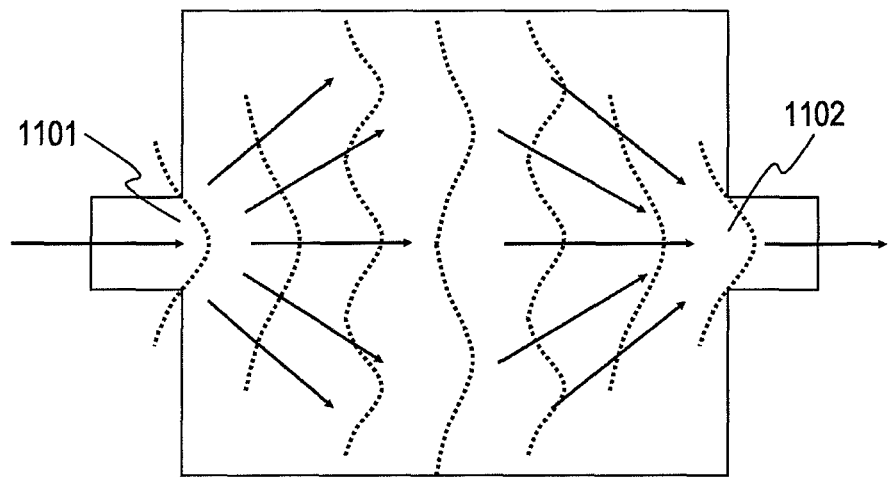
FIG. 11 illustrates an example of a light intensity distribution in a case where self-imaging occurs in an MMI waveguide.

FIG. 11 illustrates an example of a light intensity distribution in a case where self-imaging occurs in an MMI waveguide 1100. Broken lines represent the light intensity distribution of signal light. Arrows indicate radiation directions of signal light.

The MMI waveguide 1100 illustrated in FIG. 11 has parameters, such as width, length, and refractive index, which are set so as to cause self-imaging. The length Lsi at which self-imaging occurs is uniquely determined based on the width of an MMI waveguide and the refractive indices of a waveguide core layer and the layers near the waveguide core layer. It is known that the length Lsi at which self-imaging occurs is expressed by the following equation 1.

$$Lsi = N \cdot nr \cdot Weff^2 / \lambda$$

In equation 1, nr represents the effective refractive index of the waveguide core layer, Weff represents an effective waveguide width determined based on the width of the MMI waveguide and the refractive index distribution of the waveguide core layer and the layers near the waveguide core layer, and λ represents the wavelength of signal light.

Here, N is a natural number (for example, see Lucas B. Soldano et al. J. Lightwave Tech., VOL. 13, No. 4, April 1995, pp. 615-617).

From the viewpoint of decreasing the size and loss of the MMI waveguide, N is typically 1, and thus equation 1 expressing the length Lsi at which self-imaging occurs is as follows (equation 2).

$$Lsi = nr \cdot Weff^2 / \lambda$$

As illustrated in FIG. 11, the light intensity distribution of signal light gradually widens as the signal light propagates along the MMI waveguide 1100 just after the signal light enters the MMI waveguide 1100 from an input portion 1101. The light intensity distribution is the widest at a point when the signal light reaches a position halfway (50%) along the entire length of the MMI waveguide 1100 (the length along the signal light travel direction or the direction in which the waveguide extends).

After the signal light has passed the position halfway (50%) along the entire length of the MMI waveguide 1100, the light intensity distribution gradually narrows as the signal light propagates along the MMI waveguide 1100. When the signal light reaches an output portion 1102 of the MMI waveguide 1100, the light intensity distribution is the same as that in the input portion 1101. In other words, the light intensity distribution in the input portion 1101 is reproduced in the output portion 1102. That is, in the MMI waveguide 1100, a self-imaging point is positioned in the output portion 1102.

As is understood from FIG. 11, the propagation state of signal light in the first-half region (region on the input portion 1101 side) and the propagation state of signal light in the latter-half region (region on the output portion 1102 side) are different from each other in the entire region of the MMI waveguide 1100.

In the first-half region of the MMI waveguide 1100, the radiation directions of the signal light is such directions that the signal light diffuses in the direction orthogonal to the signal light travel direction, as indicated by arrows in FIG. 11. That is, the signal light propagates in a diffusion direction.

In contrast, in the latter-half region of the MMI waveguide 1100, the radiation directions of the signal light is such directions that the signal light converges in the direction orthogonal to the signal light travel direction, as indicated by arrows in FIG. 11. That is, the signal light propagates in a convergence direction. Particularly, near the output portion 1102, the effect of converging signal light in the direction orthogonal to the signal light travel direction is strong, and the characteristic of converging signal light is remarkable.

In the light receiving element 700 according to the first embodiment, a point that the characteristic of converging signal light in the direction orthogonal to the signal light travel direction is remarkable near the output portion 1102 of the MMI waveguide 1100 is utilized. In the light receiving element 700, this remarkable characteristic is utilized to converge a larger part of incident signal light to a region below the i-type absorption layer 703 in the waveguide core layer 712 in the photodetection portion 701. Details will be given below.

1-2-2. Light Intensity Distribution of Signal Light in Light Receiving Element 700

Figure 12:
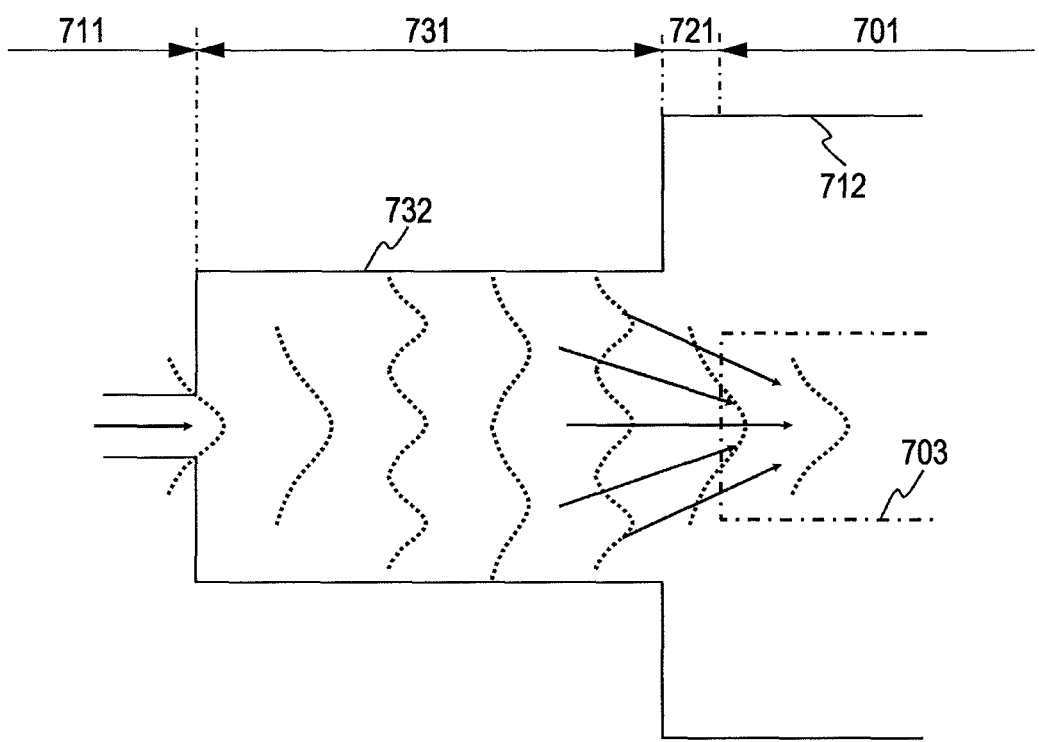
FIG. 12 illustrates a light intensity distribution of signal light in the light receiving element illustrated in FIGS. 7 and 8.

FIG. 12 illustrates a light intensity distribution of signal light in the light receiving element 700 illustrated in FIGS. 7 and 8. Solid lines represent the shape of the waveguide core layer 712 viewed from the upper side of the substrate 714. Dotted-chain lines represent the shape of the i-type absorption layer 703 viewed from the upper side of the substrate 714. Broken lines represent an example of a light intensity distribution of signal light. Arrows indicate radiation directions of signal light.

Referring to FIG. 12, in the MMI waveguide 732 in the MMI portion 731, a self-imaging point is positioned in a region below the i-type absorption layer 703 in the waveguide core layer 712 in the photodetection portion 701. The length Lmmi of the MMI waveguide 732 in the MMI portion 731 is set so that, for example, the distance from an end of the MMI waveguide 732 on the side where signal light enters (input portion) to an end of the photodetection portion 701 on the side where signal light enters (incident end) is 85% of the length Lsi at which self-imaging occurs in the MMI waveguide 732.

As illustrated in FIG. 12, signal light propagates in the waveguide core layer 712 and enters from the waveguide portion 711 into the MMI portion 731. Then, as described above with reference to FIG. 11, the signal light converges in the direction orthogonal to the signal light travel direction in the output portion of the MMI waveguide 732. As indicated by arrows, in the output portion of the MMI waveguide 732, the signal light converges in the direction orthogonal to the signal light travel direction. Accordingly, the signal light enters the slab region 721 while maintaining a propagation state in the convergence direction.

As described above, in the light receiving element 700, the n-side electrode (not illustrated) is connected to the n-type semiconductor layer 702. Thus, the n-type semiconductor layer 702 desirably has a region connected to the n-side electrode in the region outside the mesa structure in the photodetection portion 701. Accordingly, the n-type semiconductor layer 702 does not have a complete mesa structure unlike the i-type absorption layer 703, and the width of the n-type semiconductor layer 702 is larger than the width of the i-type absorption layer 703 by at least the width of the region connected to the n-side electrode. In the photodetection portion 701, the waveguide core layer 712 is under the n-type semiconductor layer 702, and thus the width of the waveguide core layer 712 is larger than the width of the i-type absorption layer 703 by at least the width of the region connected to the n-side electrode. In addition, the width of the waveguide core layer 712 in the slab region 721 is large, like the width of the waveguide core layer 712 in the photodetection portion 701.

In contrast, the width of the waveguide core layer 712 in the waveguide portion 711 is smaller than the width of the i-type absorption layer 703. Also, the width of the waveguide core layer 712 in the MMI portion 731 is larger than the width of the waveguide core layer 712 in the waveguide portion 711 and is sufficiently smaller than the width of the waveguide core layer 712 in the slab region 721 and the photodetection portion 701. As a result, signal light enters from the waveguide portion 711 and the MMI portion 731 having a small width into the slab region 721 and the photodetection portion 701 having a sufficiently large width.

The waveguide portion 711 has a mesa structure of a small width, and thus has a strong light confinement effect of confining signal light in the direction orthogonal to the signal light travel direction. Also in the MMI portion 731, the MMI waveguide 732 has a mesa structure, and thus the light confinement effect is strong.

In contrast, in the photodetection portion 701, the effect of confining incident signal light in the direction orthogonal to the signal light travel direction is obtained by the i-type absorption layer 703, which is part of the mesa structure, and a portion including a small protrusion of the n-type semiconductor layer 702 under the i-type absorption layer 703. Thus, the light confinement effect is weak.

Furthermore, in the slab region 721, only the upper clad layer 713 exists on the waveguide core layer 312. Thus, an element for confining signal light that has entered from the MMI portion 731 in the direction orthogonal to the signal light travel direction hardly exists in the slab region 721. Therefore, the light confinement effect of the slab region 721 is weaker than that of the photodetection portion 701.

Figure 3:
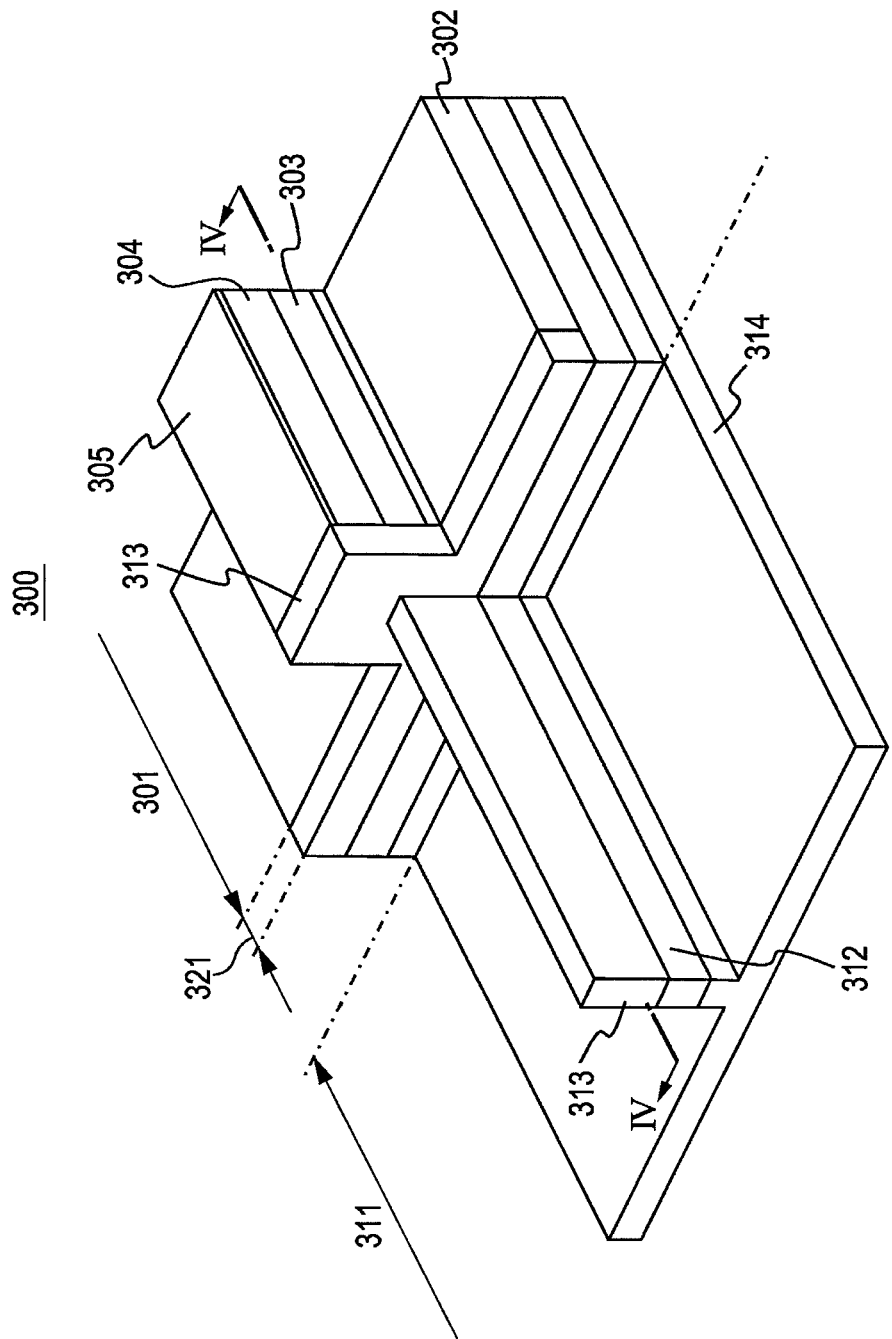
FIG. 3 is a perspective view illustrating a main part of a light receiving element, which is another example of the light receiving element according to the related art.
Figure 4:
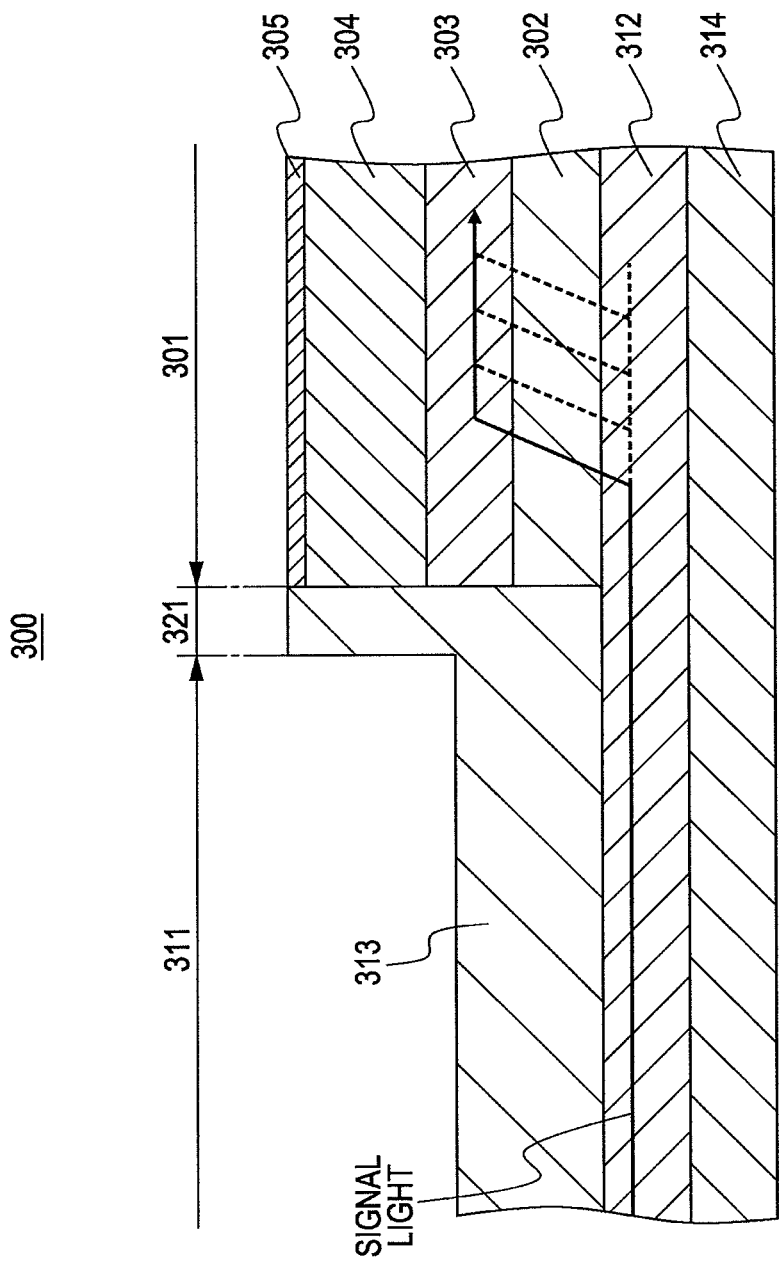
FIG. 4 is a cross-sectional view of the light receiving element taken along line IV-IV of FIG. 3.
Figure 5:
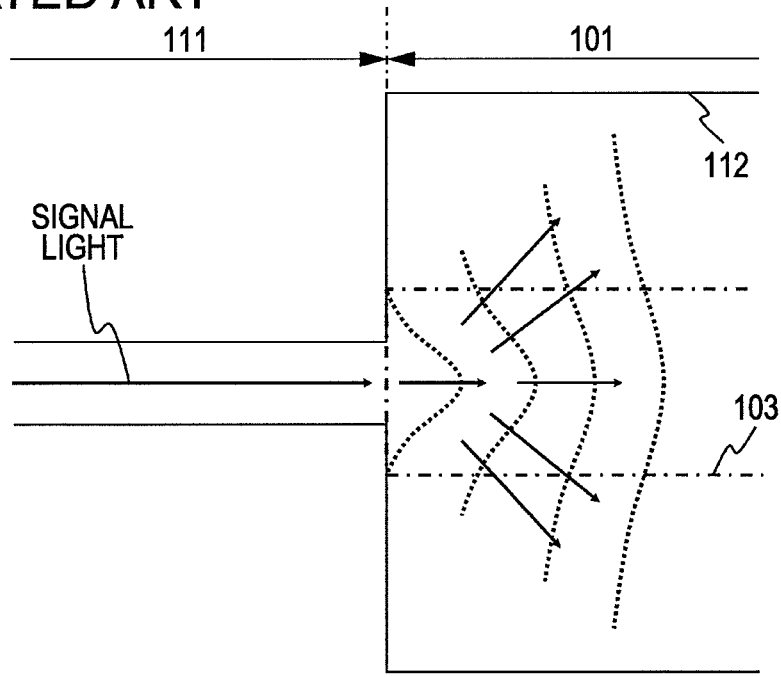
FIG. 5 illustrates a light intensity distribution of signal light in the light receiving element illustrated in FIGS. 1 and 2.
Figure 6:
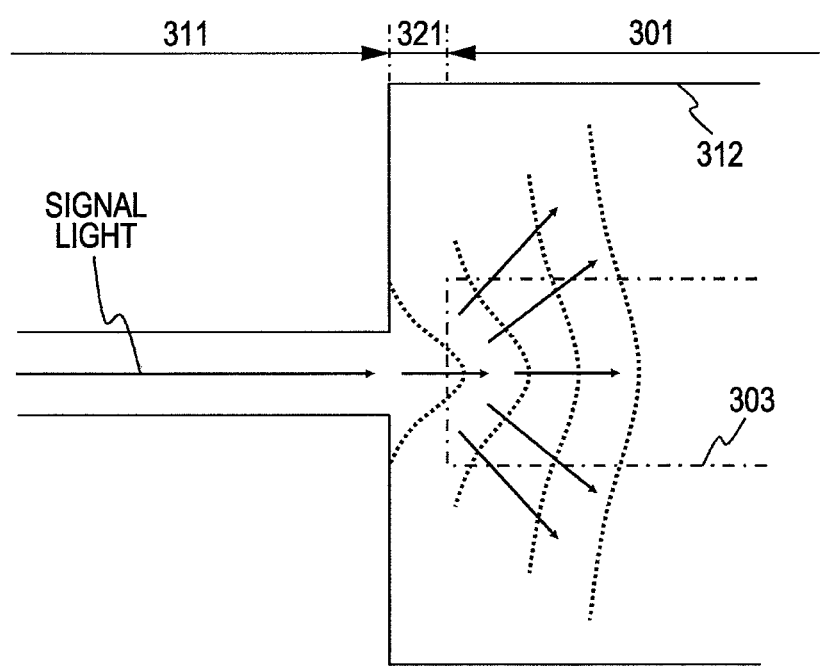
FIG. 6 illustrates a light intensity distribution of signal light in the light receiving element illustrated in FIGS. 3 and 4.

Accordingly, in the light receiving element 700, as in the light receiving element 300 illustrated in FIGS. 3 and 4, signal light enters from the waveguide portion 711 and the MMI portion 731 having a small width and a strong light confinement effect into the slab region 721 and the photodetection portion 701 having a sufficiently large width and a weak light confinement effect. In this case, as in the light receiving element 300, the slab region 721 and the photodetection portion 701 have low ability of suppressing expansion of the light intensity distribution of signal light in the direction orthogonal to the signal light travel direction.

However, in the light receiving element 700, signal light enters the slab region 721 while maintaining a propagation state in the convergence direction, as described above. Since the self-imaging point of the MMI waveguide 732 is positioned in a region below the i-type absorption layer 703 in the waveguide core layer 712 in the photodetection portion 701, signal light may be maintained in the propagation state in the convergence direction also in the slab region 721, and thus the signal light does not diffuse. Accordingly, the signal light enters the photodetection portion 701 while maintaining the propagation state in the convergence direction.

The signal light that has entered the photodetection portion 701 is absorbed by the i-type absorption layer 703. At this time, the self-imaging point of the MMI waveguide 732 is positioned in a region below the i-type absorption layer 703 in the waveguide core layer 712 in the photodetection portion 701, and thus the signal light propagates in the convergence direction. Accordingly, a larger part of the incident signal light may be converged to the region below the i-type absorption layer 703 in the waveguide core layer 712, compared to the light receiving elements 100 and 300. Accordingly, a part of signal light that is not absorbed and is radiated to the outside of the i-type absorption layer 703 may be reduced.

Accordingly, in the light receiving element 700, the light absorption efficiency may be increased compared to the light receiving elements 100 and 300. Particularly, in the light receiving element 700, the light absorption efficiency may be increased compared to the light receiving element 100 even if a slab region having a light confinement effect weaker than that of a photodetection portion is disposed between a waveguide portion and a photodetection portion, as in the light receiving element 300.

For the reasons described above, when the self-imaging point of the MMI waveguide 732 is positioned in the photodetection portion 701, particularly in a region below the i-type absorption layer 703 in the waveguide core layer 712, the light absorption efficiency may be increased in the light receiving element 700, compared to the light receiving element 300. This is because, when the self-imaging point of the MMI waveguide 732 is positioned in the photodetection portion 701, a characteristic in which signal light converges in the direction orthogonal to the signal light travel direction near the output portion of the MMI waveguide 732 may be utilized in a region below the i-type absorption layer 703 in the waveguide core layer 712.

Thus, the length Lmmi of the MMI waveguide 732 in the MMI portion 731 is set so that the self-imaging point is positioned in the photodetection portion 701, particularly in a region below the i-type absorption layer 703 in the waveguide core layer 712.

1-2-3. Enhancement of Light Absorption Efficiency in Photodetection Portion 701

Next, a simulation result will be described to further discuss the setting of the length Lmmi of the MMI waveguide 732 in the MMI portion 731.

Figure 13:
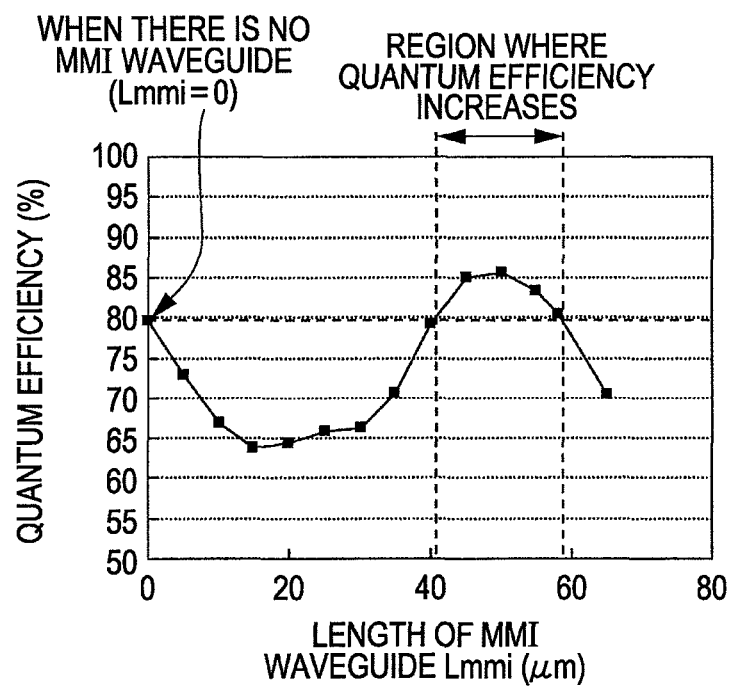
FIG. 13 illustrates a result of calculating, in a simulation, the relationship between the length of an MMI waveguide and light absorption efficiency in a photodetection portion.

FIG. 13 illustrates a result obtained by calculating, in a simulation, the relationship between the length Lmmi of the MMI waveguide 732 and the light absorption efficiency in the photodetection portion 701. The horizontal axis indicates the length Lmmi of the MMI waveguide 732, and the vertical axis indicates the quantum efficiency in the i-type absorption layer 703.

In the simulation illustrated in FIG. 13, it is assumed that the width of the MMI waveguide 732 is 5 μm, the wavelength of signal light is 1.55 μm, and the waveguide core layer 712 is formed of an i-type InGaAsP. The width of the i-type absorption layer 703 in the photodetection portion 701 is 3 μm. In the simulation illustrated in FIG. 13, it is assumed for easy understanding that the length of the slab region 721 is 0 μm, that is, the slab region 721 does not exist.

Under the above-described simulation conditions, the value of the length Lsi at which self-imaging occurs in the MMI waveguide 732 may be calculated by using the above equation 2, and is about 59 μm (Lsi≈59 μm). In FIG. 13, a case where the length Lmmi of the MMI waveguide 732 is 0 μm corresponds to a case where the MMI waveguide 732 does not exist, that is, the structure of the light receiving element 100 illustrated in FIG. 1.

Figure 1:
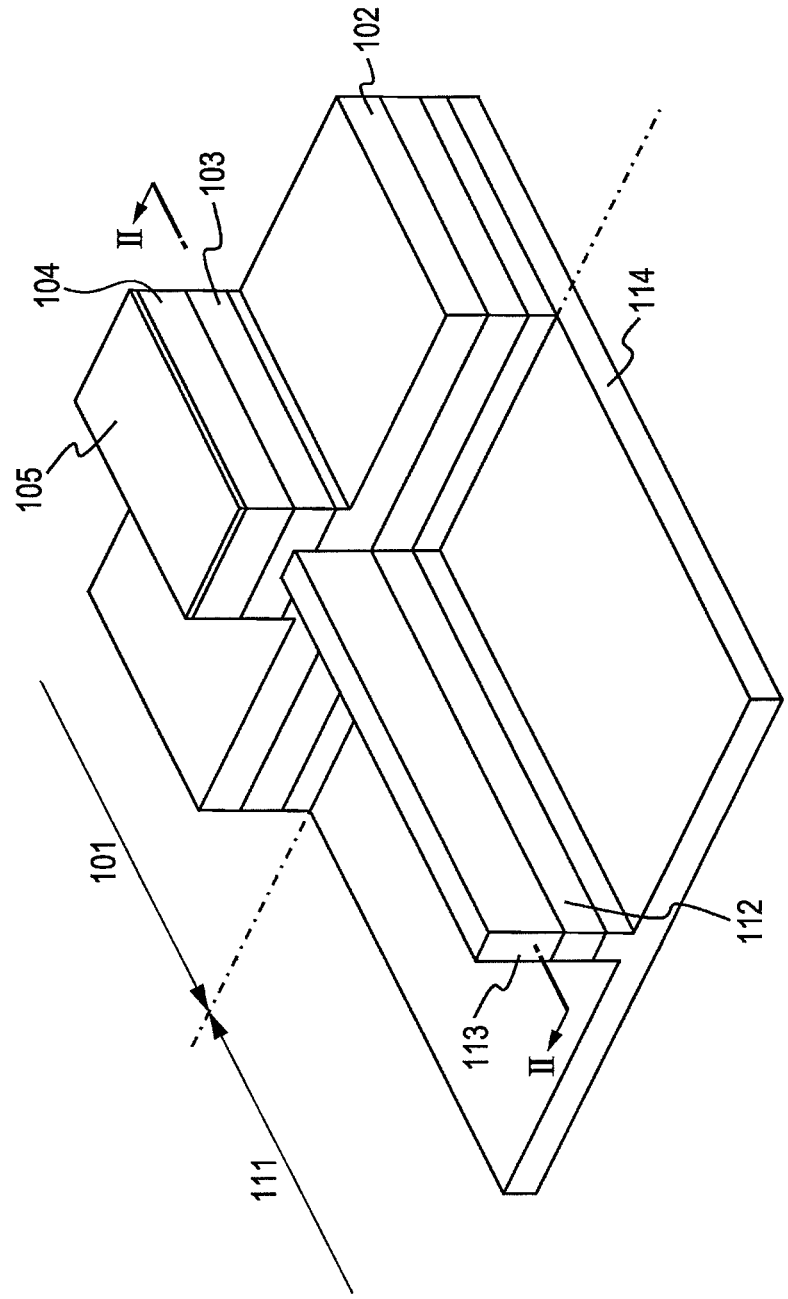
FIG. 1 is a perspective view illustrating a main part of a light receiving element, which is an example of a light receiving element according to the related art.

As is understood from FIG. 13, when the length Lmmi of the MMI waveguide 732 is 100% of the length Lsi at which self-imaging occurs (≈59 μm), that is, when the length Lmmi is about 59 μm, the value of the quantum efficiency is substantially equal to the value obtained when the MMI waveguide 732 does not exist (Lmmi=0 μm), that is, the value obtained when the structure of the light receiving element 100 illustrated in FIG. 1 is used. This is because self-imaging causes the light intensity distribution in the input portion of the MMI waveguide 732 to be reproduced in the output portion of the MMI waveguide 732, and thus the light intensity distribution in a case where the MMI waveguide 732 does not exist is reproduced at the end of the photodetection portion 701 on the side where signal light enters (incident end).

When the length Lmmi of the MMI waveguide 732 is shorter than the length Lsi at which self-imaging occurs (≈59 μm), the value of the quantum efficiency is larger than the value obtained when the MMI waveguide 732 does not exist (Lmmi=0 μm), that is, the value obtained when the structure of the light receiving element 100 illustrated in FIG. 1 is used. In this case, the self-imaging point of the MMI waveguide 732 is positioned in the photodetection portion 701, particularly in a region below the i-type absorption layer 703 in the waveguide core layer 712. Thus, a larger part of signal light that has entered the photodetection portion 701 may be converged to the region below the i-type absorption layer 703 in the waveguide core layer 712. Here, a characteristic is utilized in which the effect of converging signal light in the direction orthogonal to the signal light travel direction is strong and the characteristic of converging signal light is remarkable near the output portion 1102 of the MMI waveguide 1100 having the length Lsi at which self-imaging occurs, as illustrated in FIG. 11.

When the length Lmmi of the MMI waveguide 732 is about 70% of the length Lsi at which self-imaging occurs (≈59 μm), that is, when the length Lmmi is about 41 μm, the value of the quantum efficiency is substantially equal to the value obtained when the MMI waveguide 732 does not exist (Lmmi=0 μm), that is, the value obtained when the structure of the light receiving element 100 illustrated in FIG. 1 is used. Also in this case, the self-imaging point of the MMI waveguide 732 is positioned in a region below the i-type absorption layer 703 in the photodetection portion 701, but the effect of converging signal light in the direction orthogonal to the signal light travel direction becomes weaker with the distance from the output portion 1102 of the MMI waveguide portion 1100 in a state where a light confinement structure in the lateral direction does not exist. Thus, incident signal light is not sufficiently converged to the region below the i-type absorption layer 703 in the waveguide core layer 712 in the photodetection portion 701.

When the length Lmmi of the MMI waveguide 732 is smaller than 70% of the length Lsi at which self-imaging occurs (≈59 μm), that is, when the length Lmmi is shorter than about 41 μm, the value of the quantum efficiency is smaller than the value obtained when the MMI waveguide 732 does not exist (Lmmi=0 μm), that is, the value obtained when the structure of the light receiving element 100 illustrated in FIG. 1 is used. This is because the effect of converging signal light in the direction orthogonal to the signal light travel direction becomes weaker with the distance from the output portion 1102 of the MMI waveguide 1100. Also, this is because the signal light propagates in the diffusion direction when the length Lmmi of the MMI waveguide 732 is shorter than 50% of the length Lsi at which self-imaging occurs.

When the length Lmmi of the MMI waveguide 732 is larger than the length Lsi at which self-imaging occurs (≈59 μm), the value of the quantum efficiency is smaller than the value obtained when the MMI waveguide 732 does not exist (Lmmi=0 μm), that is, the value obtained when the structure of the light receiving element 100 illustrated in FIG. 1 is used. This is because, when the length Lmmi of the MMI waveguide 732 is larger than the length Lsi at which self-imaging occurs (≈59 μm), signal light propagates in the diffusion direction as in the first-half region of the MMI waveguide 1100.

It is considered from the above-described result that the relationship between the length Lmmi of the MMI waveguide 732 and the quantum efficiency (light absorption efficiency) is as follows. That is, when the length Lmmi of the MMI waveguide 732 is 100% of the length Lsi at which self-imaging occurs, the value of the quantum efficiency is substantially equal to the value obtained when the MMI waveguide 732 does not exist. As the length Lmmi of the MMI waveguide 732 is decreased to a value smaller than 100% of the length Lsi at which self-imaging occurs, the value of the quantum efficiency increases to a value larger than the value obtained when the MMI waveguide 732 does not exist. However, the value of the quantum efficiency becomes substantially equal to the value obtained when the MMI waveguide 732 does not exist when the length Lmmi of the MMI waveguide 732 is decreased to some extent. Then, when the length Lmmi of the MMI waveguide 732 is further decreased, the value of the quantum efficiency becomes smaller than the value obtained when the MMI waveguide 732 does not exist.

Accordingly, it is understood that, in the light receiving element 700, the light absorption efficiency may be increased compared to the light receiving element 100 when the length Lmmi of the MMI waveguide 732 is smaller than 100% of the length Lsi at which self-imaging occurs and is larger than the length at which the same light absorption efficiency as the light absorption efficiency in a case where the MMI waveguide 732 does not exist may be obtained.

According to the above-described simulation result, in the light receiving element 700, the length for obtaining a light absorption efficiency substantially the same as the light absorption efficiency obtained when the MMI waveguide 732 does not exist is 70% of the length Lsi at which self-imaging occurs (≈59 μm), that is, about 41 μm. Thus, the light absorption efficiency may be increased compared to the light receiving element 100 when the length Lmmi of the MMI waveguide 732 is larger than 70% of the length Lsi at which self-imaging occurs and is smaller than 100% of the length Lsi.

In the above-described simulation, it is assumed that the length of the slab region 721 is 0 μm and that the slab region 721 does not exist. The above-described simulation result may also be applied to a case where the slab region 721 having a finite length exists, if the length Lmmi of the MMI waveguide 732 is replaced with the distance from the end of the MMI waveguide 732 on the side where signal light enters (input portion) to the end of the photodetection portion 701 on the side where signal light enters (incident end). This is because, when the slab region 721 has a finite length, the light intensity distribution obtained when the MMI waveguide 732 does not exist (the light intensity distribution in the light receiving element 100) is reproduced at the incident end of the photodetection portion 701 if the distance from the input portion of the MMI waveguide 732 to the incident end of the photodetection portion 701 matches the length Lsi at which self-imaging occurs in the MMI waveguide 732.

Therefore, it is understood that, in the light receiving element 700, the light absorption efficiency may be increased compared to the light receiving element 100 when the distance from the input portion of the MMI waveguide 732 to the incident end of the photodetection portion 701 is longer than 70% of the length Lsi at which self-imaging occurs in the MMI waveguide 732 and is shorter than 100% of the length Lsi. Likewise, it is understood that, in the light receiving element, the light absorption efficiency may be increased compared to the light receiving element 100 when the distance from the input portion of the MMI waveguide to the incident end of the photodetection portion is longer than (N−0.3)×100% of the length Lsi_min at which self-imaging occurs in the MMI waveguide and shorter than N×100% of the length Lsi_min. The length Lsi_min is the shortest length where self-imaging occurs in the MMI waveguide, and N is a natural number.

Furthermore, it is understood that, in the light receiving element 700, the light absorption efficiency may be increased compared to the light receiving element 300 because the light absorption efficiency in the light receiving element 300 is lower than the light absorption efficiency in the light receiving element 100 due to the influence of the slab region 321.

The light intensity distribution in the MMI waveguide illustrated in FIG. 11 is obtained even if the size of the MMI waveguide is changed. Thus, the characteristic in which the light absorption efficiency may be increased by setting the length Lmmi of the MMI waveguide 732 to be smaller than 100% of the length Lsi at which self-imaging occurs and to be larger than 70% of the length Lsi is not limited to the specific structure of the MMI waveguide 732 in the above-described simulation.

Figure 14:
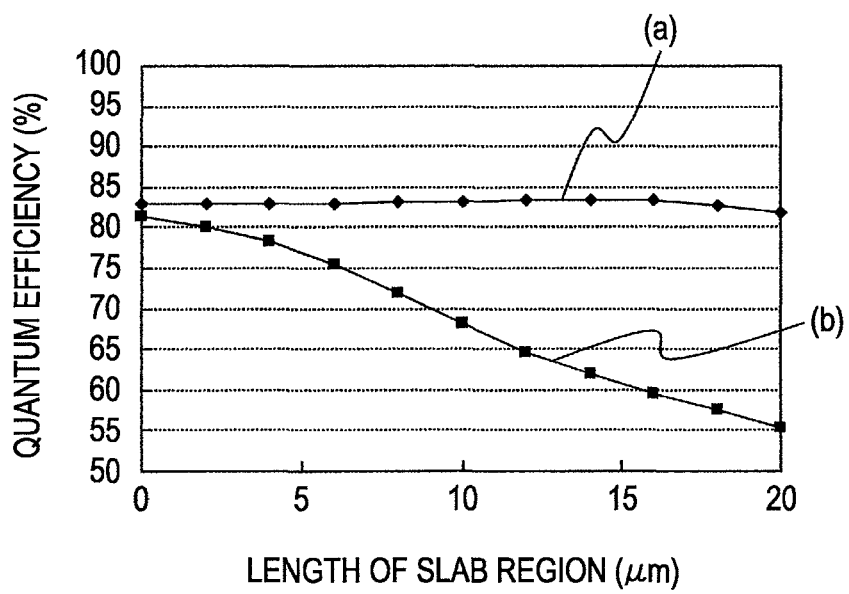
FIG. 14 illustrates a result of calculating, in a simulation, the relationship between the length of a slab region and light absorption efficiency in the photodetection portion.

1-2-4. Relationship Between Light Absorption Efficiency and Length of Slab Region FIG. 14 illustrates a result obtained by calculating, in a simulation, the relationship between the length of a slab region and the light absorption efficiency in a photodetection portion. The vertical axis indicates the quantum efficiency in an i-type absorption layer, and the horizontal axis indicates the length of a slab region. In this specification, the length is a length in the direction in which a corresponding waveguide extends, that is, the length along the signal light travel direction.

Referring to FIG. 14, a curve (a) indicates a result obtained in the light receiving element 700 illustrated in FIGS. 7 to 10B, that is, a result obtained when the MMI waveguide 732 is used. A curve (b) indicates a result obtained in the light receiving elements 100 and 300 illustrated in FIGS. 1 to 4, that is, a result obtained when no MMI waveguide exists.

The conditions used in the simulation illustrated in FIG. 14 are the same as those used in the simulation illustrated in FIG. 13 except that the value of the length of the slab region 721 is finite. In the curve (a), the length of the MMI waveguide 732 is 93% of the length Lsi at which self-imaging occurs (≈59 μm), that is, about 55 μm.

As indicated by the curve (a) in FIG. 14, in the light receiving element 700, the value of the quantum efficiency is almost uniform regardless of the length of the slab region 721. More specifically, when the length of the slab region 721 is 0 to about 18 μm, the value of the quantum efficiency is equal to or larger than the value of the quantum efficiency obtained when the slab region 721 does not exist (when the length of the slab region 721 is 0 μm). Thus, it is understood that, in the light receiving element 700, the value of the quantum efficiency equal to or larger than the value obtained when the slab region 721 does not exist (the length of the slab region 721 is 0 μm) may be maintained by providing the MMI waveguide 732, even if the length of the slab region 721 increases.

In contrast, when no MMI waveguide exists, the value of the quantum efficiency is maximum when no slab region exists (when the length of the slab region is 0 μm), that is, in the light receiving element 100, as indicated by the curve (b) in FIG. 14. On the other hand, when the slab region 321 having a finite length exists, that is, in the light receiving element 300, the value of the quantum efficiency monotonously decreases as the length of the slab region 321 increases.

When no slab region exists (when the length of the slab region is 0 μm), the value of the quantum efficiency in the light receiving element 700 (curve (a)) is larger than the value of the quantum efficiency in the light receiving element 100 (curve (b)). In addition, the difference in quantum efficiency between the light receiving element 700 (curve (a)) and the light receiving element 300 (curve (b)) becomes larger as the length of the slab region increases.

It is understood from the above-described result that, in the light receiving element 700, the light absorption efficiency may be increased, as in a case where no slab region exists, by forming the MMI waveguide 732 even if the slab region 721 having a light confinement effect weaker than that of the photodetection portion 701 is formed between the waveguide portion 711 and the photodetection portion 701. Furthermore, it is understood that, even if the length of the slab region 721 is increased in the light receiving element 700, the influence of the slab region 721 may be decreased, and a quantum efficiency substantially the same as that in a case where no slab region exists may be obtained.

1-3. Specific Example of Structure of Light Receiving Element 700

FIG. 15 is a perspective view illustrating an example of the structure of a light receiving element 1500, and illustrates only a main part of the light receiving element 1500. The structure of the light receiving element 1500 illustrated in FIG. 15 is a specific example of the structure of the light receiving element 700 illustrated in FIG. 7. FIG. 15 specifically illustrates an exemplary structure of the individual layers in the light receiving element 700. FIG. 16 is a cross-sectional view of the light receiving element 1500 taken along line XVI-XVI of FIG. 15. FIG. 17A is a cross-sectional view of the light receiving element 1500 taken along line XVIIA-XVIIA of FIG. 15, and illustrates a mesa structure and the vicinity thereof. FIG. 17B is a cross-sectional view of the light receiving element 1500 taken along line XVIIB-XVIIB of FIG. 15, and illustrates a mesa structure and the vicinity thereof. FIG. 18A is a cross-sectional view of the light receiving element 1500 taken along line XVIIIA-XVIIIA of FIG. 15, and illustrates a mesa structure and the vicinity thereof. FIG. 18B is a cross-sectional view of the light receiving element 1500 taken along line XVIIIB-XVIIIB of FIG. 15, and illustrates a mesa structure and the vicinity thereof.

As illustrated in FIGS. 15 to 18B, the light receiving element 1500 includes, for example, a photodetection portion 1501 disposed on a semi-insulating (SI) substrate 1514 composed of InP, a waveguide portion 1511 disposed on the same substrate 1514, a slab region 1521 disposed on the same substrate 1514, and an MMI portion 1531 disposed on the same substrate 1514. The SI-InP substrate 1514 is a substrate doped with an element that forms a deep impurity level, such as Fe.

The waveguide portion 1511 has a structure in which a waveguide core layer 1512 and an upper clad layer 1513 are stacked from the SI-InP substrate 1514 side. The waveguide core layer 1512 is composed of i-type InGaAsP having a band gap wavelength of 1.05 μm. The upper clad layer 1513 is composed of i-type InP. The waveguide portion 1511 has a mesa structure including the i-InP upper clad layer 1513, the i-InGaAsP waveguide core layer 1512, and part of the SI-InP substrate 1514, and has a high mesa waveguide structure the side surfaces of which are not embedded with a semiconductor material. The i-InGaAsP waveguide core layer 1512 has a band gap wavelength of 1.05 μm with respect to signal light of 1.55 μm, and thus has a low absorptance for signal light.

The MMI portion 1531 has a structure in which the i-InGaAsP waveguide core layer 1512 and the i-InP upper clad layer 1513 are stacked from the SI-InP substrate 1514 side. The MMI portion 1531 has a mesa structure including the i-InP upper clad layer 1513, the i-InGaAsP waveguide core layer 1512, and part of the SI-InP substrate 1514. The MMI portion 1531 has the same stacked structure as that of the waveguide portion 1511. However, the width of the i-InGaAsP waveguide core layer 1512 in the MMI portion 1531 is larger than the width of the i-InGaAsP waveguide core layer 1512 in the waveguide portion 1511. Accordingly, the i-InGaAsP waveguide core layer 1512 in the MMI portion 1531 forms a 1×1 MMI waveguide 1532 including one input and one output.

The photodetection portion 1501 has a structure in which the i-InGaAsP waveguide core layer 1512 shared by the waveguide portion 1511 and the MMI portion 1531, a semiconductor layer 1502, an absorption layer 1503, an upper clad layer 1504, and a p-type contact layer 1505 are stacked from the SI-InP substrate 1514 side. The semiconductor layer 1502 is composed of n-type InGaAsP having a band gap wavelength of 1.3 μm. The absorption layer 1503 is composed of i-type InGaAs which is lattice-matched to InP. The upper clad layer 1504 is composed of p-type InP. The p-type contact layer 1505 has a two-layer structure of p-type InGaAs and InGaAsP. The n-InGaAsP semiconductor layer 1502 has a band gap wavelength of 1.3 μm with respect to signal light of 1.55 μm, and thus has a low absorptance for signal light.

The photodetection portion 1501 has a mesa structure including the p-type contact layer 1505, the p-InP upper clad layer 1504, the i-InGaAs absorption layer 1503, and part of the n-InGaAsP semiconductor layer 1502, and has a high mesa waveguide structure the side surfaces of which are not embedded with a semiconductor material. The n-InGaAsP semiconductor layer 1502, the i-InGaAs absorption layer 1503, and the p-InP upper clad layer 1504 form a PIN-type photodiode.

A p-side metal electrode 1515 is disposed on the p-type contact layer 1505. An n-side metal electrode 1516 is disposed on the n-InGaAsP semiconductor layer 1502. In the light receiving element 1500, the portion that is not provided with the p-side metal electrode 1515 and the n-side metal electrode 1516 is covered with a passivation film 1517 composed of a dielectric material, such as a silicon-nitride film. In FIG. 15, the passivation film 1517 is not illustrated for easy understanding of the structure.

A certain voltage for causing the p-side metal electrode 1515 to be at a negative potential and the n-side metal electrode 1516 to be at a positive potential is applied between the p-side metal electrode 1515 and the n-side metal electrode 1516. Accordingly, photocarriers (holes and electrons) generated through light absorption in the i-InGaAs absorption layer 1503 are detected via the p-InP upper clad layer 1504 and the n-InGaAsP semiconductor layer 1502.

The slab region 1521 has a structure in which the i-InGaAsP waveguide core layer 1512 and the i-InP upper clad layer 1513 are stacked from the SI-InP substrate 1514 side. In the slab region 1521, part of the i-InP upper clad layer 1513 forms a mesa structure having a shape similar to that of the mesa structure in the photodetection portion 1501.

In the waveguide portion 1511, the i-InGaAsP waveguide core layer 1512 has a thickness of 0.5 and the i-InP upper clad layer 1513 has a thickness of 1.0 μm, for example. In the MMI portion 1531, as in the waveguide portion 1511, the i-InGaAsP waveguide core layer 1512 has a thickness of 0.5 μm, and the i-InP upper clad layer 1513 has a thickness of 1.0 μm, for example.

In the photodetection portion 1501, the i-InGaAsP waveguide core layer 1512 has a thickness of 0.5 μm, the n-InGaAsP semiconductor layer 1502 has a thickness of 0.5 μm, the i-InGaAs absorption layer 1503 has a thickness of 0.5 μm, and the p-InP upper clad layer 1504 and the p-type contact layer 1505 have a thickness of 1.0 μm in total, for example. In the slab region 1521, as in the photodetection portion 1501, the i-InGaAsP waveguide core layer 1512 has a thickness of 0.5 μm, for example. The thickness of the i-InP upper clad layer 1513 is 2.0 μm in the portion corresponding to the mesa structure in the photodetection portion 1501, and is substantially the same as the thickness of the n-InGaAsP semiconductor layer 1502 in the photodetection portion 1501 in the other portion.

In the waveguide portion 1511, the width of the mesa structure including the i-InGaAsP waveguide core layer 1512 and the i-InP upper clad layer 1513 is 2.5 μm, for example. In the MMI portion 1531, the width of the mesa structure including the i-InGaAsP waveguide core layer 1512 and the i-InP upper clad layer 1513 is 5 μm, and the length of the mesa structure is 50 μm, for example.

In the photodetection portion 1501, the width of the mesa structure including the i-InGaAs absorption layer 1503, the p-InP upper clad layer 1504, and the p-type contact layer 1505 is 3 μm, and the length of the mesa structure is 10 μm. In the slab region 1521, the width of the mesa structure including the i-InP upper clad layer 1513 is 3 μm. The length of the slab region 1521 is 5 μm, for example.

In the light receiving element 1500, when the MMI portion 1531 has the above-described structure, the length at which self-imaging occurs in the MMI waveguide 1532 is about 59 μm (Lsi≈59 μm). The distance from the input portion of the MMI waveguide 732 to the incident end of the photodetection portion 731, that is, the total length of the MMI wavelength 732 and the slab region 721 (55 μm), is about 93% of the length at which self-imaging occurs (Lsi≈59 μm). In this case, as is understood from the simulation result illustrated in FIG. 13, the light absorption efficiency (quantum efficiency) increases in the i-InGaAs absorption layer 1503 in the photodetection portion 1501, compared to a case where no MMI waveguide exists.

In the light receiving element 1500 having the above-described structure, the light absorption efficiency may be increased compared to the light receiving elements 100 and 300 illustrated in FIGS. 1 to 4. Particularly, in the light receiving element 1500, the light absorption efficiency may be increased even if a slab region having a weak light confinement effect is disposed between a waveguide portion and a photodetection portion.

In the above-described embodiment, a description has been given of an example of a photodiode, which includes an absorption layer composed of InGaAs and a waveguide core layer and so forth composed of InGaAsP, serving as an example of a light receiving element for receiving signal light having a wavelength of 1.55 μm. Alternatively, in the light receiving element according to the above-described embodiment, the absorption layer may be composed of another material that absorbs light in the wavelength band of incident signal light, and the other layers may be composed of another material that does not absorb the light.

In the above-described embodiment, a layer such as an absorption layer is composed of i-type semiconductor. Alternatively, part of the absorption layer or the entire absorption layer may be composed of p-type or n-type semiconductor.

In the above-described embodiment, a waveguide core layer shared by a waveguide portion and an MMI portion exists below an absorption layer in a photodetection portion, but the structure is not limited thereto. Any layered structure may be used as long as signal light from a waveguide core layer in an MMI portion enters a layer below an absorption layer in a photodetection portion and does not directly enter the absorption layer. For example, a structure may be used in which signal light enters from the i-InGaAsP waveguide core layer 1512 in the MMI portion 1531 into the n-InGaAsP semiconductor layer 1502 in the photodetection portion 1501 via the slab region 1521.

1-4. Method for Manufacturing Light Receiving Element 1500

FIGS. 19A to 24B illustrate an example of a process of manufacturing the light receiving element 1500 illustrated in FIGS. 15 to 18B. FIGS. 19A, 20A, 21A, 22A, 23A, and 24A are top plan views illustrating a main part of the light receiving element 1500. FIGS. 19B, 20B, 21B, 22B, 23B, and 24B are cross-sectional views taken along lines XIXB-XIXB, XXB-XXB, XXIB-XXIB, XXIIIB-XXIIIB, and XXIVB-XXIVB of FIGS. 19A, 20A, 21A, 22A, 23A, and 24A, respectively. Hereinafter, an example of the method for manufacturing the light receiving element 1500 will be described with reference to FIGS. 19A to 24B.

Figure 19A:
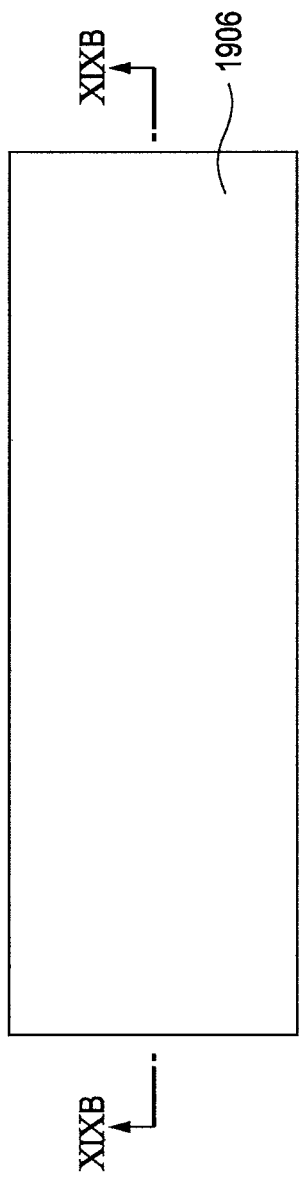
FIG. 19A is a plan view illustrating an example of a process of manufacturing the light receiving element illustrated in FIGS. 15 to 18B.
Figure 19B:
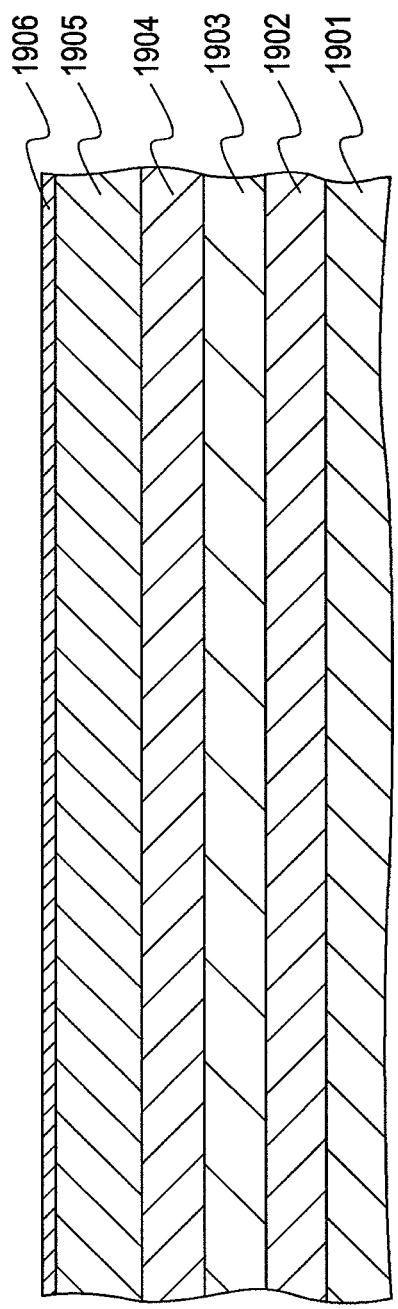
FIG. 19B is a cross-sectional view taken along line XIXB-XIXB of FIG. 19A.

As illustrated in FIGS. 19A and 19B, an i-InGaAsP film 1902, an n-InGaAsP film 1903, an i-InGaAs film 1904, a p-InP film 1905, and a stacked film 1906 including two layers of p-InGaAs and p-InGaAsP are deposited on an SI-InP substrate 1901 by using, for example, a metal organic chemical vapor deposition (MOCVD) method. Here, deposition is performed so that the i-InGaAsP film 1902 has a thickness of 0.5 μm, the n-InGaAsP film 1903 has a thickness of 0.5 μm, and the i-InGaAs film 1904 has a thickness of 0.5 μm. Also, deposition is performed so that the total thickness of the p-InP film 1905 and the p-InGaAs/InGaAsP stacked film 1906 becomes 1.0 μm.

Figure 20A:
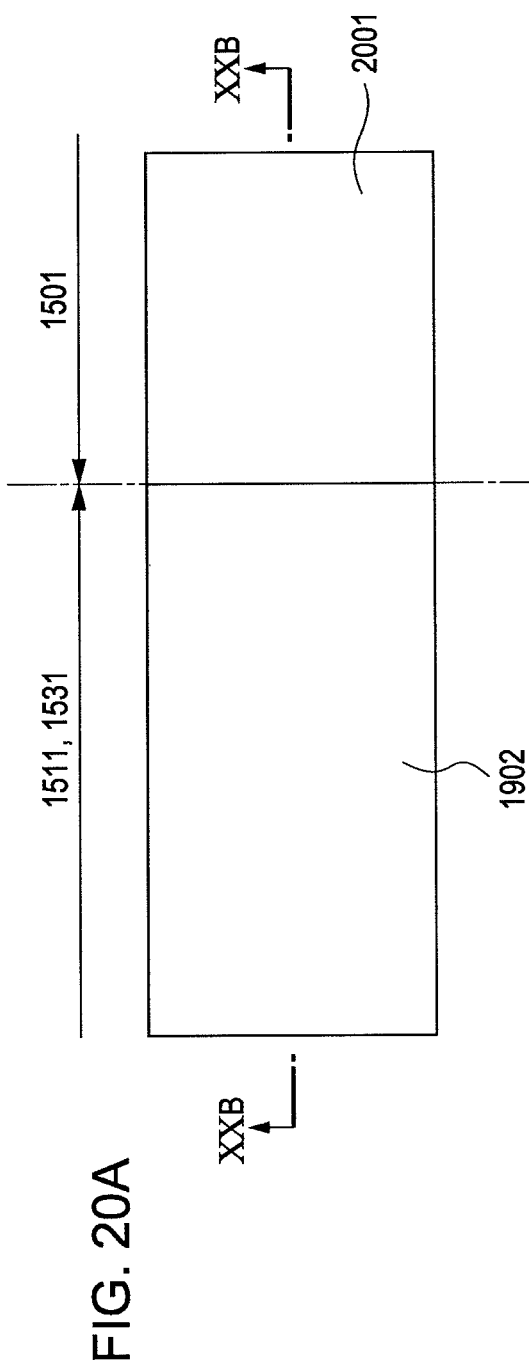
FIG. 20A is a plan view illustrating the example of a process of manufacturing the light receiving element illustrated in FIGS. 15 to 18B.
Figure 20B:
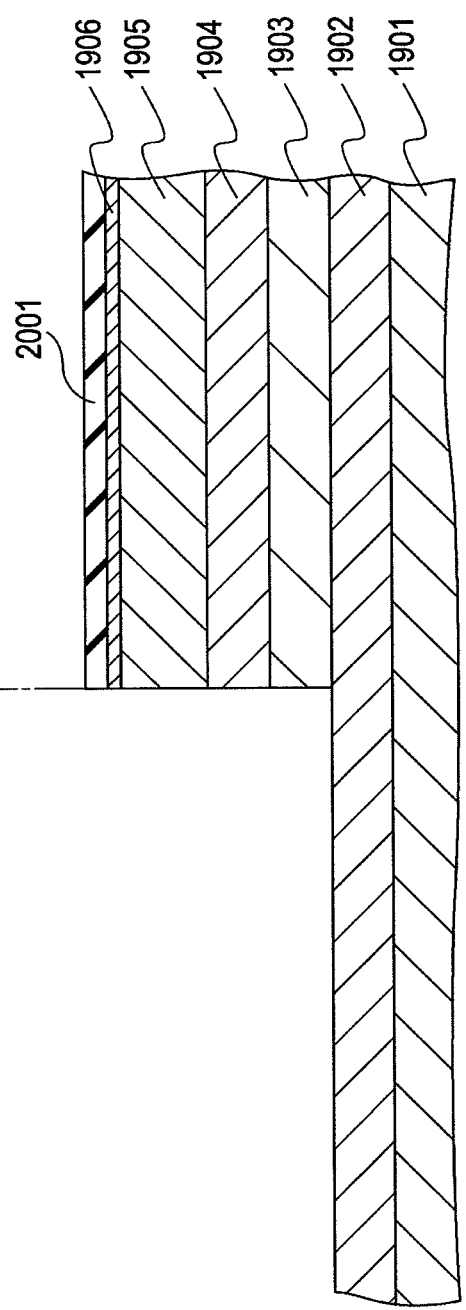
FIG. 20B is a cross-sectional view taken along line XXB-XXB of FIG. 20A.

Subsequently, a mask 2001 for covering a region that is to become the photodetection portion 1501 illustrated in FIGS. 15 to 18B is formed on the p-InGaAs/InGaAsP stacked film 1906, and regions that are to become the waveguide portion 1511 and the MMI portion 1531 are selectively exposed. A silicon oxide film is used as the mask 2001, for example. With known etching using the mask 2001, the n-InGaAsP film 1903, the i-InGaAs film 1904, the p-InP film 1905, and the p-InGaAs/InGaAsP stacked film 1906 are removed from the waveguide portion 1511 and the MMI portion 1531, but remains in the photodetection portion 1501, as illustrated in FIGS. 20A and 20B. As a result of this process, the i-InGaAsP film 1902 is exposed in the waveguide portion 1511 and the MMI portion 1531.

Subsequently, as illustrated in FIGS. 21A and 21B, an i-InP film 2101 is deposited on the exposed i-InGaAsP film 1902 in the waveguide portion 1511 and the MMI portion 1531 by using the MOCVD method. Here, deposition is performed so that the i-InP film 2101 has a thickness of 1.0 μm. The photodetection portion 1501 is covered with the mask 2001 used for the above-described etching, and thus the growth of the i-InP film 2101 in the photodetection portion 1501 may be suppressed. At this time, the i-InP film 2101 rises and is deposited along the side surfaces of the n-InGaAsP film 1903, the i-InGaAs film 1904, the p-InP film 1905, and the p-InGaAs/InGaAsP stacked film 1906, so as to be formed in the shape illustrated in FIG. 21B. After the i-InP film 2101 has been deposited, the mask 2001 is removed.

Subsequently, a mask 2201 for covering a region that is to become a mesa structure in the photodetection portion 1501 is formed on the p-InGaAs/InGaAsP stacked film 1906 in the photodetection portion 1501 and the i-InP film 2101 in the waveguide portion 1511 and the MMI portion 1531, as illustrated in FIGS. 22A and 22B. The mask 2201 is formed to cover the most part of the waveguide portion 1511 and the MMI portion 1531, including the region other than the region that is to become a mesa structure. A silicon oxide film is used as the mask 2201, for example.

At this time, as illustrated in FIGS. 22A and 22B, the mask 2201 is formed so that a non-covered region includes not only the p-InGaAs/InGaAsP stacked film 1906 but also part of the i-InP film 2101, in view of a positioning error of the mask at photoresist exposure. That is, in the mask 2201, a region to be etched is larger than a region to be removed to form a mesa structure in the photodetection portion 1501, so that a margin region for canceling a mask positioning error is provided. The margin region is provided to suppress the occurrence of a phenomenon in which, as a result of displacement of the formation position of the mask 2201 due to a positioning error of the mask at photoresist exposure, the stacked film including the p-InGaAs/InGaAsP stacked film 1906, the p-InP film 1905, the i-InGaAs film 1904, and the n-InGaAsP film 1903 remains at an end of the photodetection portion 1501, and an InGaAs absorption layer remains over a large width.

With known etching using the mask 2201, a mesa structure is formed in the photodetection portion 1501, as illustrated in FIGS. 22A and 22B. In the photodetection portion 1501, the p-InGaAs/InGaAsP stacked film 1906, the p-InP film 1905, and the i-InGaAs film 1904 are removed using the mask 2201. Also, part of the n-InGaAsP film 1903 is removed to a certain width so that the other part remains. With this process, part of the n-InGaAsP film 1903 is exposed. Accordingly, the n-InGaAsP semiconductor layer 1502, the i-InGaAs absorption layer 1503, the p-InP upper clad layer 1504, and the p-type contact layer 1505 illustrated in FIGS. 15 to 18B are formed. As a result, the mesa structure illustrated in FIG. 18B is formed.

As illustrated in FIGS. 22A and 22B, the part exposed by the mask 2201 in the i-InP film 2101 is removed at the same time. With this process, the mesa structure including the i-InP film 2101 adjacent to the mesa structure in the photodetection portion 1501 is formed at the same time. As a result, the mesa structure illustrated in FIG. 18A is formed. After the etching, the mask 2201 is removed.

Figures 23A, 23B:
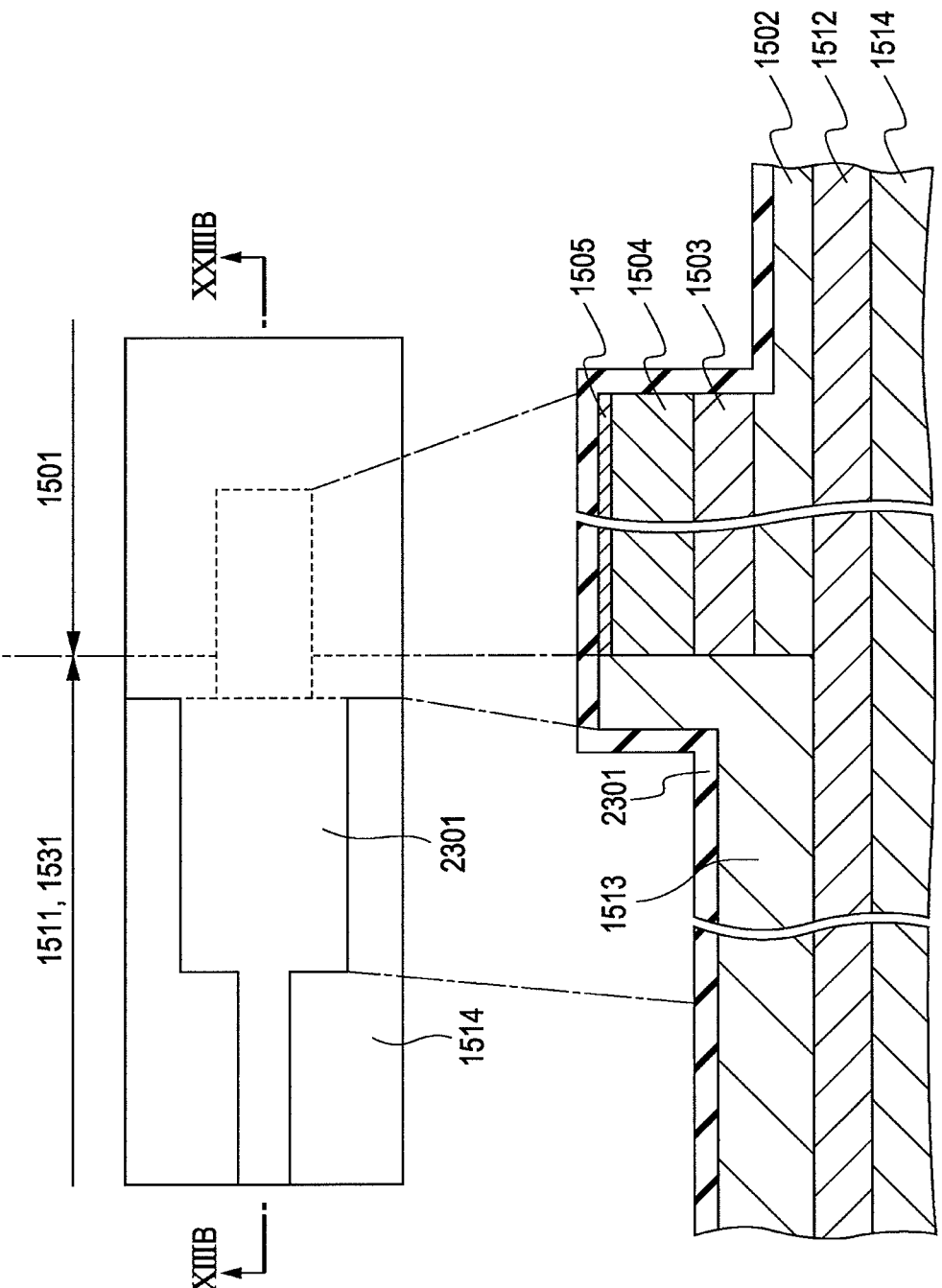
FIG. 23A is a plan view illustrating the example of a process of manufacturing the light receiving element illustrated in FIGS. 15 to 18B.
FIG. 23B is a cross-sectional view taken along line XXIIIB-XXIIIB of FIG. 23A.

Subsequently, a mask 2301 for covering a region that is to become a mesa structure in the waveguide portion 1511 and the MMI portion 1531 is formed on the remaining part of the i-InP film 2101, the mesa structure formed through the etching, and the n-InGaAsP semiconductor layer 1502 exposed through the etching, as illustrated in FIGS. 23A and 23B. The mask 2301 is formed so as to cover the most part of the mesa structure formed through the etching and the n-InGaAsP semiconductor layer 1502 exposed through the etching. A silicon oxide film is used as the mask 2301, for example.

With known etching using the mask 2301, mesa structures are formed in the waveguide portion 1511 and the MMI portion 1531, as illustrated in FIGS. 23A and 23B. In the waveguide portion 1511 and the MMI portion 1531, the i-InP film 2101 and the i-InGaAsP film 1902 are removed using the mask 2301, and also part of the SI-InP substrate 1901 under the i-InGaAsP film 1902 is removed. With this process, part of the SI-InP substrate 1901 is exposed. Accordingly, the i-InGaAsP waveguide core layer 1512 and the i-InP upper clad layer 1513 illustrated in FIGS. 15 to 18B are formed. As a result, the mesa structures illustrated in FIGS. 17A and 17B are formed. After the etching, the mask 2301 is removed.

At this time, the portion covered by the mask 2301 in the mesa structure including the i-InP film 2101 is not etched and remains, as illustrated in FIGS. 23A and 23B. The remaining region corresponding to the mesa structure including the i-InP film 2101 serves as the slab region 1521.

Subsequently, in the photodetection portion 1501, the slab region 1521, the MMI portion 1531, and the waveguide portion 1511, the passivation film 1517 composed of a dielectric material, such as a silicon-nitride film, is formed in the region except the region where a metal electrode is to be formed. After that, as illustrated in FIGS. 24A and 24B, the p-side metal electrode 1515 is formed in an exposed region of the p-type contact layer 1505 at the top of the mesa structure in the photodetection portion 1501 by using a known formation method, such as metal deposition or metal plating. Also, the n-side metal electrode 1516 is formed in an exposed region of the n-InGaAsP semiconductor layer 1502 using a known formation method, such as metal deposition or metal plating. In the plan view illustrated in FIG. 24A, the passivation film 1517 is not illustrated for easy understanding of the structure.

Referring to FIGS. 24A and 24B, a metal electrode having an air bridge structure is used as the p-side metal electrode 1515. As is clear from the cross-sectional view in FIG. 24B, this structure causes the p-side metal electrode 1515 to be electrically insulated by air from the n-InGaAsP semiconductor layer 1502 connected to the n-side metal electrode 1516.

Accordingly, the parasitic capacitance generated between the p-side metal electrode 1515 and the n-side metal electrode 1516 may be reduced. Thus, the capacitance generated in the photodetection portion 1501 may be reduced, and a cutoff frequency obtained based on a CR time constant increases in the transmission path between the light receiving element 1500 and an electric circuit in the subsequent stage. Accordingly, the light receiving element 1500 may supply a detection signal having a sufficient signal level to the electric circuit in the subsequent stage even in a high-frequency band, and the electric circuit in the subsequent stage may process the signal input thereto even in the high-frequency band.

Note that the structure of the p-side metal electrode 1515 is not limited to the air bridge structure. For example, an insulator may be formed in advance at the position where the p-side metal electrode 1515 is to be formed, and the p-side metal electrode 1515 may be formed on the insulator. In FIGS. 24A and 24B, part of the n-InGaAsP semiconductor layer 1502 remains in a portion opposite to the waveguide portion 1511 and the MMI portion 1531 regarding a PD, and the p-side metal electrode 1515 is formed on the part of the n-InGaAsP semiconductor layer 1502 via the passivation film 1517. Alternatively, the part of the n-InGaAsP semiconductor layer 1502 may be removed. Accordingly, the capacitance of the p-side metal electrode 1515 may be decreased, and the characteristic of a high-frequency band may be further enhanced.

2. Second Embodiment 2-1. Structure of Light Receiving Element 2500

Figure 25:
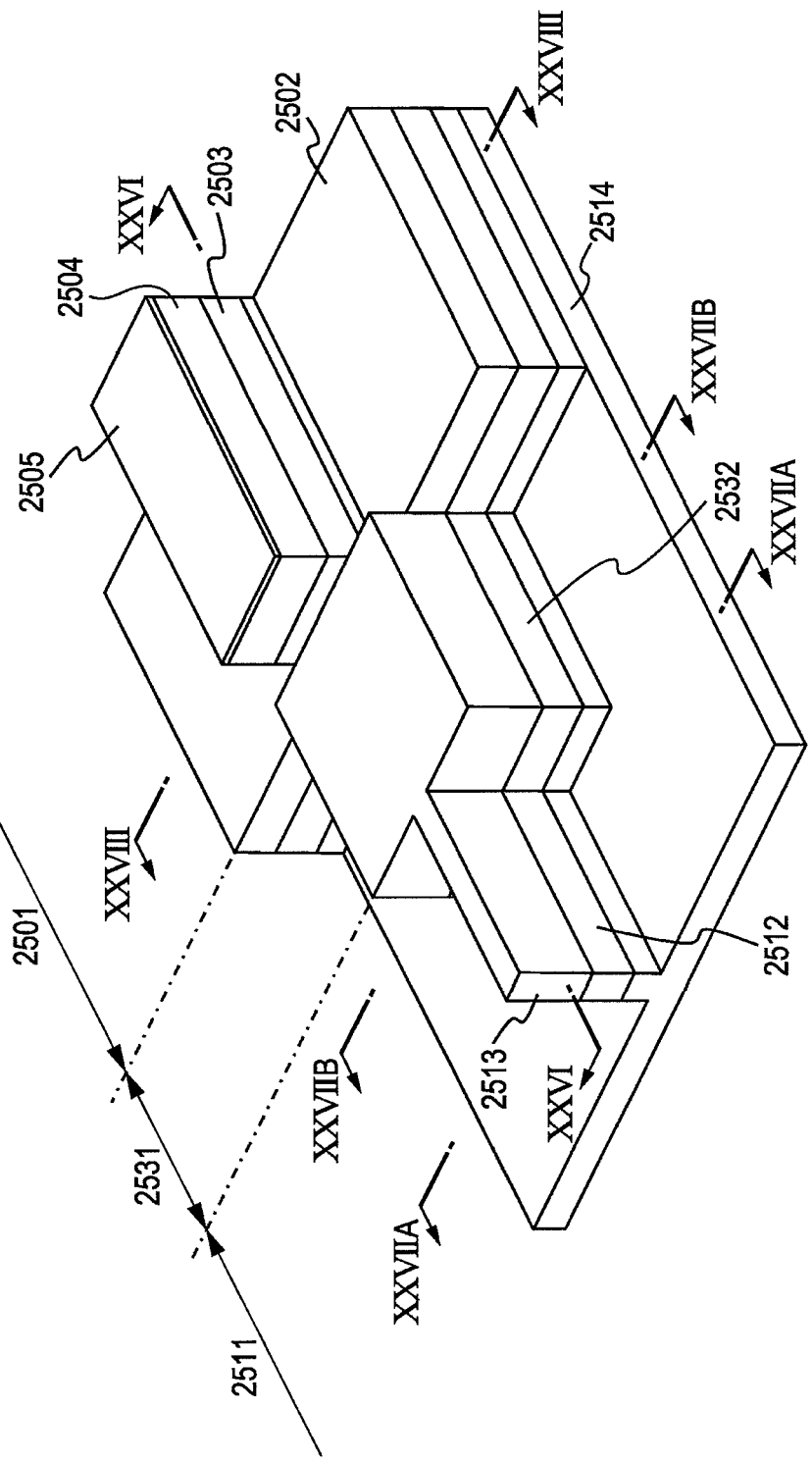
FIG. 25 is a perspective view illustrating an example of the structure of a light receiving element according to a second embodiment, and illustrates only a main part of the light receiving element.
Figure 26:
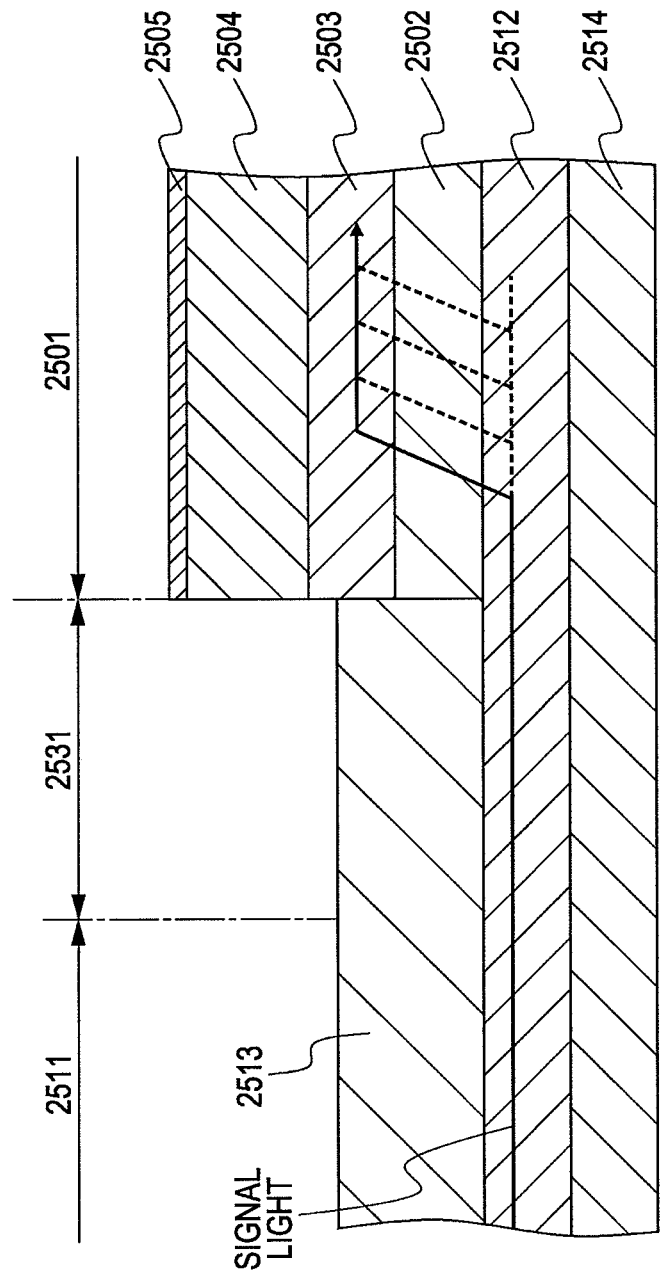
FIG. 26 is a cross-sectional view of the light receiving element taken along line XXVI-XXVI of FIG. 25.
Figure 28:
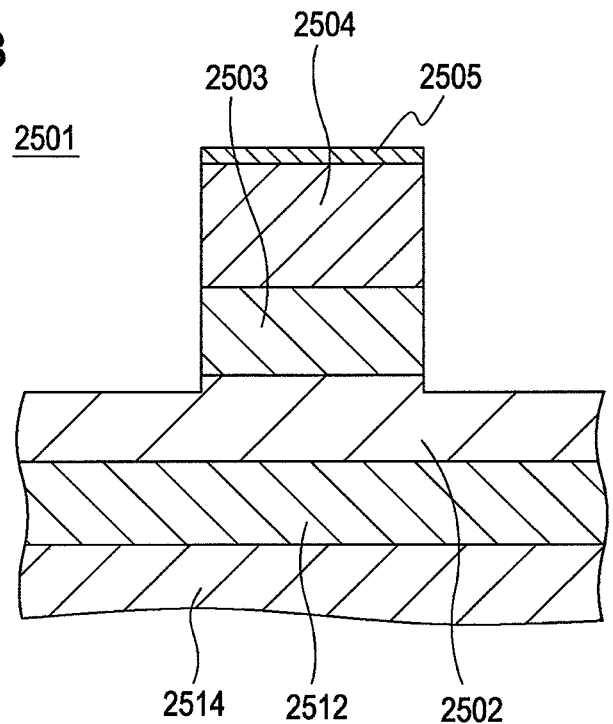
FIG. 28 is a cross-sectional view of the light receiving element taken along line XXVIII-XXVIII of FIG. 25.

FIG. 25 is a perspective view illustrating an example of the structure of a light receiving element 2500 according to a second embodiment, and illustrates only a main part of the light receiving element 2500. FIG. 26 is a cross-sectional view of the light receiving element 2500 taken along line XXVI-XXVI of FIG. 25. FIG. 27A is a cross-sectional view of the light receiving element 2500 taken along line XXVIIA-XXVIIA of FIG. 25. FIG. 27B is a cross-sectional view of the light receiving element 2500 taken along line XXVIIB-XX- VIIB of FIG. 25. FIG. 28 is a cross-sectional view of the light receiving element 2500 taken along line XXVIII-XXVIII of FIG. 25.

The light receiving element 2500 illustrated in FIG. 25 is different from the light receiving element 700 illustrated in FIG. 7 in that no slab region exists between a photodetection portion and an MMI portion. Other than that, the light receiving element 2500 is similar to the light receiving element 700.

As described above, the slab region 721 in the light receiving element 700 is generated as a result of providing a margin region when a hard mask for forming the mesa structure in the photodetection portion 701 is formed to address a positioning error of a mask at photoresist exposure in the process of fabricating the photodetection portion 701, for example. However, it is not necessary to provide the margin region to the above-described hard mask if sufficient positioning accuracy of a mask at photoresist exposure is ensured in the process of manufacturing the light receiving element 2500. Therefore, in this case, no slab region is formed. The light receiving element 2500 illustrated in FIG. 25 has a structure without a slab region.

As illustrated in FIGS. 25 and 26, the light receiving element 2500 includes a photodetection portion 2501 disposed on a substrate 2514, a waveguide portion 2511 disposed on the same substrate 2514, and an MMI portion 2531 disposed on the same substrate 2514.

As illustrated in FIG. 27A, the waveguide portion 2511 has a structure in which a waveguide core layer 2512 and an upper clad layer 2513 are staked from the substrate 2514 side. The material of the individual layers in this stacked structure is a semiconductor material, for example. The waveguide portion 2511 has a mesa structure including the upper clad layer 2513 and the waveguide core layer 2512. Signal light propagates in the waveguide core layer 2512 and enters the MMI portion 2531.

As illustrated in FIG. 28, the photodetection portion 2501 has a structure in which the waveguide core layer 2512, an n-type semiconductor layer 2502, an i-type absorption layer 2503, a p-type upper clad layer 2504, and a p-type contact layer 2505 are stacked from the substrate 2514 side. The material of the individual layers in this stacked structure is a semiconductor material, for example. The photodetection portion 2501 has a mesa structure including the p-type contact layer 2505, the upper clad layer 2504, the i-type absorption layer 2503, and part of the n-type semiconductor layer 2502. The width of the mesa structure in the photodetection portion 2501 is larger than the width of the mesa structure in the waveguide portion 2511. In the photodetection portion 2501, a stacked structure including the waveguide core layer 2512 and the n-type semiconductor layer 2502 exists outside the mesa structure. The n-type semiconductor layer 2502, the i-type absorption layer 2503, and the upper clad layer 2504 form a PIN-type photodiode.

The n-type semiconductor layer 2502 has a refractive index which is higher than the refractive index of the waveguide core layer 2512 and is lower than the refractive index of the i-type absorption layer 2503. That is, the n-type semiconductor layer 2502 has a band gap wavelength which is longer than the band gap wavelength of the waveguide core layer 2512 and is shorter than the band gap wavelength of the i-type absorption layer 2503. The n-type semiconductor layer 2502 has a composition in which the absorptance with respect to signal light is sufficiently low.

As illustrated in FIG. 27B, the MMI portion 2531 has a structure in which the waveguide core layer 2512 and the upper clad layer 2513 are staked from the substrate 2514 side. The material of the individual layers in this stacked structure is a semiconductor material, for example. The MMI portion 2531 has a mesa structure including the upper clad layer 2513 and the waveguide core layer 2512. Signal light that has entered the MMI portion 2531 propagates in the waveguide core layer 2512 and directly enters the photodetection portion 2501 without via a slab region. The waveguide core layer 2512 is shared by the photodetection portion 2501, the waveguide portion 2511, and the MMI portion 2531.

The MMI portion 2531 includes a 1×1 MMI waveguide 2532 including one input and one output. At least part of the waveguide core layer 2512 in the MMI portion 2531 has a width that is larger than the width of the waveguide core layer 2512 in the waveguide portion 2511. The large-width portion of the waveguide core layer 2512 functions as the MMI waveguide 2532. The width of the MMI waveguide 2532 is larger than the width of the mesa structure in each of the waveguide portion 2511 and the photodetection portion 2501.

The length Lmmi of the MMI waveguide 2532 is set so that a point at which self-imaging occurs (self-imaging point) is positioned in the photodetection portion 2501, particularly in a region below the i-type absorption layer 2503 in the waveguide core layer 2512. More specifically, the length Lmmi of the MMI waveguide 2532 is set so as to be smaller than 100% of the length Lsi at which self-imaging occurs and larger than 70% of the length Lsi. Likewise, the length Lmmi of the MMI waveguide is set so as to be longer than (N−0.3)× 100% of the length Lsi_mins at which self-imaging occurs in the MMI waveguide and shorter than N×100% of the length Lsi_min. The length Lsi_min is the shortest length where self-imaging occurs in the MMI waveguide, and N is a natural number. The manner of setting the length Lmmi of the MMI waveguide 2532 is the same as that in the light receiving element 700 according to the first embodiment described above.

As illustrated in FIG. 26, in the light receiving element 2500, signal light propagates in the waveguide core layer 2512 in the waveguide portion 2511, and enters the MMI waveguide 2532 in the MMI portion 2531. In the MMI waveguide 2532, as in the MMI waveguide 732, signal light converges in the direction orthogonal to the signal light travel direction in the output portion. Accordingly, the converged signal light enters the waveguide core layer 2512 in the photodetection portion 2501. The signal light then diffuses from the waveguide core layer 2512 into the i-type absorption layer 2503 via the n-type semiconductor layer 2502, and is absorbed by the i-type absorption layer 2503.

A p-side electrode and an n-side electrode (not illustrated) are connected to the p-type contact layer 2505 and the n-type semiconductor layer 2502, respectively. A certain voltage for causing the p-side electrode to be at a negative potential and the n-side electrode to be at a positive potential is applied between the p-side electrode and the n-side electrode. Accordingly, photocarriers (holes and electrons) generated through light absorption in the i-type absorption layer 2503 are detected via the upper clad layer 2504 and the n-type semiconductor layer 2502. Accordingly, the photodetection portion 2501 detects signal light as an electric signal (photocarrier current), and outputs a detection signal (photocarrier current) corresponding to the intensity of the signal light to an electric circuit in the subsequent stage.

The structure described above as a specific example of the structure of the light receiving element 700 according to the first embodiment may be used as a specific example of the structure of the light receiving element 2500 according to the second embodiment. Note that no slab region is formed, as described above.

Also, the method described above as a method for manufacturing the light receiving element 700 may be used as a method for manufacturing the light receiving element 2500. Note that no margin region is provided in a hard mask for forming the mesa structure in the photodetection portion 2501.

2-2. Light Intensity Distribution of Signal Light in Light Receiving Element 2500

Figure 29:
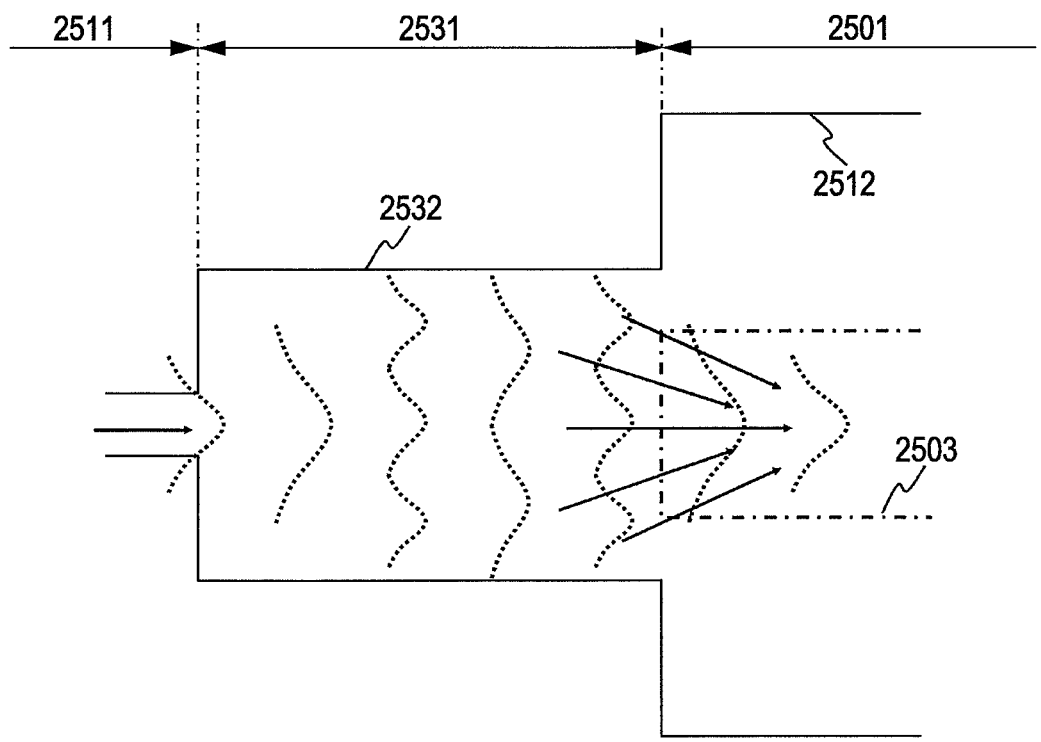
FIG. 29 illustrates a light intensity distribution of signal light in the light receiving element illustrated in FIGS. 25 and 26.

FIG. 29 illustrates a light intensity distribution of signal light in the light receiving element 2500 illustrated in FIGS. 25 and 26. Solid lines represent the shape of the waveguide core layer 2512 viewed from the upper side of the substrate 2514. Dotted-chain lines represent the shape of the i-type absorption layer 2503 viewed from the upper side of the substrate 2514. Broken lines represent an example of a light intensity distribution of signal light. Arrows indicate radiation directions of signal light.

Referring to FIG. 29, in the MMI waveguide 2532 in the MMI portion 2531, a self-imaging point is positioned in a region below the i-type absorption layer 2503 in the waveguide core layer 2512 in the photodetection portion 2501. The length Lmmi of the MMI waveguide 2532 is 85% of the length Lsi at which self-imaging occurs, for example.

As illustrated in FIG. 29, signal light propagates in the waveguide core layer 2512 and enters from the waveguide portion 2511 into the MMI portion 2531. After that, as described above with reference to FIG. 11, the signal light converges in the direction orthogonal to the signal light travel direction in the output portion of the MMI waveguide 2532. In the output portion of the MMI waveguide 2532, the signal light converges in the direction orthogonal to the signal light travel direction, as indicated by the arrows. Accordingly, the signal light enters the photodetection portion 2501 while maintaining a propagation state in the convergence direction.

In the photodetection portion 2501, as in the photodetection portion 701 in the light receiving element 700, the width of the waveguide core layer 2512 is larger than the width of the i-type absorption layer 2503 by at least the region connected to the n-side electrode.

In contrast, in the waveguide portion 2511, the width of the waveguide core layer 2512 is smaller than the width of the i-type absorption layer 2503. In the MMI portion 2531, the width of the waveguide core layer 2512 is larger than the width of the waveguide core layer 2512 in the waveguide portion 2511, and is sufficiently smaller than the width of the waveguide core layer 2512 in the photodetection portion 2501. As a result, signal light enters from the waveguide portion 2511 and the MMI portion 2531 having a small width into the photodetection portion 2501 having a sufficiently large width.

The waveguide portion 2511 has a mesa structure of a small width, and thus has a strong light confinement effect of confining signal light in the direction orthogonal to the signal light travel direction. Also, the MMI portion 2531 has a strong light confinement effect because the MMI waveguide 2532 has a mesa structure. In contrast, the photodetection portion 2501 has a weak effect of confining incident signal light in the direction orthogonal to the signal light travel direction, like the photodetection portion 701.

Figure 2:
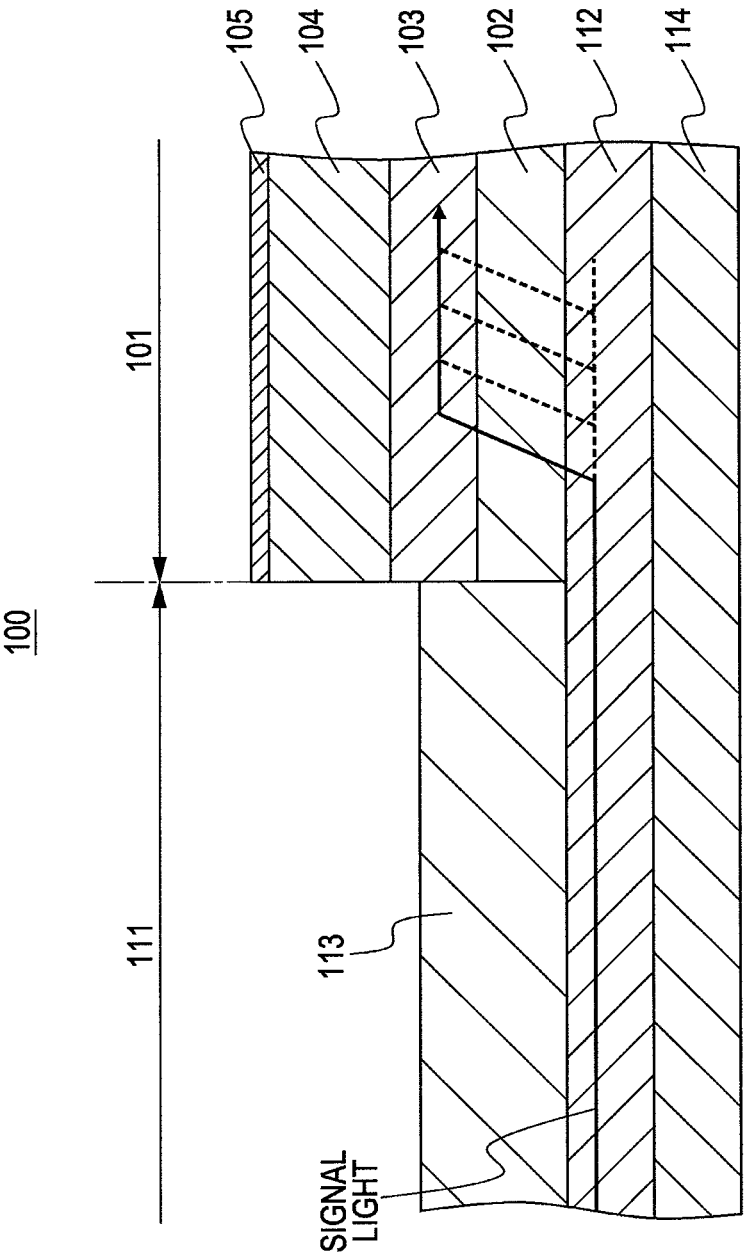
FIG. 2 is a cross-sectional view of the light receiving element taken along line II-II of FIG. 1.

Therefore, in the light receiving element 2500, as in the light receiving element 100 illustrated in FIGS. 1 and 2 (a case where no slab region is provided), signal light enters from the waveguide portion 2511 and the MMI portion 2531 having a small width and a strong light confinement effect into the photodetection portion 2501 having a sufficiently large width and a weak light confinement effect. In this case, as in the case of the light receiving element 100, the photodetection portion 2501 has low ability of suppressing expansion of the light intensity distribution of signal light in the direction orthogonal to the signal light travel direction.

However, in the light receiving element 2500, signal light enters the photodetection portion 2501 while maintaining a propagation state in the convergence direction, as described above. The signal light that has entered the photodetection portion 2501 is absorbed by the i-type absorption layer 2503. At this time, the self-imaging point of the MMI waveguide 2532 is positioned in a region below the i-type absorption layer 2503 in the waveguide core layer 2512 in the photodetection portion 2501, and the signal light propagates in the convergence direction. Accordingly, a larger part of incident signal light may be converged to the region below the i-type absorption layer 2503 in the waveguide core layer 2512, compared to the light receiving element 100. Accordingly, the part of signal light that is not absorbed and is radiated to the outside of the i-type absorption layer 2503 may be decreased.

Accordingly, in the light receiving element 2500, the light absorption efficiency may be increased compared to the light receiving element 100 (without MMI waveguide).

More specifically, in the light receiving element 2500, as is clear from the simulation result illustrated in FIG. 13, the length Lmmi of the MMI waveguide 2532 is set to be larger than 70% of the length Lsi at which self-imaging occurs and to be smaller than 100% of the length Lsi, so that the light absorption efficiency may be increased compared to the light receiving element 100 (without MMI waveguide).

3. Third Embodiment

Figure 30:
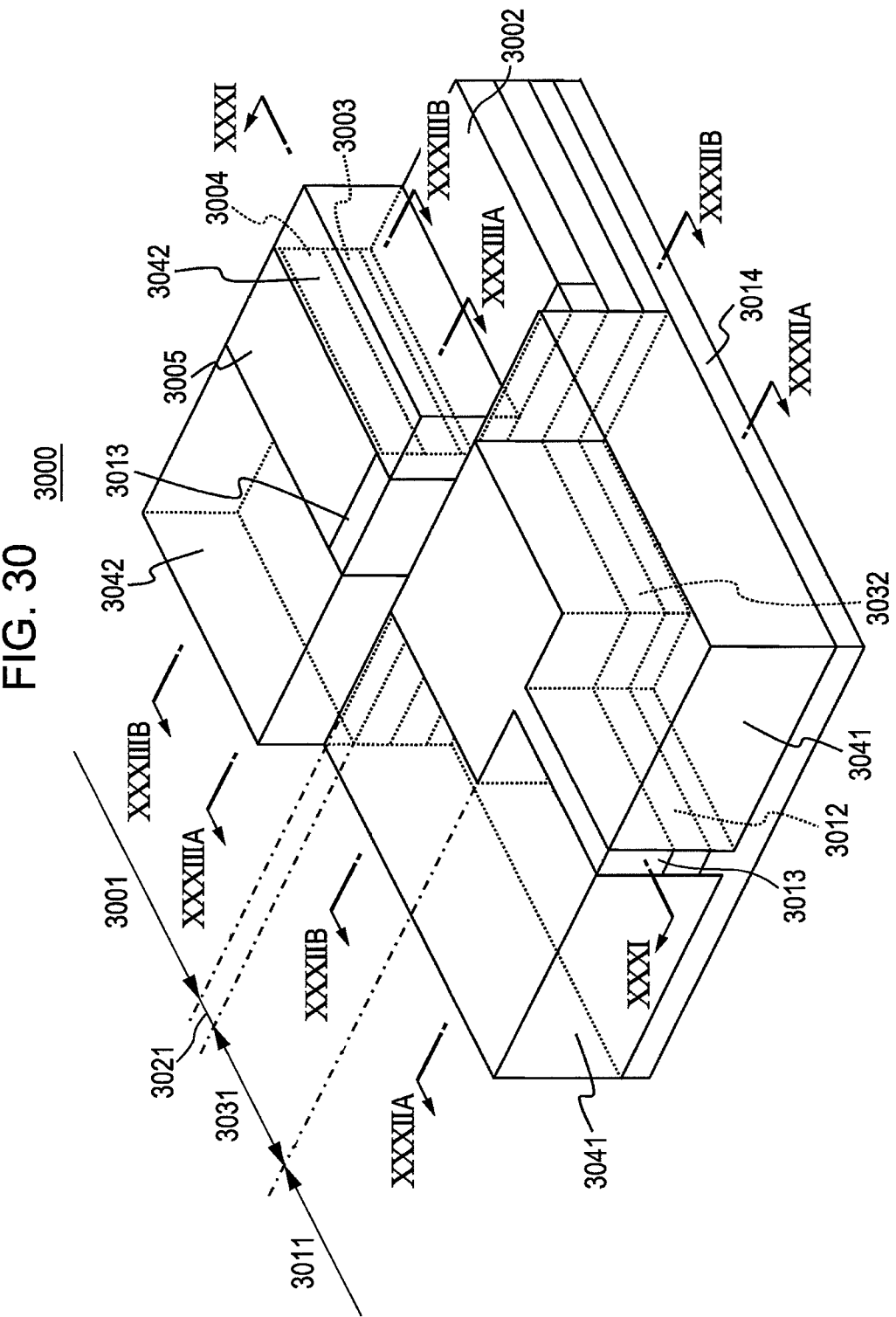
FIG. 30 is a perspective view illustrating an example of the structure of a light receiving element according to a third embodiment, and illustrates only a main part of the light receiving element.
Figure 31:
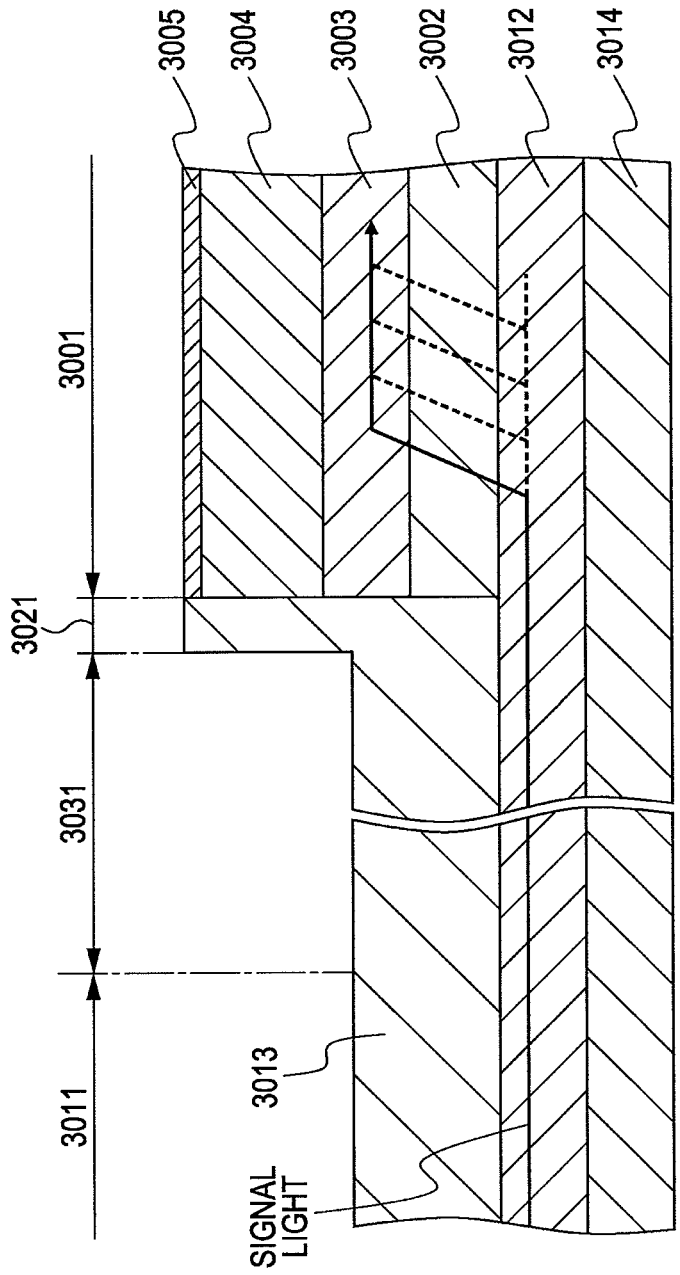
FIG. 31 is a cross-sectional view of the light receiving element taken along line XXXI-XXXI of FIG. 30.
Figure 32B:
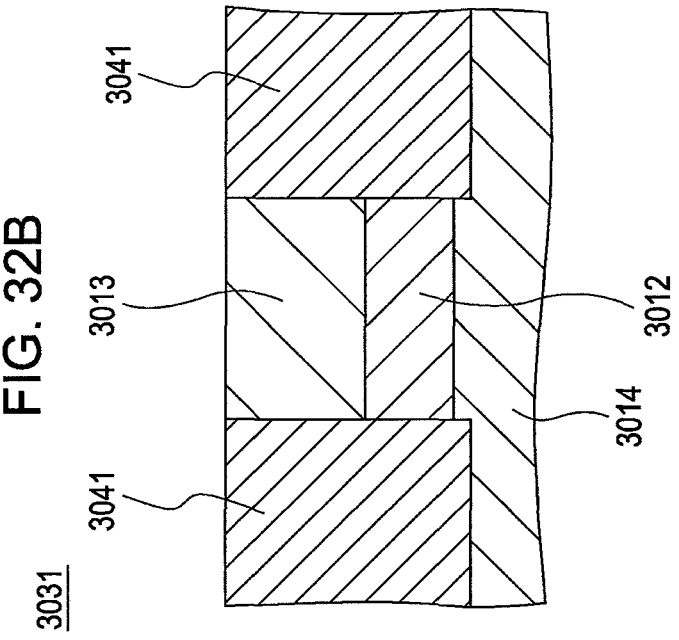
FIG. 32B is a cross-sectional view of the light receiving element taken along line XXXIIB-XXXIIB of FIG. 30.
Figure 32A:
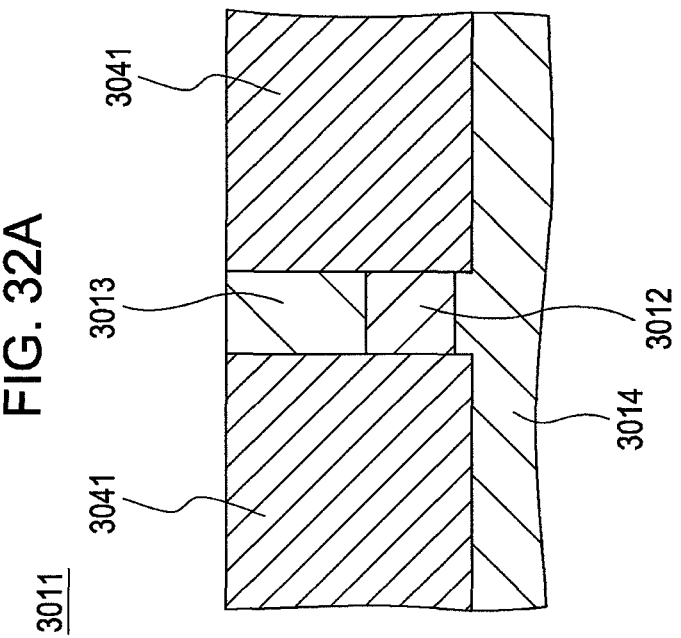
FIG. 32A is a cross-sectional view of the light receiving element taken along line XXXIIA-XXXIIA of FIG. 30.
Figure 33B:
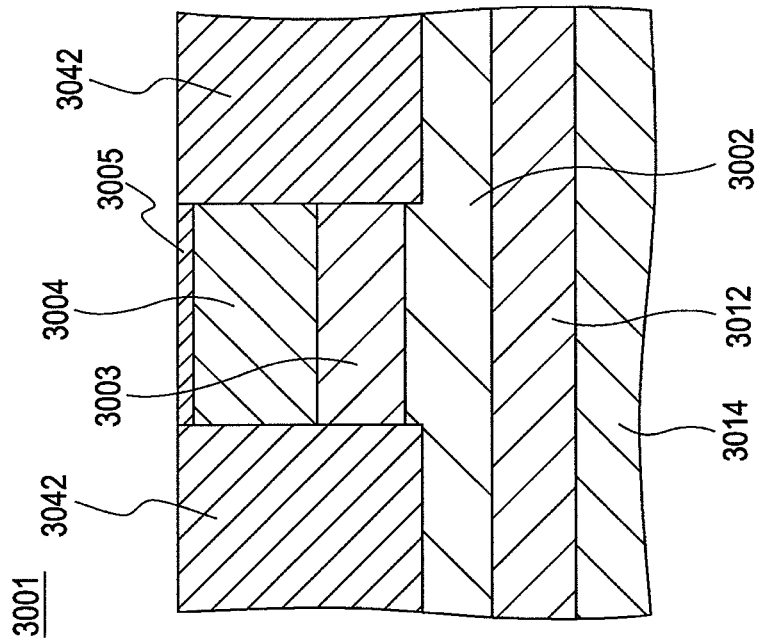
FIG. 33B is a cross-sectional view of the light receiving element taken along line XXXIIIB-XXXIIIB of FIG. 30.
Figure 33A:
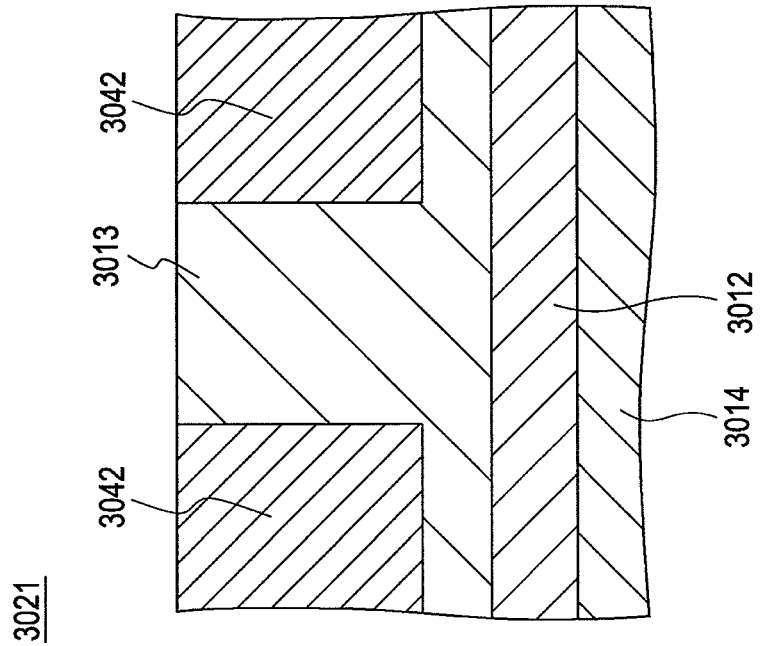
FIG. 33A is a cross-sectional view of the light receiving element taken along line XXXIIIA-XXXIIIA of FIG. 30.

FIG. 30 is a perspective view illustrating an example of the structure of a light receiving element 3000 according to a third embodiment, and illustrates only a main part of the light receiving element 3000. FIG. 31 is a cross-sectional view of the light receiving element 3000 taken along line XXXI-XXXI of FIG. 30. FIG. 32A is a cross-sectional view of the light receiving element 3000 taken along line XXXIIA-XXXIIA of FIG. 30. FIG. 32B is a cross-sectional view of the light receiving element 3000 taken along line XXXIIB-XXXIIB of FIG. 30. FIG. 33A is a cross-sectional view of the light receiving element 3000 taken along line XXXIIIA-XXXIIIA of FIG. 30. FIG. 33B is a cross-sectional view of the light receiving element 3000 taken along line XXXIIIB-XXXIIIB of FIG. 30.

The light receiving element 3000 illustrated in FIGS. 30 and 31 is called an embedded-type light receiving element. The light receiving element 3000 is different from the light receiving element 700 illustrated in FIG. 7 in that an embedded layer is formed in a side surface portion of the mesa structure in each of a waveguide portion, an MMI portion, a slab region, and a photodetection portion. Other than that, the light receiving element 3000 is similar to the light receiving element 700.

As illustrated in FIGS. 32A and 32B, an embedded layer 3041 is formed in a side surface portion of the mesa structure in each of a waveguide portion 3011 and an MMI portion 3031. As illustrated in FIGS. 33A and 33B, an embedded layer 3042 is formed in a side surface portion of the mesa structure in each of a slab region 3021 and a photodetection portion 3001, except a region provided with an n-side electrode on an n-type semiconductor layer 3002. Preferably, the material of the embedded layers 3041 and 3042 is a semiconductor material that is the same as or similar to the semiconductor material of at least one of upper clad layers 3004 and 3013.

The structure of the light receiving element 3000 is the same as that of the light receiving element 700 illustrated in FIGS. 7 to 10B except the point described above, and thus the corresponding description is omitted. In the light receiving elements 3000 and 700, the elements denoted by reference numerals with the same two last digits correspond to each other.

In the light receiving element 3000, as in the light receiving element 700, an MMI waveguide 3032 is provided. Thus, signal light enters the slab region 3021 and the photodetection portion 3001 while maintaining a propagation state in the convergence direction. Accordingly, in the light receiving element 3000, the light absorption efficiency may be increased compared to the light receiving elements 100 and 300 illustrated in FIGS. 1 to 4. Particularly, in the light receiving element 3000, the light absorption efficiency may be increased even though the slab region 3021 having a weak light confinement effect is disposed between the waveguide portion 3011 and the photodetection portion 3001.

Also, when the distance from an end of the MMI waveguide 3032 on the side where signal light enters (input portion) to an end of the photodetection portion 3001 on the side where signal light enters (incident end) is longer than 70% of the length Lsi at which self-imaging occurs in the MMI waveguide 3032 and is shorter than 100% of the length Lsi, the light absorption efficiency may be increased compared to the light receiving elements 100 and 300. Likewise, when the distance from an end of the MMI waveguide on the side where signal light enters (input portion) to an end of the photodetection portion on the side where signal light enters (incident end) is longer than (N−0.3)×100% of the length Lsi_min at which self-imaging occurs in the MMI waveguide and shorter than N×100% of the length Lsi_min, the light absorption efficiency may be increased compared to the light receiving element 100. The length Lsi_min is the shortest length where self-imaging occurs in the MMI waveguide, and N is a natural number.

In addition, in the light receiving element 3000, when the material of the embedded layer 3042 is a semiconductor material that is the same as or similar to the material of the upper clad layer 3013 in the slab region 3021, the structure of the slab region 3021 is a more complete slab structure from the optical viewpoint, as illustrated in FIG. 33A.

That is, in the slab region 721 illustrated in FIG. 10A, the side surface portion of the mesa structure is filled with air, and thus a difference in refractive index occurs between the air in the side surface portion of the mesa structure and the semiconductor material of the upper clad layer 713 that forms the mesa structure. In the slab region 721, a certain light confinement effect is generated, though slightly, due to the difference in refractive index.

In contrast, in the slab region 3021, when the semiconductor material of the upper clad layer 3013 that forms the mesa structure and the semiconductor material of the embedded layer 3042 are the same or are similar to each other, a difference in refractive index does not occur between both the semiconductor materials. For this reason, the slab region 3021 hardly has a light confinement effect. Thus, the light confinement effect in the slab region 3021 is weaker than the light confinement effect in the slab region 721 in the light receiving element 700.

Accordingly, in the light receiving element 3000, the ability of the slab region 3021 of suppressing expansion of the light intensity distribution of signal light in the direction orthogonal to the light signal travel direction is lower than that of the slab region 721. Therefore, in the light receiving element 3000, degradation of light absorption efficiency caused by the slab region is more likely to occur than in the light receiving element 700.

However, in the light receiving element 3000, signal light enters the slab region 3021 while maintaining a propagation state in the convergence direction, due to the effect of the MMI waveguide 3032, as in the light receiving element 700. Accordingly, the signal light may be maintained in a propagation state in the convergence direction also in the slab region 3021, and the signal light enters from the slab region 3021 into the photodetection portion 3001 while maintaining the propagation state in the convergence direction. Accordingly, a large part of incident signal light may be converged to a region below an i-type absorption layer 3003 in a waveguide core layer 3012.

Therefore, in the light receiving element 3000, which is an embedded-type light receiving element in which degradation of light absorption efficiency is more likely to occur, degradation of light absorption efficiency caused by the slab region may be suppressed, and the light absorption efficiency may be increased.

The structure described above as a specific example of the structure of the light receiving element 700 according to the first embodiment may be used as a specific example of the structure of the light receiving element 3000 according to the third embodiment. Note that an SI-InP embedded layer is formed in a side surface portion of the mesa structure in each of the waveguide portion 3011, the MMI portion 3031, the slab region 3021, and the photodetection portion 3001.

Also, the method described above as a method for manufacturing the light receiving element 700 may be used as a method for manufacturing the light receiving element 3000. Note that a step of forming an SI-InP embedded layer is performed before forming a passivation film in the photodetection portion 3001, the slab region 3021, the MMI portion 3031, and the waveguide portion 3011.

4. Fourth Embodiment 4-1. Structure of Light Receiving Element 3400

Figure 34:
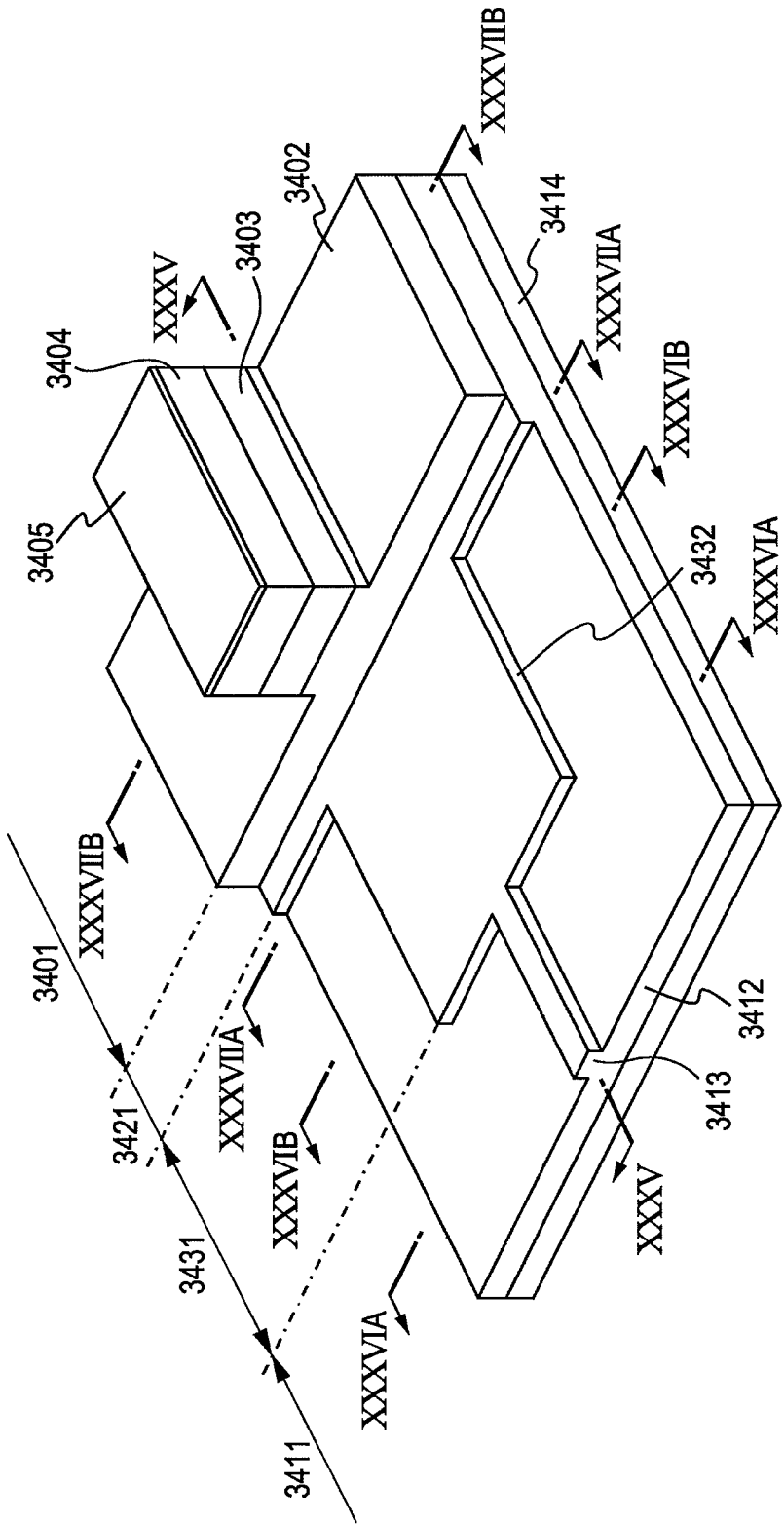
FIG. 34 is a perspective view illustrating an example of the structure of a light receiving element according to a fourth embodiment, and illustrates only a main part of the light receiving element.
Figure 35:
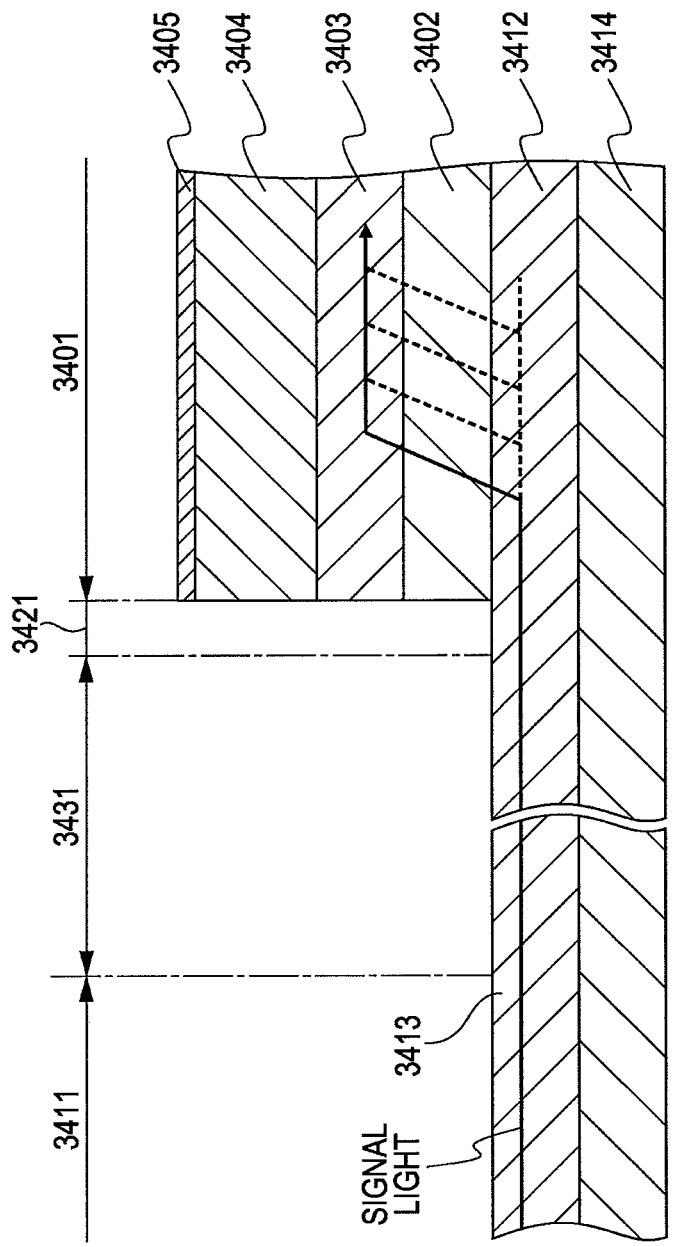
FIG. 35 is a cross-sectional view of the light receiving element taken along line XXXV-XXXV of FIG. 34.
Figure 36A:
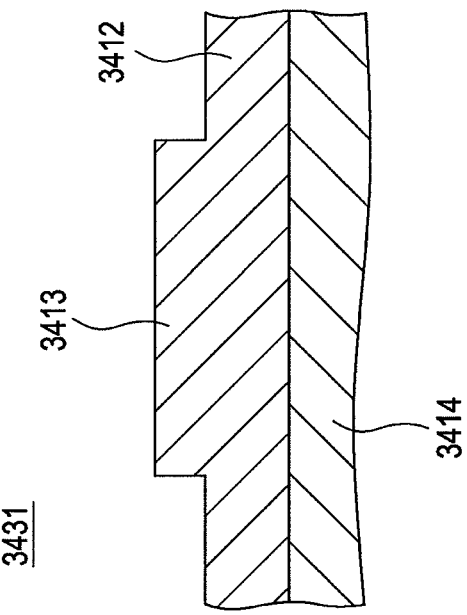
FIG. 36A is a cross-sectional view of the light receiving element taken along line XXXVIA-XXXVIA of FIG. 34.
Figure 36B:
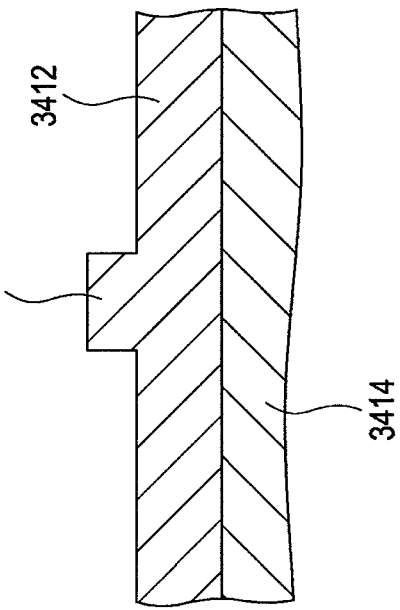
FIG. 36B is a cross-sectional view of the light receiving element taken along line XXXVIB-XXXVIB of FIG. 34.
Figure 37B:
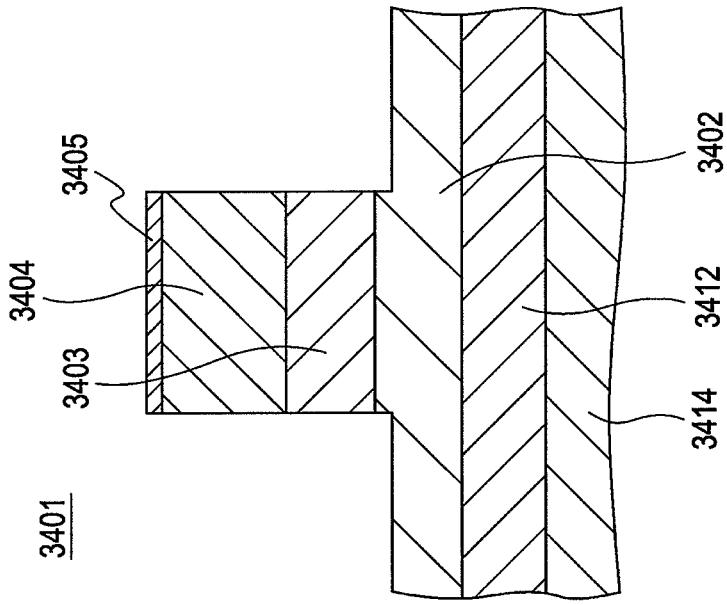
FIG. 37B is a cross-sectional view of the light receiving element taken along line XXXVIIB-XXXVIIB of FIG. 34.
Figure 37A:
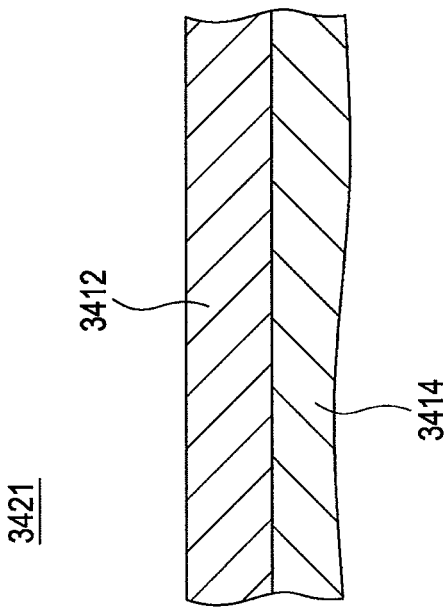
FIG. 37A is a cross-sectional view of the light receiving element taken along line XXXVIIA-XXXVIIA of FIG. 34.

FIG. 34 is a perspective view illustrating an example of the structure of a light receiving element 3400 according to a fourth embodiment, and illustrates only a main part of the light receiving element 3400. FIG. 35 is a cross-sectional view of the light receiving element 3400 taken along line XXXV-XXXV of FIG. 34. FIG. 36A is a cross-sectional view of the light receiving element 3400 taken along line XXX-VIA-XXXVIA of FIG. 34. FIG. 36B is a cross-sectional view of the light receiving element 3400 taken along line XXX-VIB-XXXVIB of FIG. 34. FIG. 37A is a cross-sectional view of the light receiving element 3400 taken along line XXX-VIIA-XXXVIIA of FIG. 34. FIG. 37B is a cross-sectional view of the light receiving element 3400 taken along line XXXVIIB-XXXVIIB of FIG. 34.

In the light receiving element 3400 illustrated in FIG. 34, the structures of the waveguide portion, the MMI portion, and the slab region are different from those in the light receiving element 700 illustrated in FIG. 7. Other than that, the light receiving element 3400 is similar to the light receiving element 700.

As illustrated in FIGS. 34 and 35, the light receiving element 3400 includes a photodetection portion 3401 disposed on a substrate 3414, a waveguide portion 3411 disposed on the same substrate 3414, a slab region 3421 disposed on the same substrate 3414, and an MMI portion 3431 disposed on the same substrate 3414.

As illustrated in FIG. 36A, the waveguide portion 3411 includes a rib-type waveguide layer 3412 disposed on the substrate 3414. The material of the waveguide layer 3412 is a semiconductor material, for example. In the waveguide portion 3411, no upper clad layer is disposed on the waveguide layer 3412. Signal light propagates in a protrusion (core layer) 3413 of the waveguide layer 3412 and enters the MMI portion 3431.

As illustrated in FIG. 37B, the photodetection portion 3401 has a structure in which the waveguide layer (core layer) 3412, an n-type semiconductor layer 3402, an i-type absorption layer 3403, a p-type upper clad layer 3404, and a p-type contact layer 3405 are stacked from the substrate 3414 side. The material of the individual layers in this stacked structure is a semiconductor material, for example. The photodetection portion 3401 has a mesa structure including the p-type contact layer 3405, the p-type upper clad layer 3404, the i-type absorption layer 3403, and part of the n-type semiconductor layer 3402. The width of the mesa structure in the photodetection portion 3401 is larger than the width of the mesa structure in the waveguide portion 3411. In the photodetection portion 3401, a stacked structure including the waveguide layer (core layer) 3412 and the n-type semiconductor layer 3402 exists outside the mesa structure. The n-type semiconductor layer 3402, the i-type absorption layer 3403, and the p-type upper clad layer 3404 form a PIN-type photodiode.

The n-type semiconductor layer 3402 has a refractive index which is higher than the refractive index of the waveguide layer 3412 and is lower than the refractive index of the i-type absorption layer 3403. That is, the n-type semiconductor layer 3402 has a band gap wavelength which is longer than the band gap wavelength of the waveguide layer 3412 and is shorter than the band gap wavelength of the i-type absorption layer 3403. The n-type semiconductor layer 3402 has a composition in which the absorptance with respect to signal light is sufficiently low.

As illustrated in FIG. 37A, the slab region 3421 includes the slab-shaped (flat) waveguide layer (core layer) 3412 on the substrate 3414. In the slab region 3421, no upper clad layer is disposed on the waveguide layer (core layer) 3412. Unlike the photodetection portion 3401, the slab region 3421 includes the slab-shaped (flat) waveguide layer (core layer) 3412 but does not have a mesa structure including an i-type absorption layer and an n-type semiconductor layer. Signal light that has entered the slab region 3421 propagates in the waveguide layer 3412 and enters the photodetection portion 3401.

The slab region 3421 is generated as a result of providing a margin region at the time of forming a hard mask for forming the mesa structure in the photodetection portion 3401 in order to address a positioning error of a mask during photoresist exposure in the process of fabricating the photodetection portion 3401, for example. Details will be given below.

As illustrated in FIG. 36B, the MMI portion 3431 includes the rib-type waveguide layer 3412 on the substrate 3414. The material of the waveguide layer 3412 is a semiconductor material, for example. In the MMI portion 3431, no upper clad layer is disposed on the waveguide layer 3412. Signal light that has entered the MMI portion 3431 propagates in the protrusion (core layer) 3413 of the waveguide layer 3412 and enters the photodetection portion 3401. The waveguide layer 3412 is shared by the photodetection portion 3401, the waveguide portion 3411, the slab region 3421, and the MMI portion 3431.

The MMI portion 3431 includes a 1×1 MMI waveguide 3432 including one input and one output. At least part of the protrusion (core layer) 3413 of the waveguide layer 3412 in the MMI portion 3431 has a width larger than the width of the protrusion (core layer) 3413 of the waveguide layer 3412 in the waveguide portion 3411. The large-width portion of the protrusion (core layer) 3413 of the waveguide layer 3412 functions as the MMI waveguide 3432. The width of the MMI waveguide 3432 is larger than the width of the protrusion (core layer) 3413 of the waveguide layer 3412 in the waveguide portion 3411 and the mesa structure in the photodetection portion 3401.

The length Lmmi of the MMI waveguide 3432 is set so that a point at which self-imaging in the MMI waveguide 3432 occurs (self-imaging point) is positioned in the photodetection portion 3401, particularly in a region below the i-type absorption layer 3403 in the waveguide layer 3412 in the photodetection portion 3401. More specifically, the length Lmmi of the MMI waveguide 3432 is set so that the distance from an end of the MMI waveguide 3432 on the side where signal light enters (input portion) to an end of the photodetection portion 3401 on the side where signal light enters (incident end) is longer than 70% of the length Lsi at which self-imaging occurs in the MMI waveguide 3432 and is shorter than 100% of the length Lsi. Likewise, the length Lmmi of the MMI waveguide is set so that the distance from an end of the MMI waveguide on the side where signal light enters (input portion) to an end of the photodetection portion on the side where signal light enters (incident end) is longer than (N−0.3)×100% of the length Lsi_min at which self-imaging occurs in the MMI waveguide and shorter than N×100% of the length Lsi_min. The length Lsi_min is the shortest length where self-imaging occurs in the MMI waveguide, and N is a natural number.

The manner of setting the length Lmmi of the MMI waveguide 3432 is the same as that described above regarding the light receiving element 700 according to the first embodiment.

As illustrated in FIG. 35, in the light receiving element 3400, signal light propagates in the protrusion (core layer) 3413 of the waveguide layer 3412 in the waveguide portion 3411, and enters the MMI waveguide 3432 in the MMI portion 3431. Like the MMI waveguide 732, the MMI waveguide 3432 converges, in its output portion, signal light in the direction orthogonal to the signal light travel direction. Accordingly, the converged signal light enters the waveguide layer (core layer) 3412 in the photodetection portion 3401. The signal light then diffuses from the waveguide layer 3412 into the i-type absorption layer 3403 via the n-type semiconductor layer 3402, and is absorbed by the i-type absorption layer 3403.

A p-side electrode and an n-side electrode (not illustrated) are connected to the p-type contact layer 3405 and the n-type semiconductor layer 3402, respectively. A certain voltage for causing the p-side electrode to be at a negative potential and the n-side electrode to be at a positive potential is applied between the p-side electrode and the n-side electrode. Accordingly, photocarriers (holes and electrons) generated through light absorption in the i-type absorption layer 3403 are detected via the p-type upper clad layer 3404 and the n-type semiconductor layer 3402. Accordingly, the photodetection portion 3401 detects signal light as an electric signal (photocarrier current), and outputs a detection signal (photocarrier current) corresponding to the intensity of the signal light to an electric circuit in the subsequent stage.

In the light receiving element 3400 described above, as in the light receiving element 700, the MMI waveguide 3432 is provided, so that signal light enters the slab region 3421 and the photodetection portion 3401 while maintaining a propagation state in the convergence direction. Accordingly, the light absorption efficiency may be increased in the light receiving element 3400. Particularly, in the light receiving element 3400, the light absorption efficiency may be increased even though the slab region 3421 having a weak light confinement effect is disposed between the waveguide portion 3411 and the photodetection portion 3401.

When the distance from an end of the MMI waveguide 3432 on the side where signal light enters (input portion) to an end of the photodetection portion 3401 on the side where signal light enters (incident end) is longer than 70% of the length Lsi at which self-imaging occurs in the MMI waveguide 3432 and is shorter than 100% of the length Lsi, the light absorption efficiency may be increased compared to the light receiving elements 100 and 300. Likewise, when the distance from an end of the MMI waveguide on the side where signal light enters (input portion) to an end of the photodetection portion on the side where signal light enters (incident end) is longer than (N−0.3)×100% of the length Lsi_min at which self-imaging occurs in the MMI waveguide and shorter than N×100% of the length Lsi_min, the light absorption efficiency may be increased compared to the light receiving elements 100 and 300. The length Lsi_min is the shortest length where self-imaging occurs in the MMI waveguide, and N is a natural number.

In addition, in the light receiving element 3400, nothing is disposed on the waveguide layer 3412 in the slab region 3421, and the upper surface of the waveguide layer 3412 is filled with air, as illustrated in FIG. 37A. Thus, the slab region 3421 has an optically complete slab structure.

That is, the slab region 3421 has no light confinement effect. Thus, the light confinement effect in the slab region 3421 is weaker than the light confinement effect in the slab region 721 of the light receiving element 700. Therefore, in the light receiving element 3400, the ability of the slab region 3421 of suppressing expansion of the light intensity distribution of signal light in the direction orthogonal to the signal light travel direction is lower than that of the slab region 721. As a result, in the light receiving element 3400, degradation of light absorption efficiency caused by the slab region is more likely to occur than in the light receiving element 700.

However, in the light receiving element 3400, as in the light receiving element 700, signal light enters the slab region 3421 while maintaining a propagation state in the convergence direction due to the effect of the MMI waveguide 3432. Accordingly, in the slab region 3421, signal light may be maintained in the propagation state in the convergence direction, and enters the photodetection portion 3401 from the slab region 3421 while maintaining the propagation state in the convergence direction. Accordingly, a large part of incident signal light may be converged in a region below the i-type absorption layer 3403 in the waveguide layer 3412.

Therefore, in the light receiving element 3400, which includes a rib-type waveguide that is likely to cause degradation of light absorption efficiency, degradation of light absorption efficiency caused by a slab region may be suppressed, and the light absorption efficiency may be increased.

A structure similar to the structure described above as a specific example of the structure of the light receiving element 700 according to the first embodiment may be used as a specific example of the structure of the light receiving element 3400 according to the fourth embodiment. Note that no upper clad layer is disposed on the waveguide layer 3412 in the waveguide portion 3411, as described above. In the waveguide portion 3411, the width of the protrusion (core layer) 3413 of the waveguide layer 3412 is 2.5 μm, for example. In the MMI portion 3431, the width of the protrusion (core layer) 3413 of the waveguide layer 3412 is 5 μm, and the length thereof is 50 μm, for example.

4-2. Method for Manufacturing Light Receiving Element 3400

FIGS. 38A to 42B illustrate an example of a process of manufacturing the light receiving element 3400 illustrated in FIGS. 34 to 37B. FIGS. 38A, 39A, 40A, 41A, and 42A are top plan views illustrating a main part of the light receiving element 3400. FIGS. 38B, 39B, 40B, 41B, and 42B are cross-sectional views taken along lines XXXVIIIB-XXXVIIIB, XXXIXB-XXXIXB, XLB-XLB, XLIB-XLIB, and XLIIB-XLIIB of FIGS. 38A, 39A, 40A, 41A, and 42A, respectively. Hereinafter, an example of the method for manufacturing the light receiving element 3400 will be described with reference to FIGS. 38A to 42B.

Figure 38A:
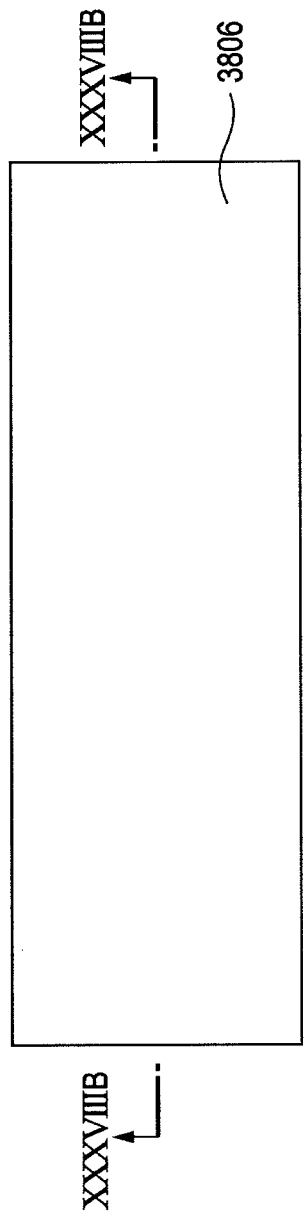
FIG. 38A is a plan view illustrating an example of a process of manufacturing the light receiving element illustrated in FIGS. 34 to 37B.
Figure 38B:
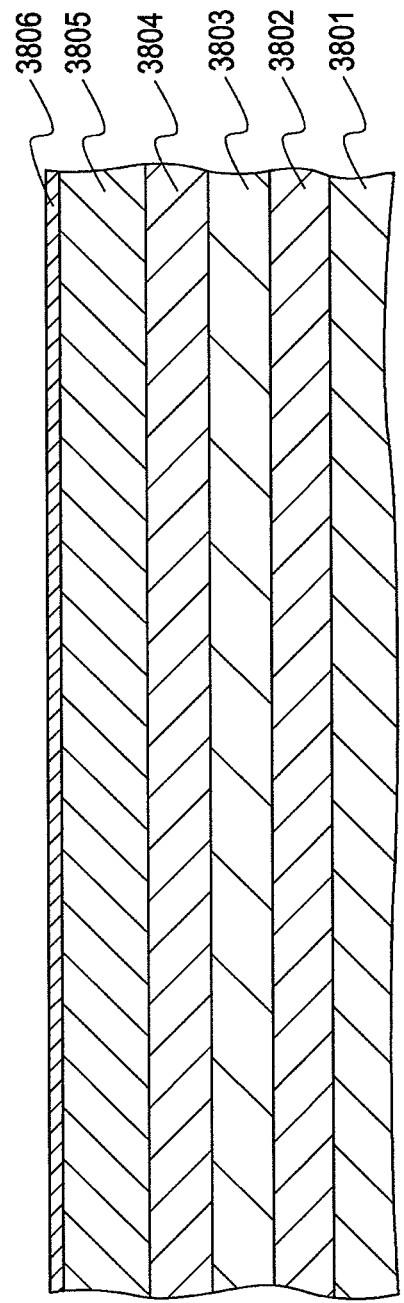
FIG. 38B is a cross-sectional view taken along line XXXVIIIB-XXXVIIIB of FIG. 38A.

As illustrated in FIGS. 38A and 38B, an i-InGaAsP film 3802, an n-InGaAsP film 3803, an i-InGaAs film 3804, a p-InP film 3805, and a stacked film 3806 including two layers of p-InGaAs and p-InGaAsP are deposited on an SI-InP substrate 3801 by using, for example, the MOCVD method. Here, deposition is performed so that the i-InGaAsP film 3802 has a thickness of 0.5 μm, the n-InGaAsP film 3803 has a thickness of 0.5 μm, and the i-InGaAs film 3804 has a thickness of 0.5 μm. Also, deposition is performed so that the total thickness of the p-InP film 3805 and the p-InGaAs/InGaAsP stacked film 3806 becomes 1.0 μm.

Subsequently, a mask 3901 for covering a region that is to become the photodetection portion 3401 illustrated in FIGS. 34 to 37B is formed on the p-InGaAs/InGaAsP stacked film 3806, and regions that are to become the waveguide portion 3411 and the MMI portion 3431 are selectively exposed. A silicon oxide film is used as the mask 3901, for example. With known etching using the mask 3901, the n-InGaAsP film 3803, the i-InGaAs film 3804, the p-InP film 3805, and the p-InGaAs/InGaAsP stacked film 3806 are removed from the waveguide portion 3411 and the MMI portion 3431, but remains in the photodetection portion 3401, as illustrated in FIGS. 39A and 39B. As a result of this process, the i-InGaAsP film 3802 is exposed in the waveguide portion 3411 and the MMI portion 3431. After the etching, the mask 3901 is removed.

Subsequently, a mask 4001 for covering a region that is to become a mesa structure in the photodetection portion 3401 is formed on the p-InGaAs/InGaAsP stacked film 3806 and the exposed n-InGaAsP film 3402, as illustrated in FIGS. 40A and 40B. The mask 4001 is formed to cover the most part of the waveguide portion 3411 and the MMI portion 3431, including the region other than the region that is to become a protrusion. A silicon oxide film is used as the mask 4001, for example.

At this time, as illustrated in FIGS. 40A and 40B, the mask 4001 is formed so that a non-covered region includes not only the p-InGaAs/InGaAsP stacked film 3806 but also part of the exposed i-InGaAsP film 3802, in view of a positioning error of the mask at photoresist exposure. That is, in the mask 4001, a region to be etched is larger than a region to be removed to form a mesa structure in the photodetection portion 3401, so that a margin region for canceling a mask positioning error is provided. The margin region is provided to suppress the occurrence of a phenomenon in which, as a result of displacement of the formation position of the mask 4001 due to a positioning error of the mask at photoresist exposure, the stacked film including the p-InGaAs/InGaAsP stacked film 3806, the p-InP film 3805, the i-InGaAs film 3804, and the n-InGaAsP film 3803 remains at an end of the photodetection portion 3401, and an absorption layer remains over a large width.

With known etching using the mask 4001, a mesa structure is formed in the photodetection portion 3401, as illustrated in FIGS. 40A and 40B. In the photodetection portion 3401, the p-InGaAs/InGaAsP stacked film 3806, the p-InP film 3805, and the i-InGaAs film 3804 are removed using the mask 4001. Also, part of the n-InGaAsP film 3803 is removed to a certain width so that the other part remains. With this process, part of the n-InGaAsP film 3803 is exposed. Accordingly, the n-InGaAsP semiconductor layer 3402, the i-InGaAs absorption layer 3403, the p-InP upper clad layer 3404, and the p-type contact layer 3405 illustrated in FIGS. 34 to 37B are formed. As a result, the mesa structure illustrated in FIG. 37B is formed. After the etching, the mask 4001 is removed.

Subsequently, a mask 4101 for covering a region that is to become a mesa structure in the waveguide portion 3411 and the MMI portion 3431 is formed on the exposed i-InGaAsP film 3802, the mesa structure formed through the etching, and the n-InGaAsP semiconductor layer 3402 exposed through the etching, as illustrated in FIGS. 41A and 41B. The mask 4101 is formed so as to cover the entire mesa structure formed through the etching and the entire n-InGaAsP semiconductor layer 3402 exposed through the etching. A silicon oxide film is used as the mask 4101, for example.

With known etching using the mask 4101, a protrusion (core layer) of a waveguide layer is formed in the waveguide portion 3411 and the MMI portion 3431, as illustrated in FIGS. 41A and 41B. In the waveguide portion 3411 and the MMI portion 3431, part of the i-InGaAsP film 3802 is removed using the mask 4101. Accordingly, the i-InGaAsP waveguide layer 3412 and the protrusion (core layer) 3413 thereof illustrated in FIGS. 34 to 37B are formed. As a result, the protrusion-shaped structure illustrated in FIGS. 36A and 36B is formed. After the etching, the mask 4101 is removed.

At this time, the portion covered by the mask 4101 in the exposed i-InGaAsP film 3802 is not etched and remains, as illustrated in FIGS. 41A and 41B. The remaining region corresponding to the i-InGaAsP waveguide layer 3412 composed of the i-InGaAsP film 3802 serves as the slab region 3421.

Figure 42A:
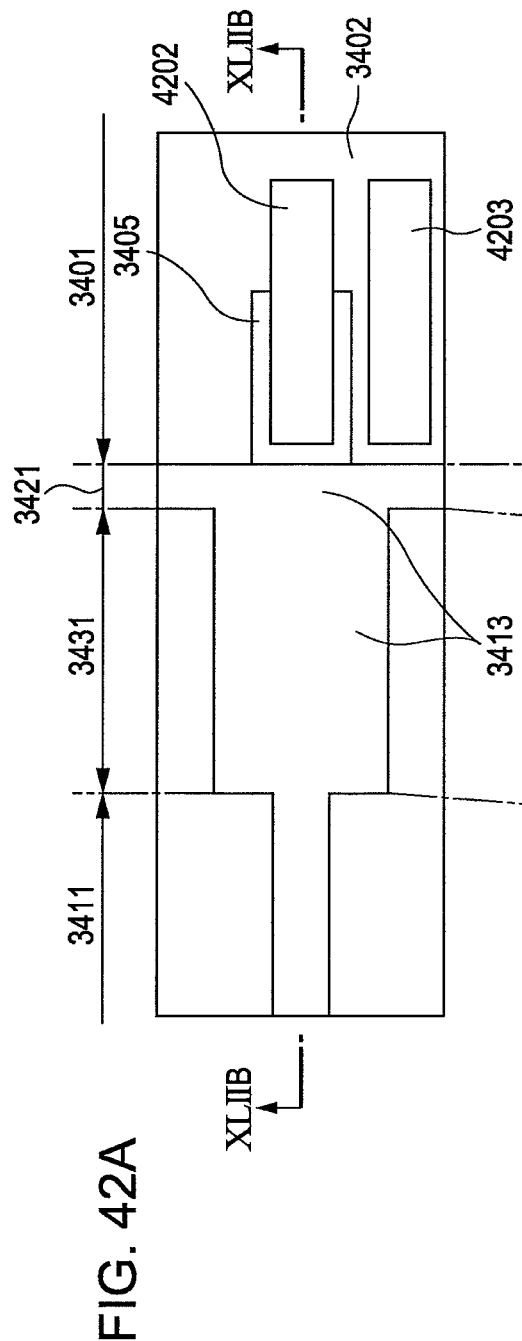
FIG. 42A is a plan view illustrating an example of the process of manufacturing the light receiving element illustrated in FIGS. 34 to 37B.
Figure 42B:
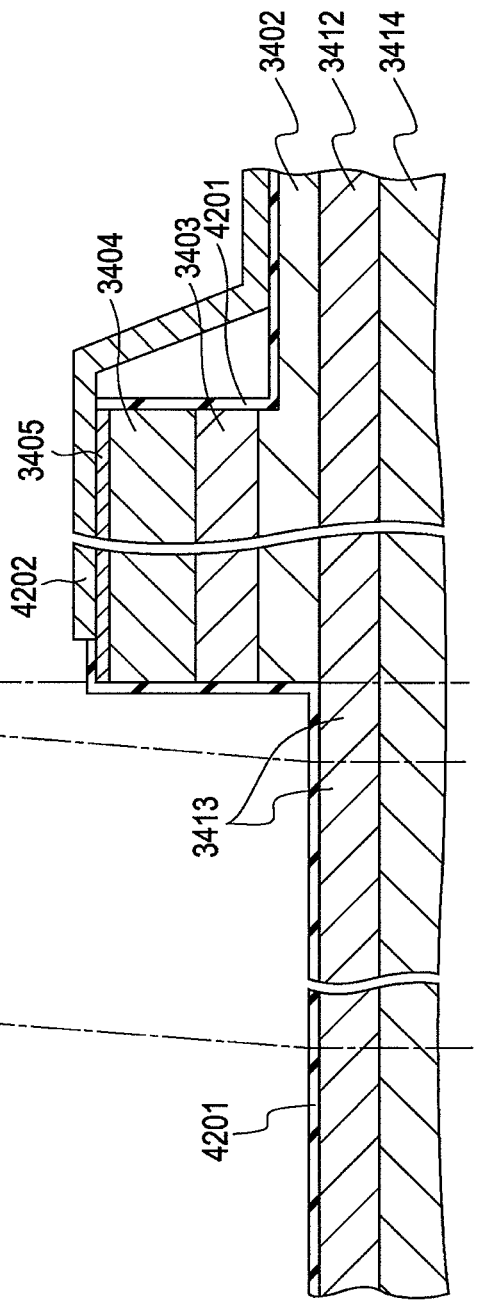
FIG. 42B is a cross-sectional view taken along line XLIIB-XLIIB of FIG. 42A.

Subsequently, in the photodetection portion 3401, the slab region 3421, the MMI portion 3431, and the waveguide portion 3411, a passivation film 4201 composed of a dielectric material, such as a silicon-nitride film, is formed in the region except the region where a metal electrode is to be formed. After that, as illustrated in FIGS. 42A and 42B, a p-side metal electrode 4202 is formed in an exposed region of the p-type contact layer 3405 at the top of the mesa structure in the photodetection portion 3401 by using a known formation method, such as metal deposition or metal plating. Also, an n-side metal electrode 4203 is formed in an exposed region of the n-InGaAsP semiconductor layer 3402 using a known formation method, such as metal deposition or metal plating. In the plan view illustrated in FIG. 42A, the passivation film 4201 is not illustrated for easy understanding of the structure.

Referring to FIGS. 42A and 42B, a metal electrode having an air bridge structure is used as the p-side metal electrode 4202. As is clear from the cross-sectional view in FIG. 42B, this structure causes the p-side metal electrode 4202 to be electrically insulated by air from the n-InGaAsP semiconductor layer 3402 connected to the n-side metal electrode 4203.

Accordingly, the parasitic capacitance generated between the p-side metal electrode 4202 and the n-side metal electrode 4203 may be reduced. Thus, the capacitance generated in the photodetection section 3401 may be reduced, and a cutoff frequency obtained based on a CR time constant increases in the transmission path between the light receiving element 3400 and an electric circuit in the subsequent stage. Accordingly, the light receiving element 3400 may supply a detection signal having a sufficient signal level to the electric circuit in the subsequent stage even in a high-frequency band, and the electric circuit in the subsequent stage may process the signal input thereto even in the high-frequency band.

Note that the structure of the p-side metal electrode 4202 is not limited to the air bridge structure. For example, an insulator may be formed in advance at the position where the p-side metal electrode 4202 is to be formed, and the p-side metal electrode 4202 may be formed on the insulator. In FIGS. 42A and 42B, part of the n-InGaAsP semiconductor layer 3402 remains in a portion opposite to the waveguide section 3411 and the MMI section 3431 regarding a PD, and the p-side metal electrode 4202 is formed on the part of the n-InGaAsP semiconductor layer 3402 via the passivation film 4201. Alternatively, the part of the n-InGaAsP semiconductor layer 3402 may be removed. Accordingly, the capacitance of the p-side metal electrode 4202 may be decreased, and the characteristic of a high-frequency band may be further enhanced.

In the above-described method for manufacturing the light receiving element 3400, it is not necessary to deposit an upper clad layer on the waveguide layer 3412 in the waveguide section 3411 and the MMI section 3431. Accordingly, the number of steps in the process may be decreased, and the light receiving element 3400 may be easily manufactured.

5. Fifth Embodiment

Figure 43:
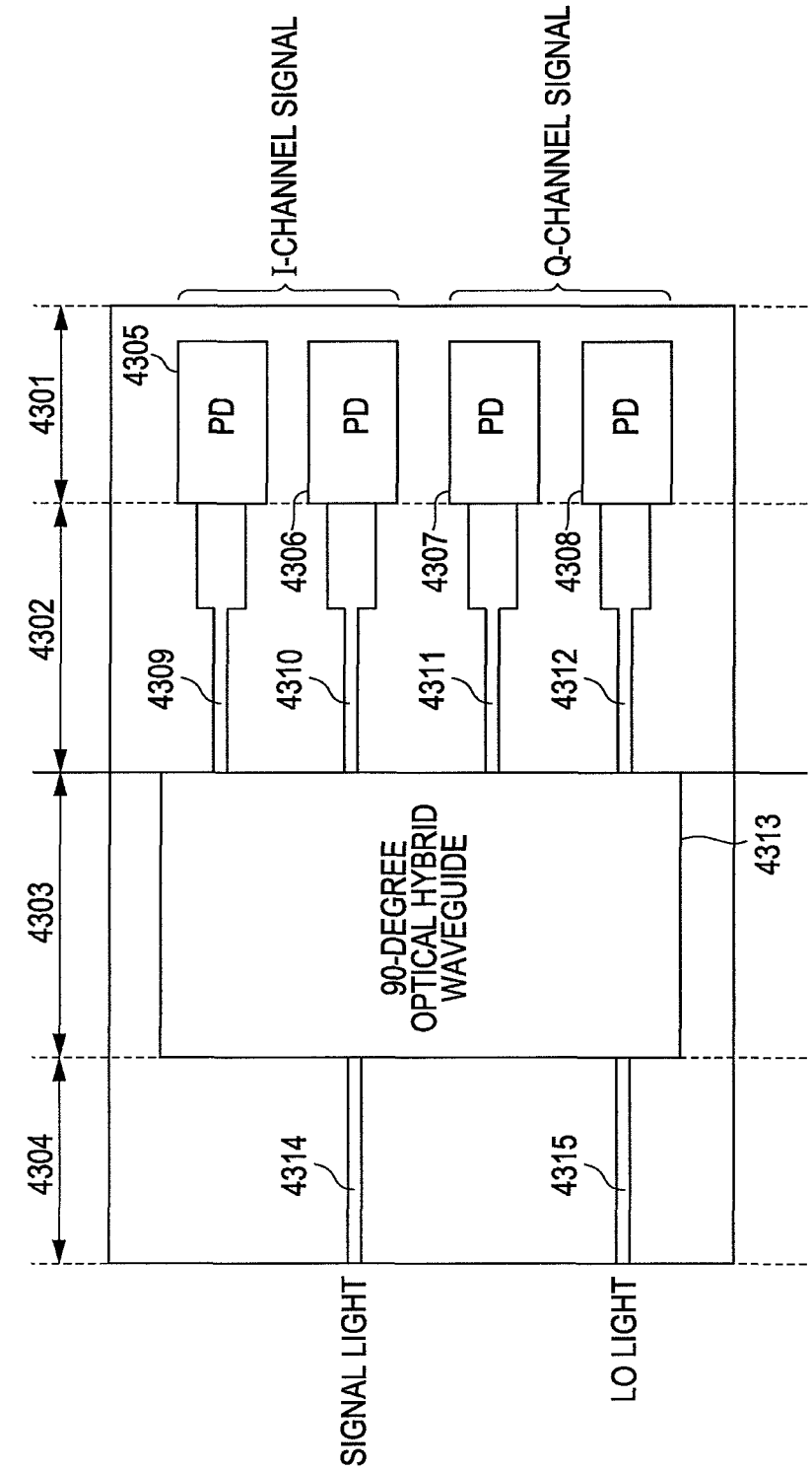
FIG. 43 illustrates an example of the configuration of a light receiving device according to a fifth embodiment.

FIG. 43 illustrates an example the configuration of a light receiving device 4300 according to a fifth embodiment.

The light receiving device 4300 illustrated in FIG. 43 is an example of an optical coherent receiver for demodulating a signal on which quadrature phase shift keying (QPSK) modulation has been performed. The light receiving device 4300 is a promising waveguide-integrated light receiving device including an optical hybrid waveguide that converts phase-modulated signal light into intensity-modulated signal light and a photodiode (PD) which are integrated on the same substrate, from the viewpoint of decreasing the size and assembly cost.

As illustrated in FIG. 43, the light receiving device 4300 includes a photodetection section 4301, a connection waveguide portion 4302, an optical hybrid waveguide portion 4303, and an input waveguide portion 4304. The photodetection portion 4301 includes four photodiode (PD) elements 4305 to 4308. The connection waveguide portion 4305 includes four connection waveguides 4309 to 4312. The optical hybrid waveguide portion 4303 includes a 90-degree optical hybrid waveguide 4313 including two inputs and four outputs. The input waveguide portion 4303 includes two input waveguides 4314 and 4315.

The two input waveguides 4314 and 4315 in the input waveguide portion 4303 are connected to the two inputs of the 90-degree optical hybrid waveguide 4313, respectively. The four connection waveguides 4309 to 4312 in the connection waveguide portion 4305 are connected to the four outputs of the 90-degree optical hybrid waveguide 4313, respectively. The four connection waveguides 4309 to 4312 are connected to the PD elements 4305 to 4308 in the photodetection portion 4301, respectively.

In the light receiving device 4300, the photodetection portion, the MMI portion, the slab region, and the waveguide portion of any one of the light receiving elements 700, 2500, 3000, and 3400 according to the first to fourth embodiments illustrated in FIGS. 7, 25, 30, and 34 may be used for the PD element 4305 and the connection waveguide 4309. This is the same in the other PD elements 4306 to 4308 and the connection waveguides 4310 to 4312. The optical hybrid waveguide portion 4303 and the input waveguide portion 4304 have the same layered structure as the connection waveguide portion 4302, and are disposed on the same substrate on which the photodetection portion 4301 and the connection waveguide portion 4302 are disposed.

Now, operation of the light receiving device 4300 will be described. QPSK-modulated signal light enters the input waveguide 4314, and local oscillator (LO) light enters the input waveguide 4315 as reference light. The 90-degree optical hybrid waveguide 4313 receives the signal light and the LO light via the input waveguides 4314 and 4315. The 90-degree optical hybrid waveguide 4313 causes the LO light and the signal light to interfere with each other, thereby demodulating the QPSK-modulated signal light, so as to generate complementary I-channel signal light beams having a phase difference of 180 degrees and to generate complementary Q-channel signal light beams having a phase difference of 180 degrees. The 90-degree optical hybrid waveguide 4313 outputs the complementary I-channel signal light beams to the connection waveguides 4309 and 4310, and outputs the complementary Q-channel signal light beams to the connection waveguides 4311 and 4312.

The PD elements 4305 and 4306 receive the complementary I-channel signal light beams from the 90-degree optical hybrid waveguide 4313 via the connection waveguides 4309 and 4310, respectively. Each of the PD elements 4305 and 4306 detects the received I-channel signal light beam as an electric signal and generates an I-channel signal (electric signal). The PD elements 4307 and 4308 receive the complementary Q-channel signal light beams from the 90-degree optical hybrid waveguide 4313 via the connection waveguides 4311 and 4312, respectively. Each of the PD elements 4307 and 4308 detects the received Q-channel signal light beam as an electric signal and generates a Q-channel signal (electric signal).

A 4×4 MMI waveguide including four inputs and four outputs may be used as the 90-degree optical hybrid waveguide 4313, for example. In this case, the input waveguides 4314 and 4315 are connected to two inputs of the 4×4 MMI waveguide. The connection waveguides 4309 to 4312 are connected to the four outputs of the 4×4 MMI waveguide.

In the light receiving device 4300 according to the fifth embodiment, as in the light receiving elements 700, 2500, 3000, and 3400 according to the first to fourth embodiments, light absorption efficiency may be increased. Particularly, in the light receiving device 4300, light absorption efficiency may be increased even when a slab region having a weak light confinement effect is disposed between a waveguide portion and a photodetection portion.

In the four PD elements 4305 to 4308 included in the photodetection portion 4301, corresponding spacer layers are disposed independently. Accordingly, among the PD elements 4305 to 4308, not only a p-side electrode but also an n-side electrode may be disposed in an electrically separated manner, and sufficient electrical separation among the PD elements 4305 to 4308 may be realized. Thus, the occurrence of undesired crosstalk among the PD elements 4305 to 4308 may be suppressed, so that signal light with a reduced error may be received by the light receiving device 4300.

In the fifth embodiment, an example of an optical coherent receiver has been described as a waveguide-integrated light receiving device. Alternatively, any type of element may be used as long as a PD and a waveguide are integrated together. The light receiving elements according to the first to fourth embodiments may be used as such an element.

6. Sixth Embodiment

FIG. 44 illustrates an example of the configuration of a light receiving module 4400 according to a sixth embodiment.

The light receiving module 4400 illustrated in FIG. 44 is an example of an optical coherent receiver module for demodulating a signal on which dual polarization-quadrature phase shift keying (DP-QPSK) modulation has been performed.

As illustrated in FIG. 44, the light receiving module 4400 includes optical coherent receivers 4401 and 4402, transimpedance amplifiers (TIAs) 4403 to 4406, polarizing beam splitters (PBSs) 4407 and 4408, lenses 4409 to 4414, and mirrors 4415 and 4416. Optical fiber cables 4417 and 4418 are connected to the light receiving module 4400.

The light receiving module 4400 receives DP-QPSK-modulated signal light via the optical fiber cable 4417, and receives LO light, which is reference light, via the optical fiber cable 4418. The DP-QPSK-modulated signal light includes two signal light beams polarized in different directions orthogonal to each other. The two signal light beams transmit signals different from each other.

The DP-QPSK-modulated signal light enters the PBS 4407 via the lens 4409 and is separated into two signal light beams polarized in different directions by the PBS 4407. One of the two signal light beams enters the optical coherent receiver 4401 via the lens 4411, and the other enters the optical coherent receiver 4402 via the mirror 4415 and the lens 4413. Likewise, LO light beams are supplied to the optical coherent receivers 4401 and 4402.

The light receiving device 4300 according to the fifth embodiment illustrated in FIG. 43 may be used as each of the optical coherent receivers 4401 and 4402. Each of the optical coherent receivers 4401 and 4402 receives QPSK-modulated signal light and LO light and causes the signal light and the LO light to interfere with each other, thereby demodulating the QPSK-modulated signal light.

The optical coherent receiver 4401 detects complementary I-channel signal light obtained through demodulation as a complementary electric signal (I-channel signal). The optical coherent receiver 4401 detects complementary Q-channel signal light obtained through demodulation as a complementary electric signal (Q-channel signal). The optical coherent receiver 4401 supplies the complementary I-channel signal (electric signal) obtained through detection to the TIA 4403, and supplies the complementary Q-channel signal (electric signal) obtained through detection to the TIA 4404. Likewise, the optical coherent receiver 4402 supplies the complementary I-channel signal to the TIA 4405, and supplies the complementary Q-channel signal to the TIA 4406.

Each of the TIAs 4403 to 4406 receives a complementary I-channel signal or a complementary Q-channel signal, and performs differential amplification on the signal level of the signal.

In the light receiving module 4400 according to the sixth embodiment, as in the light receiving device 4300 according to the fifth embodiment, light absorption efficiency may be increased in an optical coherent receiver. Particularly, in the light receiving module 4400, light absorption efficiency may be increased even when a slab region having a weak light confinement effect is disposed between a waveguide portion and a photodetection portion.

In a plurality of PD elements included in each optical coherent receiver, corresponding spacer layers are disposed independently. Accordingly, among the PD elements, not only a p-side electrode but also an n-side electrode may be disposed in an electrically separated manner, and sufficient electrical separation among the PD elements may be realized.

Thus, the occurrence of undesired crosstalk among the PD elements may be suppressed, so that signal light with a reduced error may be received by the light receiving module 4400.

In the light receiving element disclosed in the embodiments, light absorption efficiency may be increased. Particularly, in the light receiving element, light absorption efficiency may be increased even when a slab region having a weak light confinement effect is disposed between a waveguide portion and a photodetection portion.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A light receiving element comprising:
   a waveguide that includes a waveguide core;
   a multi-mode interference waveguide that has a width larger than a width of the waveguide, the multi-mode interference waveguide being configured to receive a first light from the waveguide core at a first end; and
   a photodetection portion that includes a first semiconductor layer and an absorption layer disposed on the first semiconductor layer, the first semiconductor layer including at least one layer and being configured to receive a second light from the multi-mode interference waveguide at a second end, the absorption layer being disposed above the first semiconductor layer and being configured to absorb the second light,
   wherein a distance from the first end of the multi-mode interference waveguide to the second end of the photodetection portion is longer than $(N-0.3) \times 100\%$ of a first length and shorter than $N \times 100\%$ of the first length, the first length being the shortest length where self-imaging occurs in the multi-mode interference waveguide, N being a natural number,
   wherein a width of a bottom surface of the first semiconductor layer in the photodetection portion is larger than a width of the multi-mode interference waveguide and a width of the absorption layer.

2. The light receiving element according to claim 1,
   wherein a relationship of $(N-0.3) \cdot nr \cdot Weff^2/\lambda \leq L \leq N \cdot nr \cdot Weff^2/\lambda$ is satisfied, L representing the distance from the first end of the multi-mode interference waveguide to the second end of the photodetection portion, $\lambda$ representing a wavelength of the first light from the waveguide core, Weff representing an effective waveguide width of the multi-mode interference waveguide, nr representing an effective refractive index of the waveguide core, and N being a natural number.

3. The light receiving element according to claim 1,
   wherein the width of the absorption layer in the photodetection portion is smaller than the width of the multi-mode interference waveguide.

4. The light receiving element according to claim 1,
   wherein the first semiconductor layer includes a waveguide core layer and a semiconductor layer, the waveguide core layer being shared by the waveguide and the multi-mode interference waveguide, the semiconductor layer being deposited on the waveguide core layer and having a refractive index higher than a refractive index of the waveguide core layer.

5. The light receiving element according to claim 1,
   wherein the first semiconductor layer is a single semiconductor layer that has a refractive index higher than a refractive index of the waveguide core.

6. The light receiving element according to claim 1, further comprising:
   a slab region disposed between the multi-mode interference waveguide and the photodetection portion and including a waveguide core layer, the waveguide core layer being not covered by the absorption layer and extending in a width direction of the slab region,
   wherein the second light from the multi-mode interference waveguide enters the photodetection portion via the slab region.

7. The light receiving element according to claim 6, further comprising:
   a clad layer disposed on the waveguide core layer of the slab region, the waveguide and the multi-mode interference waveguide.

8. The light receiving element according to claim 7, further comprising:
   a semiconductor embedded layer that covers a side surface of the absorption layer and that covers the slab region,
   wherein the semiconductor embedded layer has a refractive index identical to a refractive index of the clad layer.

9. The light receiving element according to claim 1,
   wherein the multi-mode interference waveguide is adjacent to the photodetection portion, and
   wherein the second light from the multi-mode interference waveguide directly enters the first semiconductor layer of the photodetection portion.

10. The light receiving element according to claim 9,
    wherein a length of the multi-mode interference waveguide is larger than 70% of the first length and is smaller than 100% of the first length.

11. The light receiving element according to claim 1, further comprising:
    a first semiconductor embedded layer that covers a side surface of the waveguide and a side surface of the multi-mode interference waveguide; and
    a second semiconductor embedded layer that covers a side surface of the absorption layer.

12. The light receiving element according to claim 1,
    wherein the at least one layer of the first semiconductor layer is a semiconductor layer of a first conductivity type, and
    wherein a conductive clad layer of a second conductivity type is disposed on the absorption layer, the second conductivity type being opposite to the first conductivity type.

13. The light receiving element according to claim 12,
    wherein the semiconductor layer of the first conductivity type, the absorption layer, and the conductive clad layer form a PIN-type photodiode.

14. The light receiving element according to claim 1,
    wherein each of the waveguide and the multi-mode interference waveguide has a high-mesa structure, a side surface of the high-mesa structure being not covered with a semiconductor.

15. A light receiving element comprising:
    a waveguide that includes a waveguide core;
    a multi-mode interference waveguide that has a width larger than a width of the waveguide, the multi-mode interference waveguide being configured to receive a first light from the waveguide core; and a photodetection portion that includes a first semiconductor layer and an absorption layer disposed on the first semiconductor layer, the first semiconductor layer including at least one layer and being configured to receive a second light from the multi-mode interference waveguide, the absorption layer being disposed above the first semiconductor layer and being configured to absorb the second light, wherein a length of the multi-mode interference waveguide is set so that a point at which self-imaging of the multi-mode interference waveguide occurs is positioned in a first region of the first semiconductor layer, the first region being below the absorption layer of the photodetection portion, and wherein a width of a bottom surface of the first semiconductor layer in the photodetection portion is larger than a width of the multi-mode interference waveguide and a width of the absorption layer.

16. A light receiving device comprising:

a first waveguide portion that is disposed in a first region of a substrate, a plurality of incident light beams being configured to propagate in the first waveguide portion;

a second waveguide portion that is disposed in a second region of the substrate, the second waveguide portion being configured to receive the plurality of incident light beams and generate a plurality of outgoing light beams on the basis of the plurality of incident light beams;

a third waveguide portion that is disposed in a third region of the substrate and includes a plurality of waveguides, the plurality of outgoing light beams configured to propagate along the plurality of waveguides, respectively; and a photodetection portion that is disposed in a fourth region of the substrate and includes a plurality of photodetection elements, the plurality of photodetection elements being configured to receive the plurality of outgoing light beams from the plurality of waveguides, respectively, wherein each of the plurality of waveguides includes:
 a waveguide that includes a waveguide core, the waveguide core being configured to receive a corresponding one of the plurality of outgoing light beams, and
 a multi-mode interference waveguide that has a width larger than a width of the waveguide, the multi-mode interference waveguide being configured to receive the corresponding outgoing light beam from the waveguide core at a first end, wherein each of the plurality of photodetection elements includes:
 a first semiconductor layer that includes at least one layer, the first semiconductor layer being configured to receive a corresponding one of the plurality of the outgoing light beams from a corresponding one of the multi-mode interference waveguides at a second end, and
 an absorption layer that is disposed on the first semiconductor layer, the absorption layer being configured to absorb the corresponding outgoing light beam, wherein a distance from the first end of the multi-mode interference waveguide to the second end of the photodetection portion is longer than (N−0.3)×100% of a first length and shorter than N ×100% of the first length, the first length being the shortest length where self-imaging occurs in the multi-mode interference waveguide, N being a natural number.

17. The light receiving device according to claim 16, wherein the plurality of incident light beams include signal light and reference light, and wherein the second waveguide portion includes a multi-mode interference waveguide that generates the plurality of outgoing light beams by causing the signal light and the reference light to interfere with each other.

18. A light receiving module comprising:

a plurality of light receiving devices configured to receive a plurality of incident light beams, the plurality of light receiving devices being configured to detect the plurality of incident light beams and output a plurality of electric signals corresponding to the plurality of incident light beams; and a plurality of amplifiers configured to receive the plurality of electric signals and that amplify the plurality of electric signals, wherein each of the plurality of light receiving devices includes:
 a first waveguide portion that is disposed in a first region of a substrate, the plurality of incident light beams being configured to propagate in the first waveguide portion,
 a second waveguide portion that is disposed in a second region of the substrate, the second waveguide portion being configured to receive the plurality of incident light beams and generate a plurality of outgoing light beams on the basis of the plurality of incident light beams,
 a third waveguide portion that is disposed in a third region of the substrate and that includes a plurality of waveguides, the plurality of outgoing light beams being configured to propagate along the plurality of waveguides, respectively, and
 a photodetection portion that is disposed in a fourth region of the substrate and that includes a plurality of photodetection elements, the plurality of photodetection elements being configured to receive the plurality of outgoing light beams from the plurality of waveguides, respectively, wherein each of the plurality of waveguides includes:
 a waveguide that includes a waveguide core, the waveguide core being configured to receive a corresponding one of the plurality of outgoing light beams, and
 a multi-mode interference waveguide that has a width larger than a width of the waveguide, the multi-mode interference waveguide being configured to receive the corresponding outgoing light beam from the waveguide at a first end, wherein each of the plurality of photodetection elements includes:
 a first semiconductor layer that includes at least one layer, the first semiconductor layer being configured to receive a corresponding one of the plurality of the outgoing light beams from a corresponding one of the multi-mode interference waveguides at a second end, and
 an absorption layer that is disposed on the first semiconductor layer, the absorption layer being configured to absorb the corresponding outgoing light beam, wherein a distance from the first end of the multi-mode interference waveguide to the second end of the photodetection portion is longer than (N−0.3)·times·100% of a first length and shorter than N·times·100% of the first length, the first length being the shortest length where self-imaging occurs in the multi-mode interference waveguide, N being a natural number.

19. The light receiving device according to claim 18,
wherein the plurality of incident light beams include signal light and reference light, and
wherein each of the second waveguide portions includes a multi-mode interference waveguide that generates the plurality of outgoing light beams by causing the signal light and the reference light to interfere with each other.

* * * * *